US008552678B2

(12) United States Patent
Yuuki et al.

(10) Patent No.: US 8,552,678 B2
(45) Date of Patent: Oct. 8, 2013

(54) VARIABLE-FLUX MOTOR DRIVE SYSTEM

(75) Inventors: Kazuaki Yuuki, Tokorozawa (JP); Kazuto Sakai, Yokosuka (JP); Hiroshi Mochikawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/425,032

(22) Filed: Mar. 20, 2012

(65) Prior Publication Data

US 2012/0181970 A1 Jul. 19, 2012

Related U.S. Application Data

(62) Division of application No. 12/375,076, filed as application No. PCT/JP2007/064494 on Jul. 24, 2007, now Pat. No. 8,179,068.

(30) Foreign Application Priority Data

| Jul. 24, 2006 | (JP) | 2006-200568 |
| Aug. 10, 2006 | (JP) | 2006-218228 |
| Nov. 10, 2006 | (JP) | 2006-304681 |
| Jul. 5, 2007 | (JP) | 2007-177260 |

(51) Int. Cl.
*H02P 1/46* (2006.01)

(52) U.S. Cl.
USPC .......................................... 318/718; 318/432

(58) Field of Classification Search
USPC .................................. 318/432, 718
See application file for complete search history.

(56) References Cited

U.S. PATENT DOCUMENTS

| 5,959,429 A * | 9/1999 | Tajima et al. ................ 318/799 |
| 5,977,679 A | 11/1999 | Miller et al. |
| 6,570,358 B2 * | 5/2003 | Nakatsugawa et al. ....... 318/727 |
| 6,800,977 B1 | 10/2004 | Ostovic |
| 7,411,370 B2 * | 8/2008 | Kono ........................... 318/802 |
| 7,825,620 B2 * | 11/2010 | Nakatsugawa et al. ....... 318/800 |
| 2006/0138992 A1 * | 6/2006 | Yamamoto .................... 318/727 |
| 2008/0079378 A1 * | 4/2008 | Nakatsugawa et al. ....... 318/430 |
| 2008/0297097 A1 * | 12/2008 | Lee et al. ...................... 318/701 |
| 2010/0071971 A1 * | 3/2010 | Tatematsu et al. ........... 180/65.8 |

(Continued)

FOREIGN PATENT DOCUMENTS

| JP | 60-87686 | 5/1985 |
| JP | 5 236714 | 9/1993 |

(Continued)

OTHER PUBLICATIONS

Japanese Office Action issued Oct. 11, 2011, in Patent Application No. 2006-218228 (with English-language translation).

(Continued)

*Primary Examiner* — Kawing Chan
(74) *Attorney, Agent, or Firm* — Oblon, Spivak, McClelland, Maier & Neustadt, L.L.P.

(57) ABSTRACT

A variable-flux motor drive system including a permanent-magnet motor including a permanent magnet, an inverter to drive the permanent-magnet motor, and a magnetize device to pass a magnetizing current for controlling flux of the permanent magnet. The permanent magnet is a variable magnet whose flux density is variable depending on a magnetizing current from the inverter. The magnetize device passes a magnetizing current that is over a magnetization saturation zone of magnetic material of the variable magnet. This system improves a flux repeatability of the variable magnet and a torque accuracy.

12 Claims, 44 Drawing Sheets

(56) References Cited

U.S. PATENT DOCUMENTS

2010/0201294 A1* 8/2010 Yuuki et al. ............... 318/400.3
2010/0327689 A1* 12/2010 Sakai et al. ............. 310/156.03
2010/0327787 A1* 12/2010 Sakai et al. ............. 318/400.09

FOREIGN PATENT DOCUMENTS

| | | |
|---|---|---|
| JP | 5 304752 | 11/1993 |
| JP | 7 336980 | 12/1995 |
| JP | 07336980 A * | 12/1995 |
| JP | 10191700 A * | 7/1998 |
| JP | 10 243699 | 9/1998 |
| JP | 11 299297 | 10/1999 |
| JP | 2003199382 A * | 7/2003 |
| JP | 2005-160287 | 6/2005 |

OTHER PUBLICATIONS

Office Action issued on Jan. 31, 2011 in the corresponding Canadian Application No. 2,659,088.
Office Action issued Mar. 16, 2010 in Australian Patent Application No. 2007277772.
Office Action issued May 24, 2013 in Japanese Patent Application 2011-271414 (with English Translation).

* cited by examiner

FIG. 25

| FLUX COMMAND OF LAST TIME φ*old | FLUX COMMAND OF THIS TIME φ* | | | |
|---|---|---|---|---|
| | Φ1 | Φ2 | Φ3 | Φ4 |
| Φ1 | -Im_B | Im_A | Im_B⇒-Im_A | Im_B |
| Φ2 | -Im_B | -Im_B⇒Im_A | Im_B⇒-Im_A | Im_B |
| Φ3 | -Im_B | -Im_B⇒Im_A | Im_B⇒-Im_A | Im_B |
| Φ4 | -Im_B | -Im_B⇒Im_A | -Im_A | Im_B |

VARIABLE-FLUX MOTOR DRIVE SYSTEM

CROSS-REFERENCE TO RELATED APPLICATIONS

This application is a divisional of U.S. patent application Ser. No. 12/375,076, filed Jan. 26, 2009, which is a 371 of International Patent Application No. PCT/JP2007/64494, filed Jul. 24, 2007, and claims priority to Japanese Patent Applications No. 2006-200568, filed Jul. 24, 2006, No. 2006-218228, filed Aug. 10, 2006, No. 2006-304681, filed Nov. 10, 2006, and No. 2007-177260, filed Jul. 5, 2007. The entire contents of U.S. patent application Ser. No. 12/375,076 are incorporated herein by reference.

TECHNICAL FIELD

The present invention relates to a variable-flux motor drive system.

BACKGROUND TECHNOLOGY

Instead of conventional induction motors (IM motors), permanent-magnet synchronous motors (PM motors) that are highly efficient and are expected to be miniaturized and noise-reduced are spreading. For example, the PM motors have become used as drive motors for electric trains and electric vehicles.

The IM motor generates magnetic flux by an excitation current from a stator, and therefore, has a technical problem of causing a loss when passing the excitation current.

On the other hand, the PM motor is a motor having a rotor provided with a permanent magnet whose flux is used to output torque, and therefore, has no such a problem of the IM motor. However, the PM motor induces, due to the permanent magnet, a voltage depending on the number of revolutions. In the application field of electric trains and vehicles that involves a wide range of rotational speeds, a condition must be secured that a voltage induced at a maximum rotational speed must not break (by overvoltage) an inverter that drives and controls the PM motor. To satisfy the condition, it is necessary to provide the inverter with a sufficiently high withstand voltage, or limit the flux of the permanent magnet of the motor. The former affects a power source, and therefore, the latter is generally chosen. The amount of flux of the PM motor with respect to the amount of flux of the IM motor (in the IM motor, it is the amount of gap flux produced by excitation current) sometimes becomes about 1:3. To generate the same torque, the PM motor of small flux amount must pass a large (torque) current. Namely, in a low-speed zone, the PM motor must pass a larger current than the IM motor, to output the same torque.

Accordingly, the current capacity of an inverter for driving the PM motor must be larger than that for driving the IM motor. The switching frequency of a switching element in the inverter of the PM motor is high, and therefore, the PM motor causes a large loss and heat at low speed because the loss is dependent on a current value.

An electric train, for example, expects to be cooled by a wind created during running, and if a large loss occurs during running at low speed, the inverter must be enlarged to improve the cooling capacity. On the other hand, if an induced voltage is high, field-weakening control must be carried out. In this case, a superposed excitation current deteriorates efficiency.

The PM motor has advantages and disadvantages due to the magnet incorporated therein. As a motor, it has an advantage in reducing a loss and size. On the other hand, for the variable speed control of an electric train or an electric vehicle, the PM motor has operating points at which it shows inferior efficiency compared to the conventional IM motor. For the inverter, increases in the current capacity and loss lead to increase the size of the inverter. Efficiency of the system itself is mainly dependent on the motor, and therefore, employing the PM motor improves the total efficiency of the system. An increase in the size of the inverter, however, is disadvantageous and not preferable for the system.

FIG. 57 is a block diagram showing an example of a permanent-magnet synchronous motor (PM motor) drive system according to a related art. A main circuit consists of a DC power source 3, an inverter 1 to invert DC power into AC power, and a permanent-magnet synchronous motor 4a to be driven by the AC power of the inverter 1. The main circuit is provided with a current detector 2 to detect motor currents and a rotational angle sensor 18 to detect a rotational angle of a rotor of the permanent-magnet synchronous motor 4a. The inverter 1 inverts DC power from the DC power source 3 into AC power, which is supplied to the permanent-magnet synchronous motor 4a. Currents supplied to the permanent magnet synchronous motor 4a are detected by the current detector 2 and are supplied to a voltage command operate unit 210.

Next, control operation of this prior-art system will be explained. An input to the system is a torque command Tm*. This torque command Tm* is generated by a proper means to make the permanent-magnet synchronous motor 4a produce a required torque. According to the input torque command Tm*, a current command operate unit 211 generates a D-axis current command Id* and a Q-axis current command Iq* to determine a D-axis current and a Q-axis current and supplies them to the voltage command operate unit 210. The rotational angle of the rotor of the permanent-magnet synchronous motor 4a detected by the rotational angle sensor 18 is sent to the voltage command operate unit 210. According to the input D-axis current command Id* and Q-axis current command Iq*, the voltage command operate unit 210 calculates and generates D- and Q-axis voltage commands Vd* and Vq* to pass currents in such a way that the D-axis current Id and Q-axis current Iq agree with the current commands. At this time, the voltage command operate unit 210 carries out PI control for a current deviation and finds the D- and Q-axis voltage commands. Thereafter, the voltage command operate unit 210 converts coordinates of the D- and Q-axis voltage commands Vd* and Vq* and provides a PWM circuit 6 with three-phase voltage commands Vu*, Vv*, and Vw*. Although the voltage command operate unit 210 converts the D- and Q-axis voltage commands into the three-phase voltage commands, it is possible to arrange, for example, a coordinate conversion unit to carry out the conversion of the voltage commands. According to the input three-phase voltage commands Vu*, Vv*, and Vw*, the PWM circuit 6 controls ON/OFF of switching elements of the inverter 1.

As shown in FIG. 57, the prior-art PM motor drive system must arrange a load contactor 209 on the AC side of the inverter 1. The permanent-magnet synchronous motor 4a has a permanent magnet, and therefore, induces a voltage (counter electromotive voltage) when the inverter 1 is gated off, as long as the motor rotates due to inertia. If the induced voltage is higher than the DC voltage of the DC power source 3, an overvoltage is applied to the inverter 1 and a braking force is applied to the synchronous motor 4a.

If the permanent-magnet synchronous motor 4a or the inverter 1 causes a short or an earth fault, the induced voltage will continuously pass a current to cause problems such as the overheating and burning of the permanent-magnet synchronous motor 4a and inverter 1. Accordingly, the above-mentioned drive system opens the load contactor 209 when the inverter 1 is gated off, to prevent the inverter 1 from receiving an induced voltage and the permanent-magnet synchronous motor 4a and inverter 1 from continuously passing a failure current.

A life of the load contactor 209 is greatly dependent on the number of times of open/close operation. When the open/close frequency of the load contactor 209 is high, it suffers from a high failure rate and short life. To improve the reliability of the system, double load contactors 209a and 209b, 209c and 209d, and 209e and 209f may be arranged for respective phases as shown in FIG. 57. This is not a perfect solution and highly increases costs.

Japanese Unexamined Patent Application Publication No. H11-299297 (Patent Document 1) describes a technique of conducting flux-weakening control on a permanent-magnet motor by reducing a flux-weakening current without deteriorating a torque accuracy, to thereby decrease inverter and motor losses and a rated current value of the apparatus. This, however, passes an excitation current to deteriorate efficiency and generate heat. Accordingly, it must have a cooling device, which increases the cost and size of the apparatus.

To solve the problems of the conventional permanent-magnet synchronous motor drive system, Japanese Unexamined Patent Application Publication No. H5-304752 (Patent Document 4) discloses an electric vehicle driving AC motor that employs a combination of a permanent magnet and an excitation coil to change magnetic flux.

The electric vehicle driving AC motor described in the Patent Document 4 efficiently operates the motor and an inverter in each of a low-output operation and a high-output operation. This electric vehicle driving AC motor uses flux of the permanent magnet embedded in a field magnetic pole, and if necessary, flux of the excitation coil, to form field flux. Depending on a motor output, a field flux generation source is switched between only the permanent magnet and both the permanent magnet and excitation coil. At the same time, an excitation current is supplied through a rotational transformer. This electric vehicle driving AC motor can operate in response to a motor output. For example, in response to a low output, it operates only with the permanent magnet, to improve operating efficiency. In addition, it can increase a motor voltage in a low-motor-speed zone, to reduce a current, decrease a copper loss of a motor coil and a generation loss of the inverter, and improve system efficiency. This effect is significant for an electric vehicle that is frequently driven at low and middle speeds, to increase current usage efficiency and extend a driving distance per charge.

In addition, this electric vehicle driving AC motor does not demagnetize the permanent magnet, and therefore, simplifies inverter control, causes no abnormal overvoltage, and protects the system. The rotational transformer may be operated at high frequencies to reduce the size thereof and the size and weight of the system as a whole.

The electric vehicle driving AC motor stipulated in the Patent Document 4, however, must always pass an excitation current when generating flux by the excitation coil. Passing an excitation current causes a problem of deteriorating efficiency, and the permanent magnet embedded in the field magnetic pole causes a problem of inducing a voltage.

In connection with this, there is a variable-flux motor drive system capable of varying the flux of a magnet with a current from an inverter. This system changes the amount of flux of a permanent magnet according to operating conditions, and therefore, is expected to improve efficiency more than the conventional fixed magnet PM motor drive system. When the magnet is not needed, the flux amount can be reduced to minimize an induced voltage.

For the variable-flux motor drive system for driving a variable-flux motor whose flux is variably controllable with a magnetizing current from an inverter, it is important when and how the magnetization process to change flux is carried out. Transient torque will occur depending on a torque accuracy or the magnetization process. The magnetization process must be carried out at the timing to maximize efficiency and expand a speed range.

The BH characteristic (magnetization-flux density characteristic) of a variable magnet shows a steep response to a magnetizing current from an inverter, to easily fluctuate flux depending on a way of magnetization. The flux fluctuation deteriorates a torque repeatability and the quality of the drive system.

To magnetize the variable magnet, the inverter must pass a large current. In this case, a stator will saturate. Compared with demagnetizing the variable magnet, magnetizing the variable magnet needs a larger current to be passed. The need of a large current increases the current capacity of each switching element of the inverter, and also, each switching element of the inverter must have a higher withstand voltage. Namely, only for the magnetization process, each switching element must have a large capacity to increase the cost thereof. In addition, the large current produces instantaneous heat, and therefore, the thermal capacity of the inverter must be increased so that the inverter may resist against the short-time heat.

Patent Document 1: Japanese Unexamined Patent Application Publication No. H11-299297
Patent Document 2: U.S. Pat. Publication No. 6,800,977
Patent Document 3: U.S. Pat. Publication No. 5,977,679
Patent Document 4: Japanese Unexamined Patent Application Publication No. H5-304752

DISCLOSURE OF INVENTION

The present invention has been made in consideration of the problems of the above-mentioned related arts. An object of the present invention is to provide a variable-flux motor drive system capable of suppressing a deterioration of torque accuracy due to a variable magnet, suppressing transient torque produced by a magnetization process, improving efficiency of the system as a whole, and coping with a wide range of speeds.

Another object of the present invention is to provide a variable-flux motor drive system for driving a variable-flux motor whose flux amount is variably controllable with a magnetizing current from an inverter, capable of improving a flux repeatability of a variable magnet and a torque accuracy.

Still another object of the present invention is to provide a variable-flux motor drive system capable of magnetizing a variable magnet with a simple circuit without increasing the current capacity and thermal capacity of an inverter.

Still another object of the present invention is to provide a variable-flux motor drive system capable of employing, instead of a permanent-magnet motor, a variable-flux motor whose flux is variably controllable, suppressing, depending on situations, a counter electromotive voltage caused by the flux of a variable magnet with the use of a simple apparatus, preventing a braking force to be applied in a high-speed zone, and safely protecting the system.

In order to accomplish the objects, an aspect of the present invention provides a variable-flux motor drive system having an inverter for driving a variable-flux motor that employs a fixed magnet and a variable magnet. The system comprises a torque command generate unit to generate a torque command for the variable-flux motor, a variable flux control unit to change flux according to a magnetizing current from the inverter and magnetize the variable magnet, a switch to pass D- and Q-axis current references based on the torque command from the torque command generate unit or D- and Q-axis magnetizing current commands from the variable flux control unit, a magnetization request generate unit to generate, if predetermined conditions are met, a request to the variable flux control unit for magnetizing the variable magnet, and a gate command generate unit to generate a gate command for controlling the inverter according to the torque-command-based D- and Q-axis current references or the D- and Q-axis magnetizing current commands from the switch.

This aspect of the present invention can suppress the deterioration of a torque accuracy due to the variable magnet, suppress transient torque due to a magnetization process, improve efficiency of the system as a whole, and cope with a wide range of speeds.

Another aspect of the present invention provides a variable-flux motor drive system comprising a permanent-magnet motor employing a permanent magnet, an inverter to drive the permanent-magnet motor, and a magnetize means to pass a magnetizing current for controlling the flux of the permanent magnet. The permanent magnet at least partially has a variable magnet whose flux density is variable in response to a magnetizing current from the inverter. The magnetize means passes a magnetizing current that exceeds a magnetization saturation zone of magnetic material of the variable magnet.

Still another aspect of the present invention provides a variable-flux motor drive system comprising a permanent-magnet motor employing a permanent magnet, an inverter to drive the permanent-magnet motor, a variable flux control means to pass a magnetizing current for controlling the flux of the permanent magnet, a means to detect a current of the permanent-magnet motor, and a flux estimate means to estimate a flux amount according to a voltage and current applied to the permanent-magnet motor and a coil inductance serving as a motor parameter. The permanent magnet at least partially has a variable magnet whose flux density is variable according to a magnetizing current from the inverter.

This aspect of the present invention controls the flux amount of the variable magnet according to a magnetizing current from the inverter and drives the variable-flux motor, thereby improving a flux repeatability of the variable magnet and a torque accuracy.

Still another aspect of the present invention provides a variable-flux motor drive system having an inverter for driving a variable-flux motor that has a fixed magnet and a variable magnet. The system comprises a main control unit to control the inverter so that torque of the variable-flux motor complies with a torque command, a magnetize coil to magnetize the variable magnet of the variable-flux motor, and a magnetize circuit to supply a magnetizing current to the magnetize coil.

This aspect of the present invention can magnetize the variable magnet with a simple circuit without increasing the current capacity and thermal capacity of the inverter.

Still another aspect of the present invention provides a variable-flux motor drive system comprising a permanent-magnet motor having a variable magnet that is at least a low-coercive-force permanent magnet, an inverter to drive the permanent-magnet motor, a magnetize unit to supply a magnetizing current for controlling the flux of the variable magnet, a demagnetization test unit to test whether or not the variable magnet must be demagnetized, and according to the test result, generate a demagnetize signal, and one or more demagnetize units to demagnetize the variable magnet according to the demagnetize signal generated by the demagnetization test unit.

According to the above-mentioned and other aspects of the present invention, demagnetization is carried out when the variable-flux motor drive system must be protected or when the inverter is stopped, to suppress a counter electromotive voltage, prevent a braking force from being applied, and safely protect the system.

BRIEF DESCRIPTION OF DRAWINGS

FIG. 25 is a magnetizing current table looked up by the variable flux control unit according to the fifth embodiment of the present invention.

BEST MODE OF IMPLEMENTING INVENTION

Figure 1:
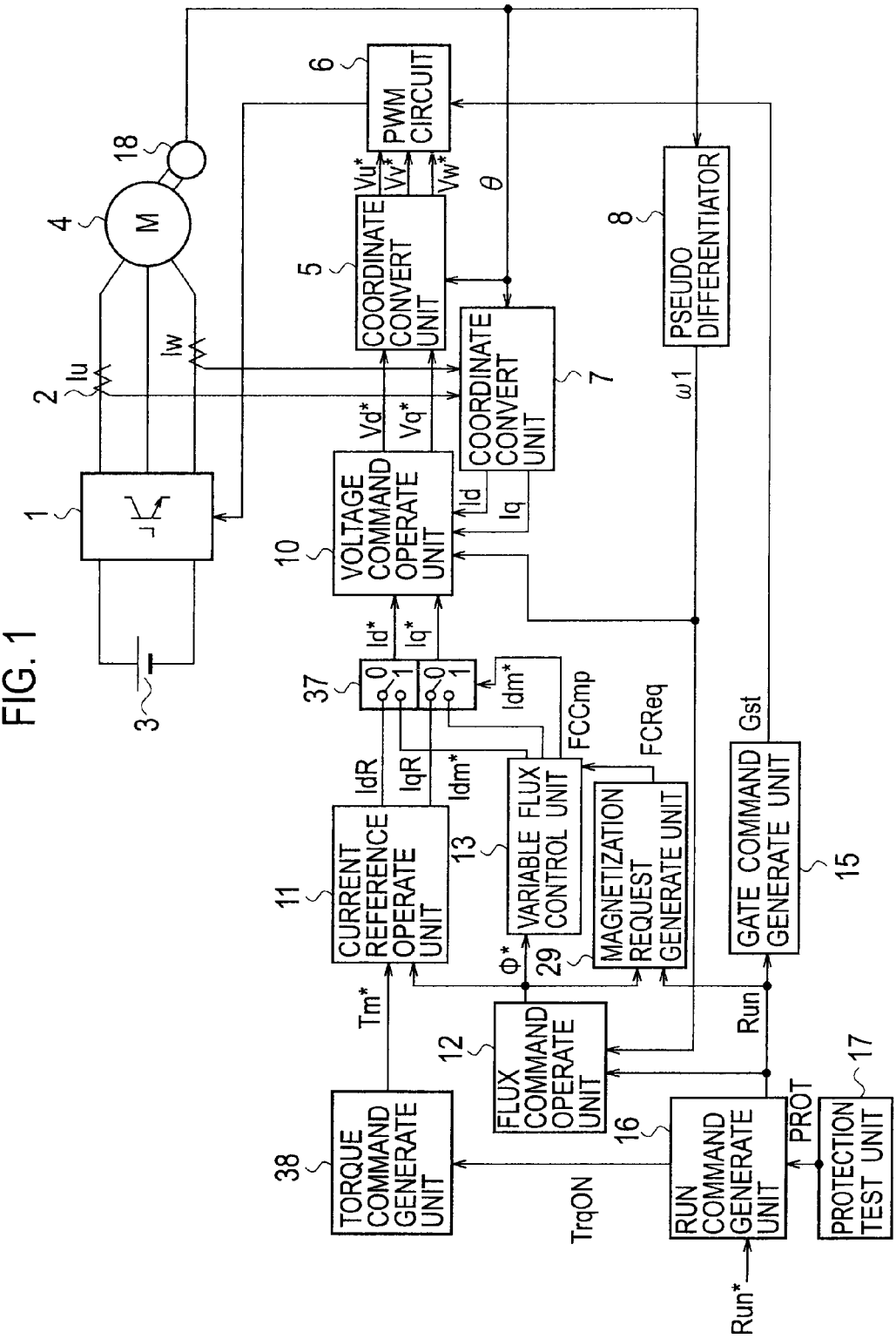
FIG. 1 is a block diagram showing a variable-flux motor drive system according to a first embodiment of the present invention.

Hereunder, the embodiments of the present invention will be explained in detail with reference to the drawings.
(First Embodiment)
FIG. 1 is a block diagram showing a variable-flux motor drive system according to the first embodiment of the present invention. First, a main circuit including a variable-flux motor 4 of the drive system will be explained. An inverter 1 inverts DC power from a DC power source into AC power, which is supplied to the variable-flux motor 4. Currents Iu and Iw supplied to the variable-flux motor 4 are detected by a current detector 2 and are converted by a coordinate convert unit 7 into a D-axis current Id and a Q-axis current Iq, which are input to a voltage command operate unit 10. The voltage command operate unit 10 outputs a D-axis voltage command Vd* and a Q-axis voltage command Vq* to a coordinate convert unit 5, which converts them into three-phase voltage commands Vu*, Vv*, and Vw* to be input to a PWM circuit 6. The PWM circuit 6 controls ON/OFF of switching elements of the inverter 1 according to a gate command Gst from a gate command generate unit 15. A rotational angle of the variable-flux motor 4 is detected by a rotational angle sensor 18 and is differentiated by a pseudo differentiator 8 into an inverter frequency ω1, which is input to the voltage command operate unit 10 and a flux command operate unit 12.

Figure 2:
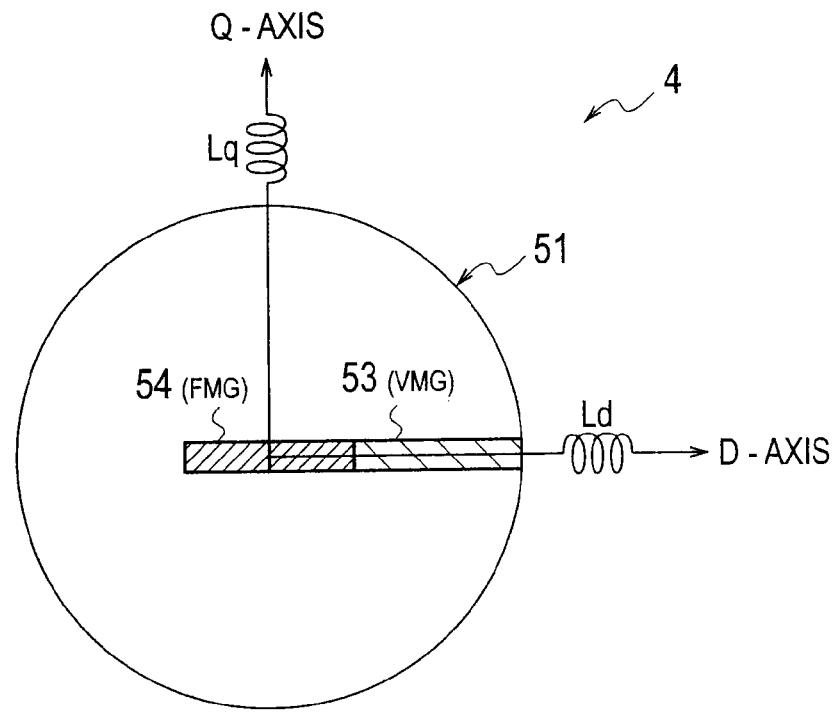
FIG. 2 is a simplified model view showing a variable-flux motor according to the first embodiment of the present invention.

Here, the variable-flux motor 4 according to the first embodiment of the present invention will be explained. FIG. 2 is a simple model view showing the variable-flux motor 4 according to the first embodiment of the present invention. A stator side of the variable-flux motor 4 is similar to that of an existing permanent-magnet synchronous motor and a rotor side thereof has, as magnets, a fixed magnet (FMG) 54 whose magnetic material has a fixed flux density and a variable magnet (VMG) 53 whose magnetic material has a variable flux density. The permanent-magnet synchronous motor has only the former fixed magnet. A characteristic of the variable-flux motor is that it has the variable magnet. Supposing a magnet is magnetized in the direction of a D-axis, the fixed magnet 54 and variable magnet 53 are arranged in the D-axis direction. Ld in FIG. 2 is a D-axis inductance and Lq is a Q-axis inductance.

Next, the fixed magnet 54 and variable magnet 53 will be explained. The fixed magnet (permanent magnet) keeps a magnetized state without an external current passed thereto. It is not always true even for the fixed magnet that the flux density thereof is always unchanged under any condition. Even the permanent-magnet synchronous motor is demagnetized or magnetized when receiving an excessive current from the inverter 1. Namely, the fixed magnet is not a magnet whose flux amount is unchanged, but is a magnet whose flux density is almost unchanged when normally operated at rated conditions.

On the other hand, the variable magnet 53 is a magnet whose flux density changes depending on a current passed from the inverter 1 even under standard rated operating conditions. The variable magnet of this sort can be designed within a certain range according to the material and structure of magnetic material.

For example, a fixed magnet of a recent permanent-magnet synchronous motor is frequently a neodymium (NdFeB) magnet having a high residual flux density Br. The residual flux density Br is high, for example, about 1.2 T, and therefore, large torque can be output from the small structure. Such a magnet is preferable for an EV (electric vehicle), an HEV (hybrid vehicle), and an electric train that need a high-output, small-sized motor. The conventional permanent-magnet synchronous motor needs not to be demagnetized by normal current, and therefore, a neodymium magnet (NdFeB) having a very high coercive force Hc (about 1000 kA/m) is an optimum magnetic material. A magnet having a large residual flux density and coercive force is selected for the permanent-magnet synchronous motor.

It may be considered to use, for the variable magnet 53, a magnetic material such as AlNiCo (Hc=60 to 120 kA/m) and FeCrCo (Hc=about 60 kA/m) having a high residual flux density and a small coercive force. With respect to a standard current amount passed from the inverter 1 to drive a conventional permanent-magnet synchronous motor, the flux density (flux amount) of the neodymium (NdFeB) magnet is substantially constant, and the flux density (flux amount) of the variable magnet such as an AlNiCo magnet varies. Strictly speaking, the neodymium is used in a reversible zone, and therefore, the flux density thereof may vary in a very small range. It, however, restores an original value if an inverter current stops. On the other hand, the variable magnet 53 uses up to a nonreversible zone, and therefore, does not restore an original value and keeps a changed magnetic characteristic even after an inverter current stops. In FIG. 2, the flux quantity of AlNiCo serving as the variable magnet 53 changes in the D-axis direction and is substantially zero in the Q-axis direction.

Figure 3:
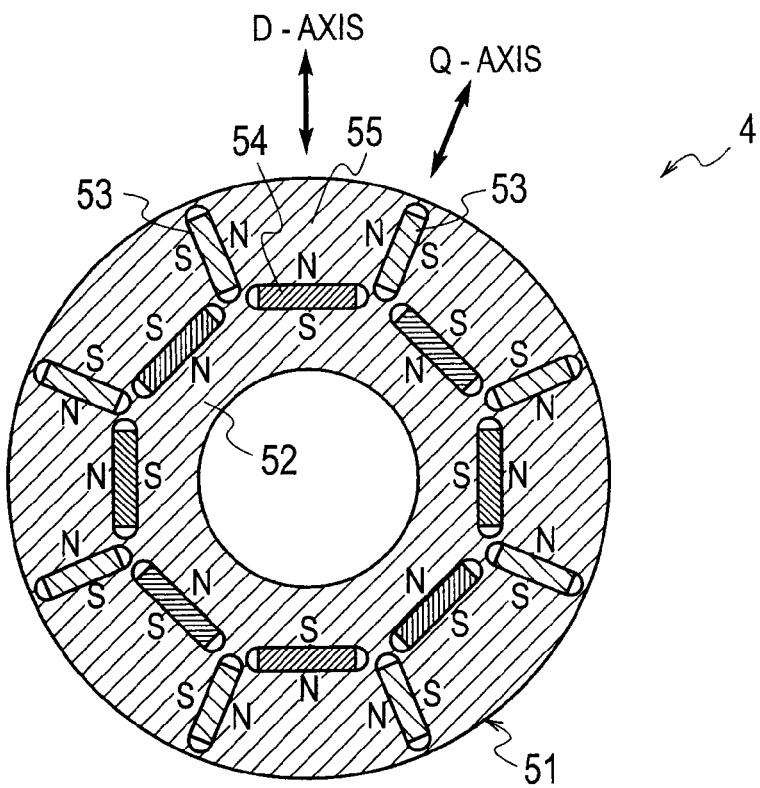
FIG. 3 is a schematic view showing a rotor of the variable-flux motor according to the first embodiment of the present invention.

FIG. 3 is a schematic view showing the rotor 51 of the variable-flux motor 4. The fixed magnet 54 of, for example, neodymium NdFeB having a high coercive force and the variable magnet 53 of, for example, AlNiCo having a low coercive force are combined and arranged on a rotor iron core 52. The Q-axis direction of the variable magnet 53 and the magnetized direction thereof are orthogonal to each other, and therefore, the variable magnet 53 is not influenced by a Q-axis current and is magnetized by a D-axis current. 55 is a magnetic pole part.

Figure 4:
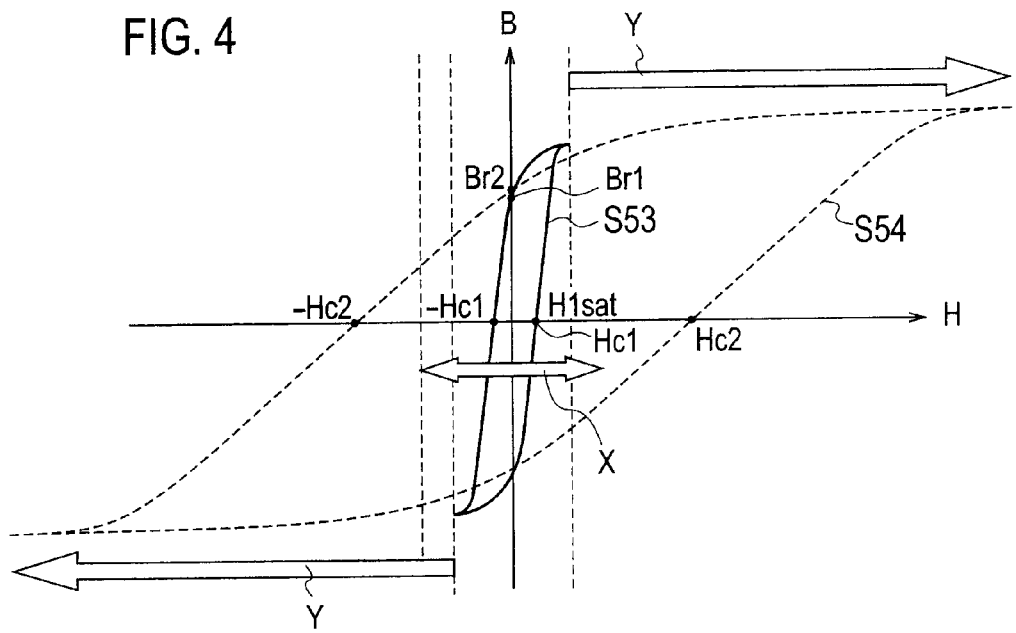
FIG. 4 is a characteristic diagram showing BH characteristics (flux density-magnetization characteristics) of a fixed magnet and a variable magnet in the variable-flux motor according to the first embodiment of the present invention.

FIG. 4 is a characteristic diagram showing BH characteristics (flux density-magnetization characteristics) of the fixed magnet 54 and variable magnet 53. In FIG. 4, S54 is the BH characteristic of the fixed magnet 54, S53 is the BH characteristic of the variable magnet 53, Br1 is a residual flux density of the variable magnet 53, and Br2 is a residual flux density of the fixed magnet 54. Also, H1sat is a saturation value of the variable magnet 53, Hc1 is a coercive force of the variable magnet 53, and Hc2 is a coercive force of the fixed magnet 54. Further, X is a magnetization zone due to an output current of the inverter and Y is a magnetization saturation zone of the variable magnet.

Figure 5:
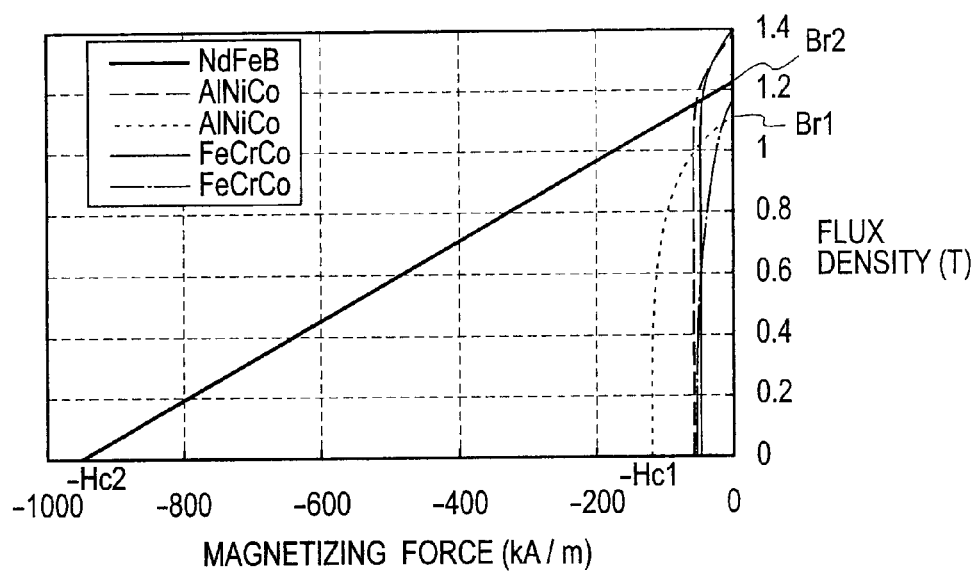
FIG. 5 is a characteristic diagram showing a quantitatively correct relationship in the second quadrant (B>0, H<0) alone of FIG. 4.

FIG. 5 is a characteristic diagram showing a quantitatively correct relationship only of the second quadrant (B>0, H<0) of FIG. 4. In the cases of neodymium NdFeB and alnico AlNiCo, there is no significant difference between the residual flux densities Br1 and Br2. Concerning the coercive forces Hc1 and Hc2, the alnico AlNiCo magnet is 1/15 to 1/8 of the neodymium NdFeB magnet and an FeCrCo magnet is 1/15 of the same.

According to the conventional permanent-magnet synchronous motor, the magnetization zone X by an output current of the inverter 1 is sufficiently smaller than that of the coercive force of the neodymium NdFeB magnet and is used within the reversible range of the magnetization characteristic thereof. The variable magnet 53 has a small coercive force as mentioned above, and therefore, is usable in a nonreversible zone, within an output current range of the inverter 1, in which it does not return to a flux density B it has before the application of a current even if the current is zeroed.

An equivalent simplified model of a dynamic characteristic of the variable-flux motor 4 can be expressed with Math. (1). This model is a model on a DQ-axes rotating coordinate system with the D-axis oriented in the direction of magnet flux and the Q-axis in a direction orthogonal to the D-axis.

[Math. 1]

$$\begin{bmatrix} Vd \\ Vq \end{bmatrix} = \frac{d}{dt} \times \begin{bmatrix} Ld & 0 \\ 0 & Lq \end{bmatrix} \times \begin{bmatrix} Id \\ Iq \end{bmatrix} + \begin{bmatrix} R1 & -\omega 1 \times Lq \\ \omega 1 \times Ld & R1 \end{bmatrix} \times \begin{bmatrix} Id \\ Iq \end{bmatrix} + \begin{bmatrix} 0 \\ \omega 1 \times (\Phi FIX + \Phi VAR) \end{bmatrix} \quad (1)$$

Here, R1 is coil resistance, Ld is D-axis inductance, Lq is Q-axis inductance, ΦFIX is a (linkage) flux amount of the fixed magnet, ΦVAR is a (linkage) flux amount of the variable magnet, and ω1 is an inverter frequency.

Next, control by the variable-flux motor drive system for the variable-flux motor 4 will be explained with reference to FIG. 1. A run command generate unit 16 of the variable-flux motor drive system receives a run command Run* and a protect signal PROT from a protection test unit 17. Based on the run command Run* and the protect signal PROT from the protection test unit 17, the run command generate unit 16 generates and outputs a run state flag Run.

Basically, the run state flag Run is set to a run state (Run=1) when the run command Run* is input (Run*=1). If the run command instructs a stoppage (Run*=0), the run state flag Run is set to a stop state (Run=0). These states occur when the protection test unit 17 determines that it is not protective but is normal (PROT=0). If the protection test unit 17 determines that it is protective (PROT=1), the run state is set to the stop state (Run=0) even if the run command Run* is "1."

The run command generate unit 16 generates a torque permission flag TrqON to permit the application of torque (torque application is permitted if TrqON=1 and is not permitted if TrqON=0). If the run command Run* changes from "0" to "1," a magnetization process is carried out. While the magnetization process is in progress, a magnetization completion flag FCCmp is "1." Once the magnetization is completed, i.e., when the magnetization completion flag FCCmp changes from "1" to "0," the torque permission flag TrqON becomes "1." This is to raise torque after the completion of magnetization.

To the contrary, if the run command Run* changes from "1" to "0" to instruct a stoppage, the torque permission flag is set as TrqON=0 to zero the torque command Tm*. Thereafter, the run state flag Run is set to the stop state (Run=0). This relationship will be explained later.

If the torque permission flag TrqON=0, the torque command generate unit 38 generates the torque command Tm* having a target value of zero, and if TrqON=1, the torque command Tm* having a target torque value. For a transient state of the torque command, a rate of change of the torque command may be limited, or it may be responded by first order system, depending on an application. In some cases, it may be changed step by step.

The gate command generate unit 15 receives the run state flag Run and generates and outputs a gate command Gst for switching elements incorporated in the inverter 1. If the run state flag Run changes from stoppage (=0) to run (=1), the gate command generate unit 15 instantaneously set a gate start state (Gst=1), and if the run state flag Run changes from run (=1) to stoppage (=0), sets a gate off state (Gst=0) after a predetermined time. Turning off the gate after the predetermined time is to magnetize the variable magnet 53 to a predetermined value, so that the magnet may freely run, as will be explained later.

The flux command operate unit 12 receives the run state flag Run and the inverter frequency ω1, i.e., the rotor rotational frequency ωR and generates and outputs a flux command Φ* according to, for example, the below-mentioned expression. This embodiment conducts control with the rotational angle sensor (resolver) 18. Accordingly, the rotational angle sensor 18 detects an angle θ, which is differentiated by the pseudo differentiator 8 into a rotor rotational frequency serving as the inverter output frequency ω1.

[Math. 2]

If(Run=0)Φ*=Φmin

Else if(|ω1|<ωA)Φ*=Φmax

Else Φ*=Φmin  (2)

Here, Φmin is a minimum flux amount (>0) to be taken by the variable-flux motor, Φmax is a maximum flux amount to be taken by the variable-flux motor, and ωA is a predetermined rotational frequency.

If the run state flag Run shows a stop state (Run=0), the flux command Φ* is set to the minimum Φmin. If it shows a run state (Run=1) and if the rotational frequency ωR is lower than the predetermined value, the flux command D is set to the maximum Φmax. If the speed is higher than the predetermined value, the flux command is set to the minimum Φmin. Setting the flux amounts Φmin and Φmax will be explained later.

A current reference operate unit 11 receives the torque command Tm* and flux command Φ* and calculates a D-axis current reference IdR and a Q-axis current reference IqR as follows:

[Math. 3]

$$IdR = 0 \quad (3)$$

$$IqR = Tm^*/\Phi^* \quad (4)$$

Here, the expressions (3) and (4) are operational expressions (the number of motor pole pairs is one) assuming that reluctance torque of the variable-flux motor 4 is not used. The motor may be any one of a salient motor having a difference ΔL between the D-axis inductance Ld and the Q-axis inductance Lq and a non-salient motor having no such difference.

To optimize efficiency or maximize output with a predetermined current, considering the reluctance torque is effective. In this case, the following expression is used:

[Math. 4]

$$IqR = (-\Phi^* + \sqrt{\Phi^{*2} - 4 \times (Ld-Lq) \times K \times Tm^*})/2 \times (Ld-Lq) \times K \quad (5)$$

$$IdR = K \times IqR \quad (6)$$

Here, K is a ratio of a D-axis current to a Q-axis current that may vary depending on the above-mentioned optimization of efficiency and the maximization of output. For the optimization, the expression becomes a function whose arguments include torque, speed, and the like and is generally used through a simple approximation or as a table.

A magnetization request generate unit 29 sets a magnetization request flag FCReq to "1" if the flux command Φ* or the run state flag Run changes, and in the other cases, to "0."

Figure 6:
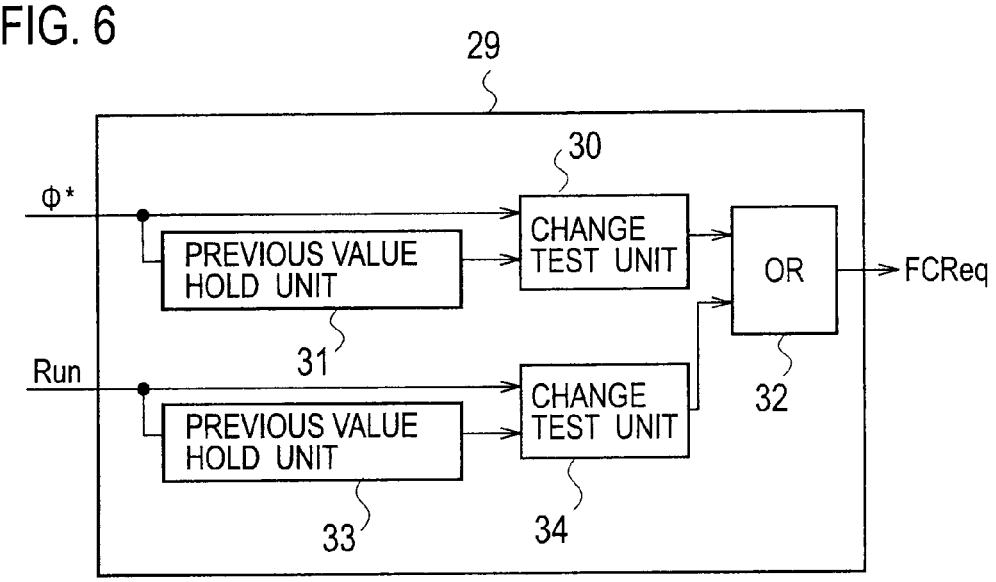
FIG. 6 is a block diagram showing an internal configuration of a magnetization request generate unit according to the first embodiment of the present invention.

FIG. 6 shows a configuration of the magnetization request generate unit 29, in which 31 and 33 each are a previous value hold unit, 30 and 34 each are a change test unit, and 32 is an OR circuit.

A previous value of the flux command Φ* is held by the previous value hold unit 31. An output from the previous value hold unit 31 is a flux command Φ* stored last time and is sent to the change test unit 30 together with a flux command value Φ* of this time. The change test unit 30 compares the two inputs with each other, and if there is a change between the flux command values Φ*, outputs "1." If there is no change, it outputs "0." Namely, only when the flux command Φ* changes, it outputs "1." A similar circuit configuration is prepared for the run state flag Run in place of the flux command Φ*. Outputs from the two change test units 30 and 34 are supplied to the OR circuit 32, which provides an OR of the two inputs as the magnetization request flag FCReq.

The magnetization request flag FCReq, i.e., the output from the magnetization request generate unit 29 becomes "1" (magnetization request) if the flux command Φ* or the run state flag Run changes and "0" (no magnetization request) in the other cases. The run state flag Run changes, for example, when the inverter starts to operate, or when it stops, or when it is stopped for protection. Although the embodiment employs the flux command Φ*, a change in a magnetizing current command Im* (an output from a magnetizing current table 27) of a variable flux control unit 13 (to be explained later) may be used to generate the magnetization request FCReq.

Figure 7:
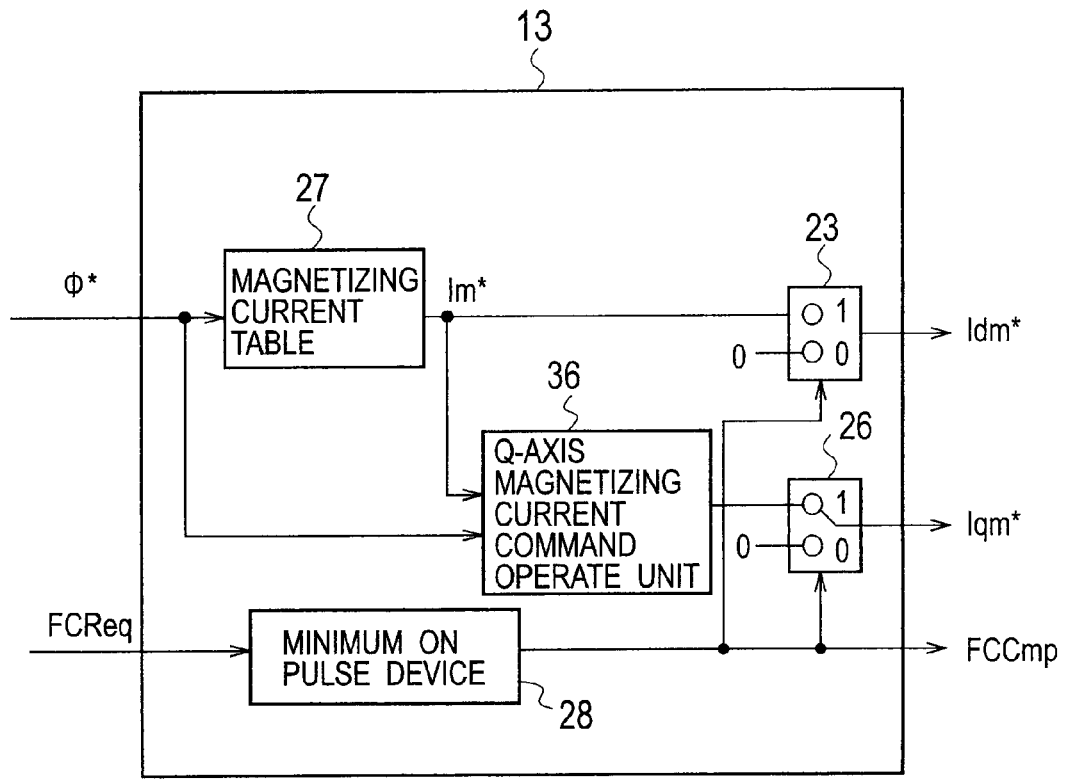
FIG. 7 is a block diagram showing an internal configuration of a variable flux control unit according to the first embodiment of the present invention.

Next, the variable flux control unit 13 changes flux by a magnetizing current from the inverter 1 and magnetizes the variable magnet. FIG. 7 is a block diagram showing the variable flux control unit 13. The variable flux control unit 13 receives the flux command Φ*, i.e., the output from the flux command operate unit 12 and calculates and outputs a D-axis magnetizing current command Idm* and a Q-axis magnetizing current command Iqm*. This generation process will be explained later.

To magnetize the variable magnet, a predetermined magnetizing current command Im* is obtained according to the BH characteristic of the variable magnet shown in FIG. 4. In particular, the magnitude of the magnetizing current command Im* is set to be equal to or larger than Hlsat, i.e., within a magnetization saturation zone Y of the variable magnet 53.

To pass a magnetizing current up to the saturation zone of a magnetic material, the flux amounts Φmin and Φmax set by the flux command operate unit 12 are calculated by adding a positive or negative maximum (saturated) flux value (flux density) of the variable magnet 53 to that of the fixed magnet. Namely, with the positive maximum flux amount (the absolute value of a negative maximum flux amount being equal to that of the positive maximum flux amount) of the variable magnet being ΦVARmax and the flux amount of the fixed magnet being ΦFIX, the following calculations are carried out:

[Math. 5]

$$\Phi min = \Phi FIX - \Phi VARmax \quad (7)$$

$$\Phi max = \Phi FIX + \Phi VARmax \quad (8)$$

The flux command Φ* is used to look up the magnetizing current table 27 storing corresponding magnetizing currents and obtain a magnetizing current command Im* for the flux command Φ*. Basically, the magnetization direction of a magnet is in the direction of the D-axis, and therefore, the magnetizing current Im* is given as a magnetizing current Idm* for the D-axis.

However, the permanent-magnet synchronous motor frequently causes a difference between the D-axis inductance Ld and the Q-axis inductance Lq, to generate reluctance torque. Passing a D-axis current results in generating torque. In particular, this is conspicuous in the case of a permanent-magnet reluctance motor (PRM motor) that achieves a wide range of speeds. For magnetization, a current value equivalent to a rated current or larger is needed. Accordingly, a magnetization process will instantaneously cause large reluctance torque. Even a non-salient motor will cause partial magnetic saturation when the above-mentioned excessively large magnetizing current is passed. Namely, passing a magnetizing current for magnetization causes a transient torque shock to induce mechanical vibrations that are not preferable for vehicles and electric trains because they badly affect comfortableness.

To avoid this, not only the D-axis magnetizing current but also a Q-axis magnetizing current that is irrelevant to magnetization but contributes to reduce torque must be passed. This suppresses the generation of the instantaneous reluctance torque. Generally, the torque of a permanent-magnet synchronous motor is expressed as follows:

[Math. 6]

$$Tm = \Phi \times Iq + (Ld - Lq) \times Id \times Iq \quad (9)$$

When the D-axis magnetizing current Idm is passed, the condition not to generate torque is as follows:

[Math. 7]

$$Iq = Tm/(\Phi + (Ld - Lq) \times Id) \quad (10)$$

Then, the following is obtained with the use of the magnetizing current command:

[Math. 8]

$$Iq^* = Tm/(\Phi^* + (Ld - Lq) \times Idm^*) \quad (11)$$

Here, there is a problem whether the flux command Φ* must be set before a flux change, or after the flux change, or intermediately. The magnetizing of a variable magnet is complicated and is uncontrollable collectively. It must be adjust in a real machine. For this, the flux command of the expression (11) may be stored in a table according to measurements of actual machines. Alternatively, D-axis magnetizing current commands Idm* and Q-axis magnetizing current commands Iqm* that may reduce discontinuous torque are found by examining actual machines and are used to prepare a function or a table.

In FIG. 7, a Q-axis magnetizing current command operate unit 36 receives the magnetizing current command Im* (i.e., the D-axis magnetizing current command Idm*) and generates and outputs a Q-axis magnetizing current command. A switch 26 outputs the Q-axis magnetizing current command Iqm* only when the magnetization completion flag FCCmp=1, i.e., only during a magnetization process, and when the magnetization completion flag FCCmp=0, i.e., after the completion of the magnetization process, outputs zero. According to the expression (11) or as mentioned above, the Q-axis magnetizing current command operate unit 36 may have a table or a function that provides a Q-axis current command for reducing transient torque actually measured on actual machines. A switch 23 operates like the switch 26. When the magnetization completion flag FCCmp=1, the switch 23 outputs the D-axis magnetizing current command Idm*, and when the magnetization completion flag FCCmp=0, it outputs zero.

In FIG. 7, the magnetization request flag FCReq for requesting to change flux becomes a switching request state (=1) at least instantaneously. To surely change flux, the magnetization request flag FCReq is sent to a minimum ON pulse device 28, which outputs the magnetization completion flag FCCmp (=1 during magnetization and =0 at the completion of magnetization). This flag has a function not to become OFF (=0) once it becomes ON (=1). If the magnetization request flag keeps ON (=1) over a predetermined time, the magnetization completion flag FCCmp becomes OFF as soon as the magnetization request flag FCReq becomes OFF. In this way, the magnetization process is continued only for a predetermined period, to surely carry out magnetization.

A switch 37 of FIG. 1 receives the magnetization completion flag FCCmp. If it is during magnetization (the magnetization completion flag FCCmp=1), the switch 37 outputs the D- and Q-axis magnetizing current commands Idm* and Iqm* from the variable flux control unit 13 as the D- and Q-axis current commands Id* and Iq*. If the magnetization is completed (the magnetization completion flag FCCmp=0), the switch 37 outputs the D- and Q-axis current references IdR and IqR from the current reference operate unit 11 as the D- and Q-axis current commands Id* and Iq*.

According to the D- and Q-axis current commands Id* and Iq* thus provided, the voltage command operate unit 10 generates D- and Q-axis voltage commands Vd* and Vq* to pass currents conforming to the D- and Q-axis current commands Id* and Iq*. The coordinate convert unit 5 converts the voltage commands into three-phase voltage commands Vu*, Vv*, and Vw*, which are used by the PWM circuit 6 to generate gate signals and the like.

Figure 8:
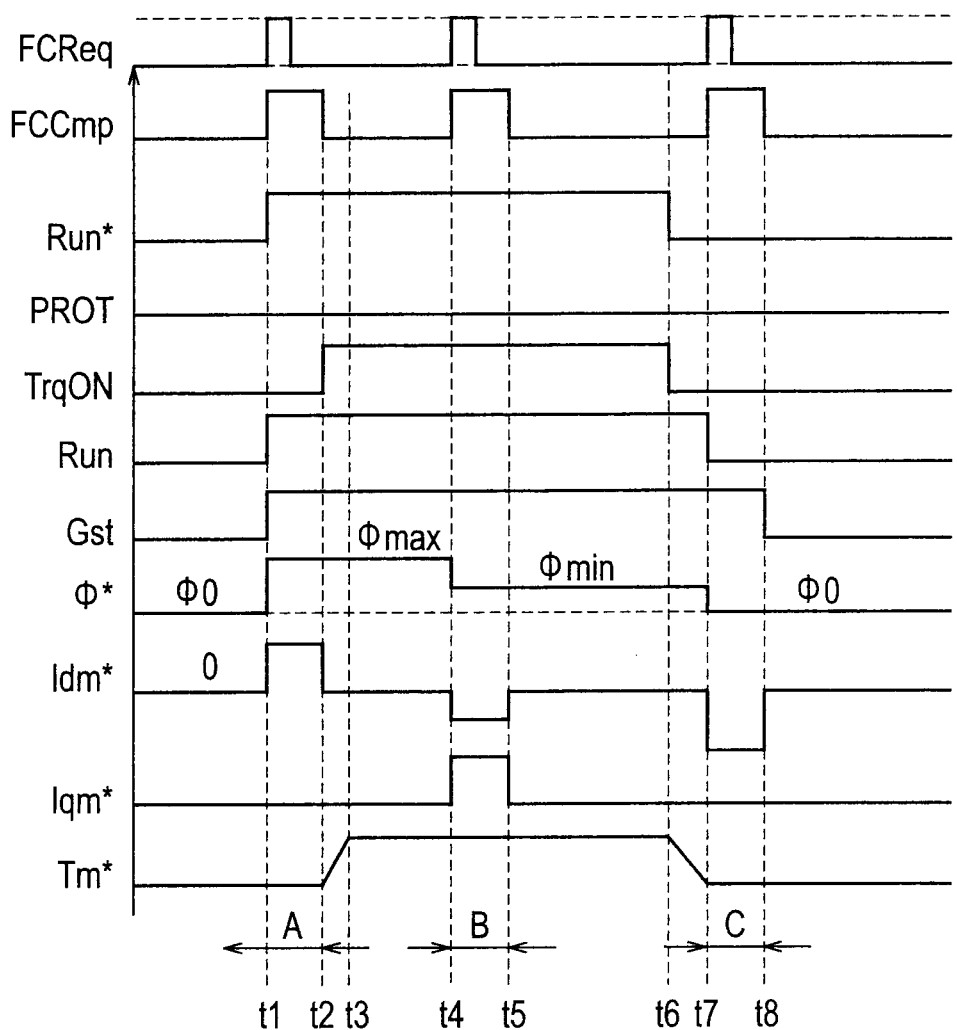
FIG. 8 is a timing chart showing an example of operation of the variable-flux motor drive system according to the first embodiment of the present invention.

FIG. 8 is a timing chart showing operation of the variable-flux motor drive system according to the first embodiment. FIG. 8 shows a state in which the protect signal PROT is not established. At a time point t1, the run command Run* is input. Then, the run state flag Run rises and the flux command Φ* changes from Φ0 to Φmax. In response to the changes in the run state flag Run and flux command Φ*, the magnetization request flag FCReq rises and the magnetization completion flag FCCmp keeps an ON state for a predetermined time (from t1 to t2). Only during the period of FCCmp=1 indicative of magnetization, the D-axis magnetizing current command Idm* has a value.

When the magnetization completion flag FCCmp changes from "1" to "0" at the time point t2, the torque permission flag TrqON becomes "1," and from the time point t2, the torque command Tm* rises. Namely, the torque command Tm* does not rise until the magnetization completion flag FCCmp becomes 0 at the completion of magnetization just after the start of operation. In this case, the torque command Tm* rises between the time point t2 and a time point t3.

At a time point t4, the flux command Φ* changes from Φmax to Φmin. Then, the magnetization request flag FCReq rises and the magnetization completion flag FCCmp rises and keeps an ON state for a predetermined time (from t4 to t5). Only during the period in which the magnetization completion flag FCCmp is "1" to indicate magnetization, the D-axis magnetizing current command Idm* and Q-axis magnetizing current command Iqm* have values.

Next, at a time point t6, the run command Run* stops, the torque permission flag TrqON changes from "1" to "0," and the torque command Tm* falls from the time point t6 to a time point t7. When the torque command Tm* becomes zero at the time point t7, the run state flag Run changes from "1" to "0" and the flux command Φ* changes from Φmin to Φ0. Also, the magnetization request flag FCReq rises and the magnetization completion flag FCCmp rises and secures an ON state for a predetermined time (from t7 to t8). Only during the period in which the magnetization completion flag FCCmp is "1" to indicate magnetization, the D-axis magnetizing current command Idm* has a value.

According to the expression (11), the Q-axis magnetizing current command is zero during the magnetization process A (from t1 to t2) and during the magnetization process C (from t7 to t8) and has a value only during the magnetization process B (from t4 to t5).

The variable-flux motor 4 passes an excessively large current in magnetization, and therefore, more or less generates transient torque. This torque shock may cause mechanical vibrations. Such an excessively large current must be minimized to reduce losses and the stress of elements. For this, the first embodiment carries out a magnetization process under specific conditions, to minimize the torque shock, losses, and the stress of switching elements of the inverter 1.

The first embodiment carries out a magnetization process just after the start of the inverter 1, so that a magnetized state of the variable magnet 53 can be determined before applying torque. The magnetized state of the variable-flux motor 4 is unknown, for example, just after a power source is turned on and may vary due to some reasons during the motor 4 is in a free run state. If a DC voltage of the inverter 1 drops and if a voltage induced by total flux exceeds the DC voltage, the variable magnet motor 4 passes a current to the inverter 1 even if the inverter 1 is stopped. This may change the magnetized state of the motor 4. To minimize the voltage induced in the free run state, a flux amount that is not used for a normal run operation may be set for the motor 4 before stopping the inverter 1. In this case, flux amount necessary for the normal running operation must be set for the motor 4 at the start of the inverter 1.

Since a magnetized state (flux amount) before starting the inverter 1 is unknown, the first embodiment determines the magnetized state and starts operation. As a result, the first embodiment causes no torque shortage due to an insufficient total flux amount, or never sets an actual flux amount different from a flux amount specified by the control unit, thereby securing a torque accuracy.

In addition, the first embodiment raises the torque command Tm* after the completion of magnetization just after the start of the inverter. As explained above, passing a Q-axis magnetizing current together with a D-axis magnetizing current can reduce transient torque. However, it is unable to accurately determine the amount of the Q-axis magnetizing current that can correctly suppress the generation of the transient torque. On the other hand, only when the torque command Tm* is zero, i.e., only when the Q-axis magnetizing current Iq is zero, reluctance torque that mainly causes a torque shock does not occur, and therefore, a smooth start is achieved. Raising the torque command just after the start of the inverter 1 and after the completion of magnetization can realize a smooth start without a torque shock.

The first embodiment carries out a magnetization process after the run command stops, i.e., after the application of torque becomes unnecessary, and at the completion of the magnetization process, turns off the gate of the inverter 1.

During the high-speed running of, for example, an electric train, there is a free run state or an inertial state in which the inverter 1 is stopped to reduce a loss. At this time, if variable flux is large, a large voltage will be induced. If the induced voltage exceeds an inverter DC voltage, i.e., a trolley voltage, the variable-flux motor 4 passes a current to the inverter 1 even if the inverter is stopped. This means to absorb kinetic energy from the variable-flux motor 4 and applies a braking force to the vehicle. This is, therefore, not preferable. If the speed and flux amount are high, the induced voltage may exceed the withstand voltage of the inverter 1 or of the power source side of the inverter, to break components. It is preferable for the sake of safety to zero total flux and conduct a free running operation.

In this way, decreasing flux just before stopping the inverter 1 results in suppressing the generation of an induced voltage in a free running operation, preventing the application of braking force, and avoiding the breakage of components due to an overvoltage.

In particular, the first embodiment carries out a magnetization process by selecting a flux amount whose absolute value is closer to zero from among flux amounts expressed with variable flux and fixed flux. The first embodiment controls three flux levels and selects one having a smallest absolute value from among them. This technique can minimize the generation of an induced voltage. The same is applicable to two flux levels using one variable magnet 53 and one fixed magnet 54 and to four or more flux levels using a plurality of variable magnets 53.

The variable magnet 53 may not be used up to a saturation zone. Namely, the variable magnet 53 may be used at an optional intermediate value between a positive maximum and a negative maximum. This may reduce total flux as close to zero as possible.

The motor may be designed so that the total flux of the variable magnet 53 becomes equal to that of the fixed magnet 54. In this case, the variable magnet 53 is used in the saturation zone Y and the total flux can be zeroed.

The first embodiment carries out magnetization at the time of starting the inverter and at the time of stopping the inverter with the torque command being set to zero. This is because a magnetization process passes an excessively large current, and therefore, unavoidably generates transient torque. A salient reluctance motor steadily passes a Q-axis current, and therefore, generates large transient torque due to an excessively large magnetizing current, thereby inducing mechanical vibrations and deteriorating comfortableness in the case of an electric train or HEV. In a zero-torque state, even the reluctance motor passes no Q-axis current, and therefore, the generation of transient torque will be minimized when an excessively large magnetizing current is passed in the D-axis direction.

In a torque applied state, too, transient torque is reducible depending on a magnetizing current. Originally, a magnetization process is carried out by passing a current in the D-axis direction. In a salient machine, the D-axis current changes torque if there is a Q-axis current. Even a non-salient machine frequently passes an excessively large current over a rated current when carrying out magnetization. This may cause an instantaneous magnetic saturation, to generate transient torque like the salient machine. To suppress this, a Q-axis current is passed as a magnetizing current together with the D-axis current. The Q-axis current can suppress the transient torque, as is apparent from the expression (11).

In this way, passing a Q-axis current together with a D-axis current results in minimizing transient torque that accompanies a magnetization process, thereby preventing mechanical vibrations, and when applied to electric trains and HEVs, securing comfortableness.

The magnetization process suddenly changes flux and the excessively large magnetizing current varies equivalent parameters of a motor. Accordingly, it is difficult to calculate a Q-axis current in advance according to the expression (11). It is necessary, therefore, to determine a Q-axis current on an actual machine. Namely, a D-axis current necessary for a magnetization process is determined, and then, a Q-axis current is determined so as to suppress transient torque. The determined currents are stored as data in a table, which is used in practice.

Figure 9:
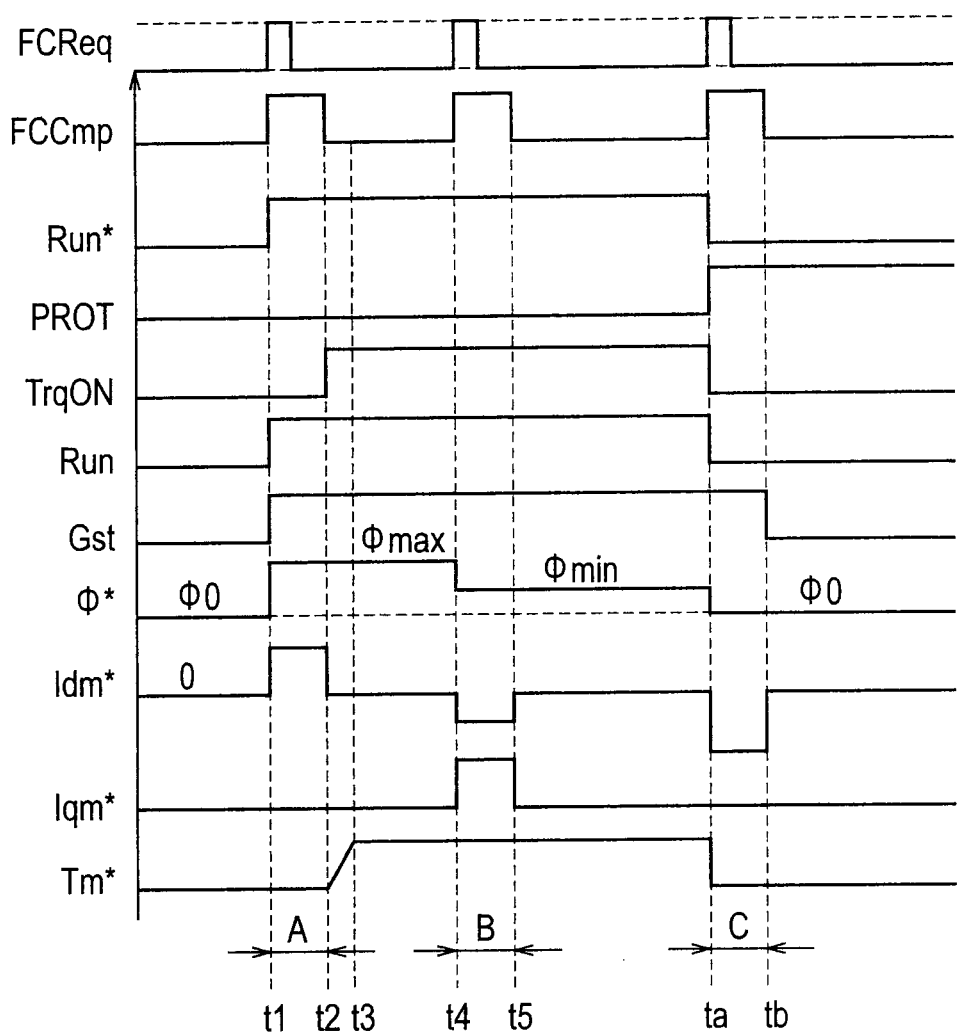
FIG. 9 is a timing chart showing another example of operation of the variable-flux motor drive system according to the first embodiment of the present invention.

FIG. 9 is a timing chart showing another example of operation of the variable-flux motor drive system according to the first embodiment. In FIG. 9, the protect signal PROT is established at a time point ta. Instead of the run command Run* instructing a stoppage, the protect signal PROT stops the inverter.

The protect signal PROT detects a protective operation at the time point ta and changes from "0" to "1." In this state, the run command Run*, run state flag Run, and torque permission flag TrqON simultaneously turn off. The gate command Gst keeps an ON state to carry out a magnetization process. Namely, from ta to tb, the magnetization process is carried out and the flux command Φ* is provided to bring the absolute value of flux as close to zero as possible.

In this way, the inverter 1 is not stopped at once when the protect signal PROT changes from "0" to "1." Instead, the inverter 1 is gated off after reducing total flux. In a state that the cause of the protection is unknown, this technique can reduce the possibility of a secondary failure due to a voltage induced during the gating-off operation. Any protection needs no notch-off after the magnetization process.

(Second Embodiment)

Figure 10:
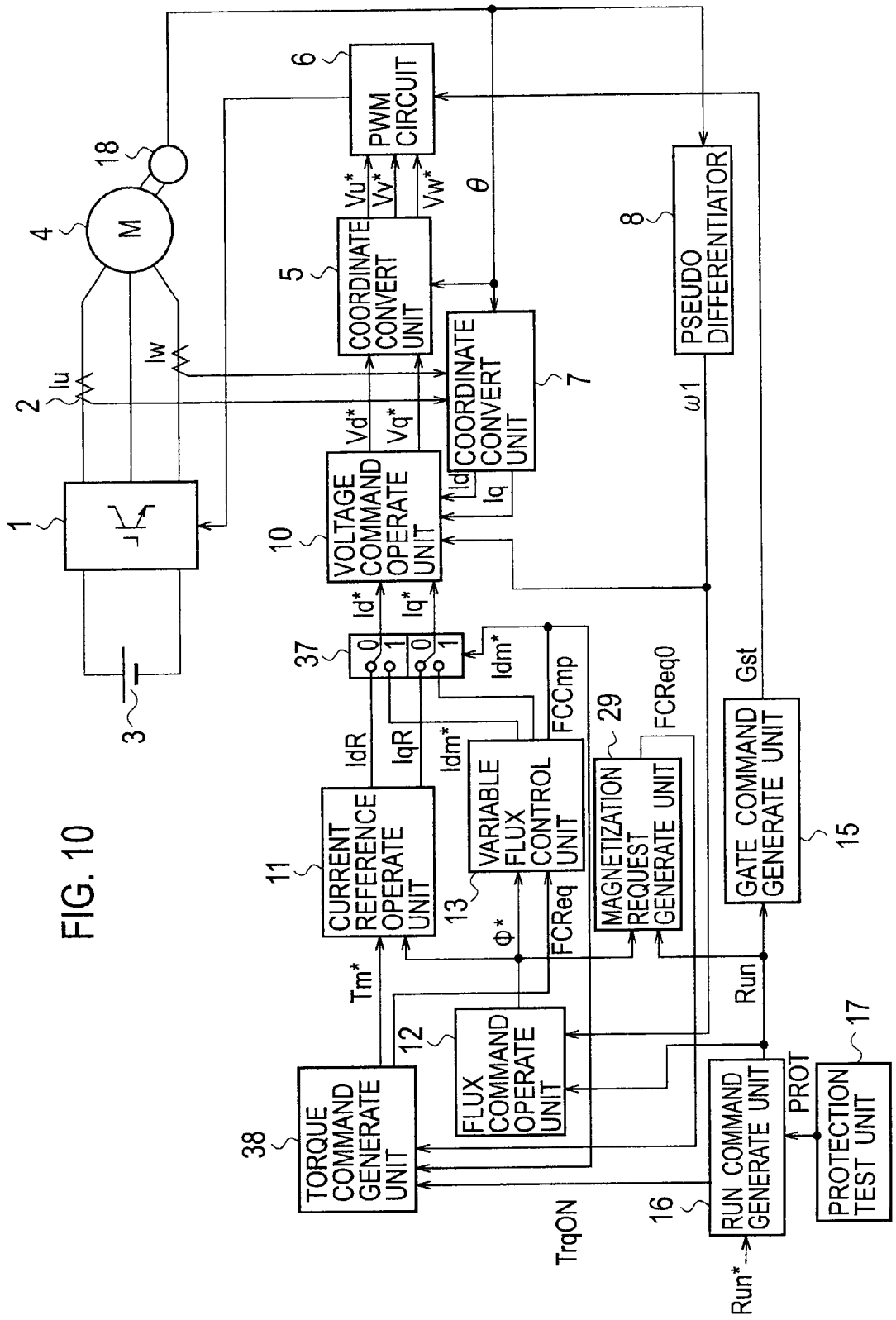
FIG. 10 is a block diagram showing a variable-flux motor drive system according to a second embodiment of the present invention.

FIG. 10 is a block diagram showing a variable-flux motor drive system according to the second embodiment of the present invention. The second embodiment differs from the first embodiment shown in FIG. 1 in that a magnetization request generate unit 29 generates a preliminary magnetization request flag FCReq0 to be supplied to a torque command generate unit 38 instead of the magnetization request flag FCReq to be supplied to the variable flux control unit 13 and that the torque command generate unit 38 receives, in addition to a torque permission flag TrqON, the preliminary magnetization request flag FCReq0 and a magnetization completion flag FCCmp and generates, in addition to a torque command Tm*, a magnetization request flag FCReq. Namely, the torque command generate unit 38 prepares the torque command Tm* to reduce torque when magnetizing a variable magnet, and after reducing torque, provides the variable flux control unit 13 with the magnetization request flag FCReq. Accordingly, the variable flux control unit 13 operates to reduce torque and then magnetize the variable magnet. The same elements as those of FIG. 1 are represented with the same reference marks, to omit repetitive explanations.

According to the first embodiment shown in FIG. 1, an output signal from the magnetization request generate unit 29 is the magnetization request flag FCReq. According to the second embodiment shown in FIG. 10, the magnetization request generate unit 29 outputs the preliminary magnetization request flag FCReq0. This preliminary magnetization request flag FCReq0 is supplied, together with the torque permission signal TrqON and magnetization completion flag FCCmp, to the torque command generate unit 38.

Figure 11:
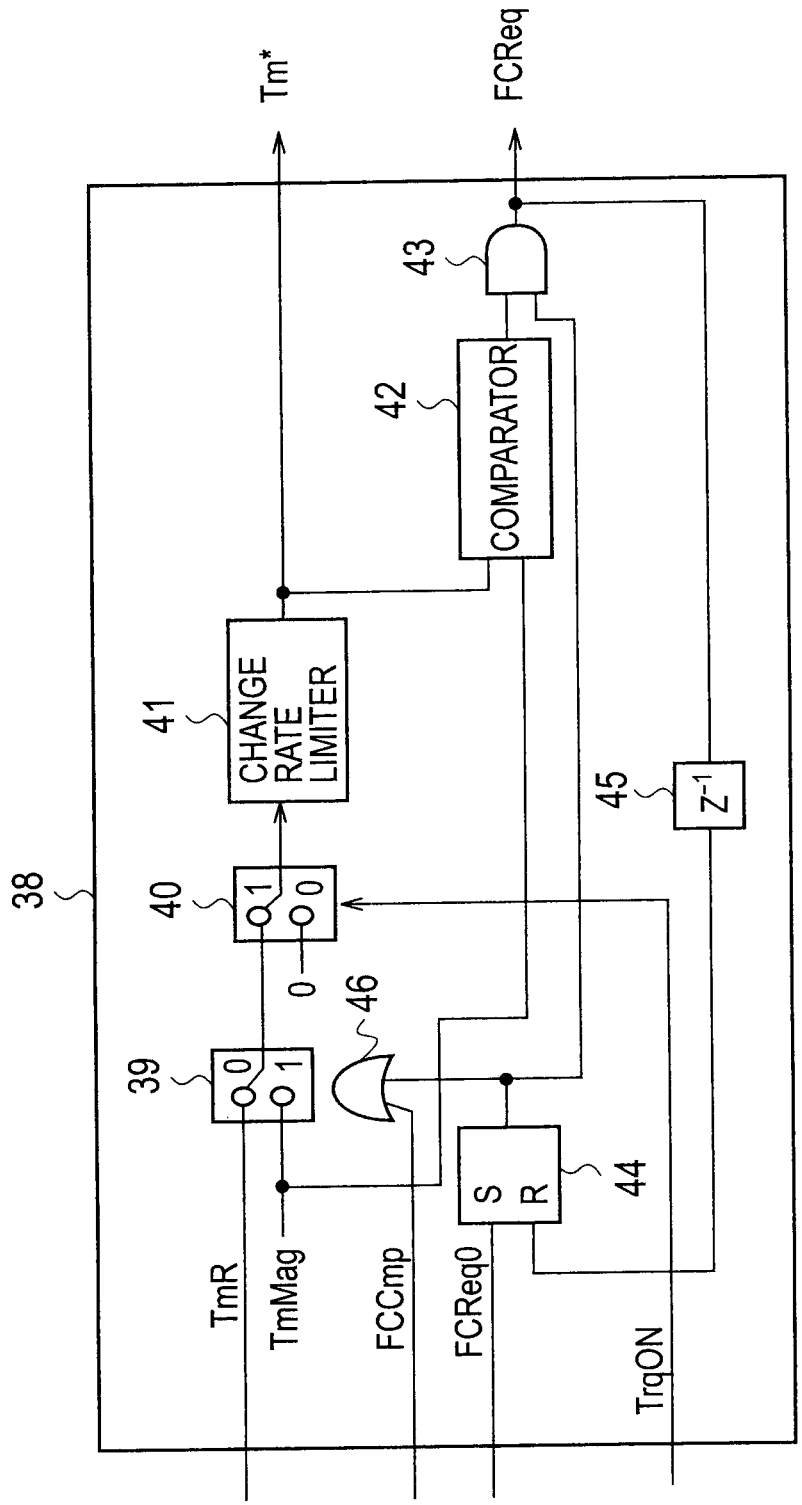
FIG. 11 is a block diagram showing an internal configuration of a torque command generate unit according to the second embodiment of the present invention.

FIG. 11 is a block diagram showing the torque command generate unit 38 according to the second embodiment. If the preliminary magnetization request flag FCReq0 is "1," i.e., if there is a request to change flux, an RS flip-flop 44 is set. An output from the RS flip-flop 44 is sent through an OR circuit 46 to a switch 39. The OR circuit 46 also receives the magnetization completion flag FCCmp.

When an output from the OR circuit 46 is "1," the switch 39 changes its output from a torque reference TmR to a predetermined magnetization torque reference TmMag. A switch 40 carries out a switching operation in response to the torque permission flag TrqON. If the torque permission flag TrqON is "1," the switch 40 selects the output from the switch 39, and if it is "0," selects "0."

If the output from the OR circuit 46 is "1" and if the switch 39 selects the predetermined magnetization torque reference TmMag with the torque permission flag TrqON being in a torque permit state (=1), the switch 40 selects and outputs the magnetization torque reference TmMag. An inclination of this magnetization torque reference TmMag is limited by a change rate limiter 41, to gradually change the torque command Tm*. A comparator 42 checks to see if the torque command Tm* and the magnetization torque command TmMag are equal to each other. If they are equal to each other, "1" is provided, and if not, "0" is provided. The output from the comparator 42 and the output from the RS flip-flop 44 are supplied to an AND circuit 43, which outputs an AND of the inputs as the magnetization request flag FCReq.

Namely, the change rate limiter 41 gradually changes the torque command Tm*. When the torque command Tm* becomes equal to the magnetization torque command TmMag, the magnetization request flag FCReq is set for a magnetization request (=1). The magnetization request flag FCReq is also input to a delay circuit 45, which provides an output delayed by one control period. The output from the delay circuit 45 is input to a reset terminal of the RS flip-flop 44. Namely, the magnetization request flag FCReq rises for one control period (=1), and then, is reset (=0).

The magnetization request flag FCReq from the torque command generate unit 38 is input to the variable flux control unit 13, to carry out a magnetization process like the first embodiment. The magnetization completion flag FCCmp from the variable flux control unit 13 is supplied to the OR circuit 46 of the torque command generate unit 38. As long as the variable flux control unit 13 is in a magnetizing state (the magnetization completion flag FCCmp=1), the torque command Tm* is fixed to the magnetization torque command TmMag. As soon as the magnetization is completed (FCCmp=0), the torque command Tm* is gradually increased toward the torque reference TmR by the action of the change rate limiter 41.

Figure 12:
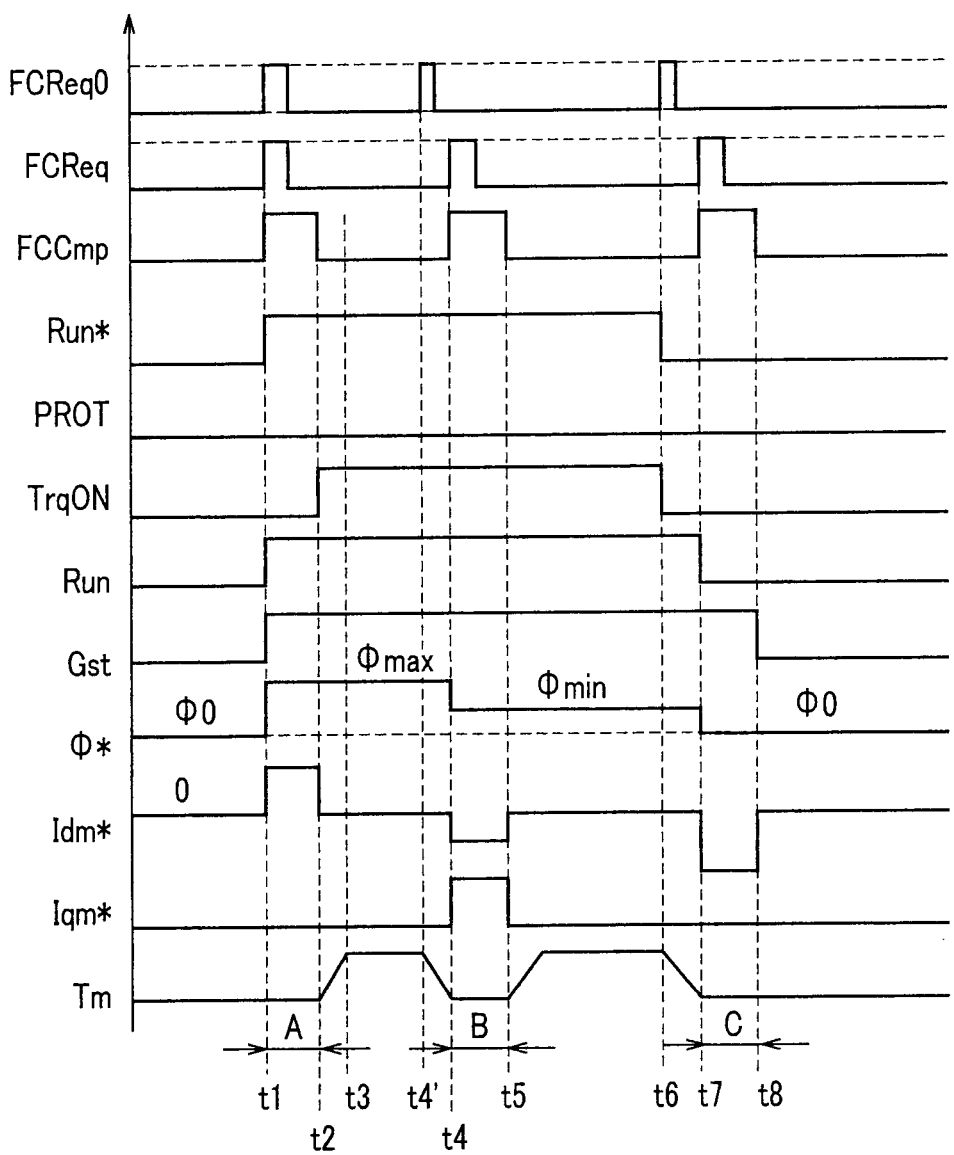
FIG. 12 is a timing chart showing an example of operation of the variable-flux motor drive system according to the second embodiment of the present invention.

FIG. 12 is a timing chart showing an example of operation of the variable-flux motor drive system according to the second embodiment. FIG. 12 shows a case in which the magnetization torque command TmMag is 0.

For example, a magnetization process B (t4 to t5) will be explained. According to the preliminary magnetization request flag FCReq0, the torque command Tm* is decreased toward zero between a time point t4' and the time point t4. When the torque command Tm* becomes zero at the time point t4, the magnetization request flag FCReq rises to start the magnetize process. Until the magnetization process is completed (until FCCmp changes from 1 to 0), the torque command Tm* is maintained at the magnetization torque command=0.

In this way, the magnetization process is carried out by decreasing the torque command Tm* to the magnetization torque command TmMag. Accordingly, even a reluctance motor can minimize transient torque when an excessively large magnetizing current is passed in the D-axis direction because a Q-axis current is zero under a zero torque state.

(Third Embodiment)

Figure 13:
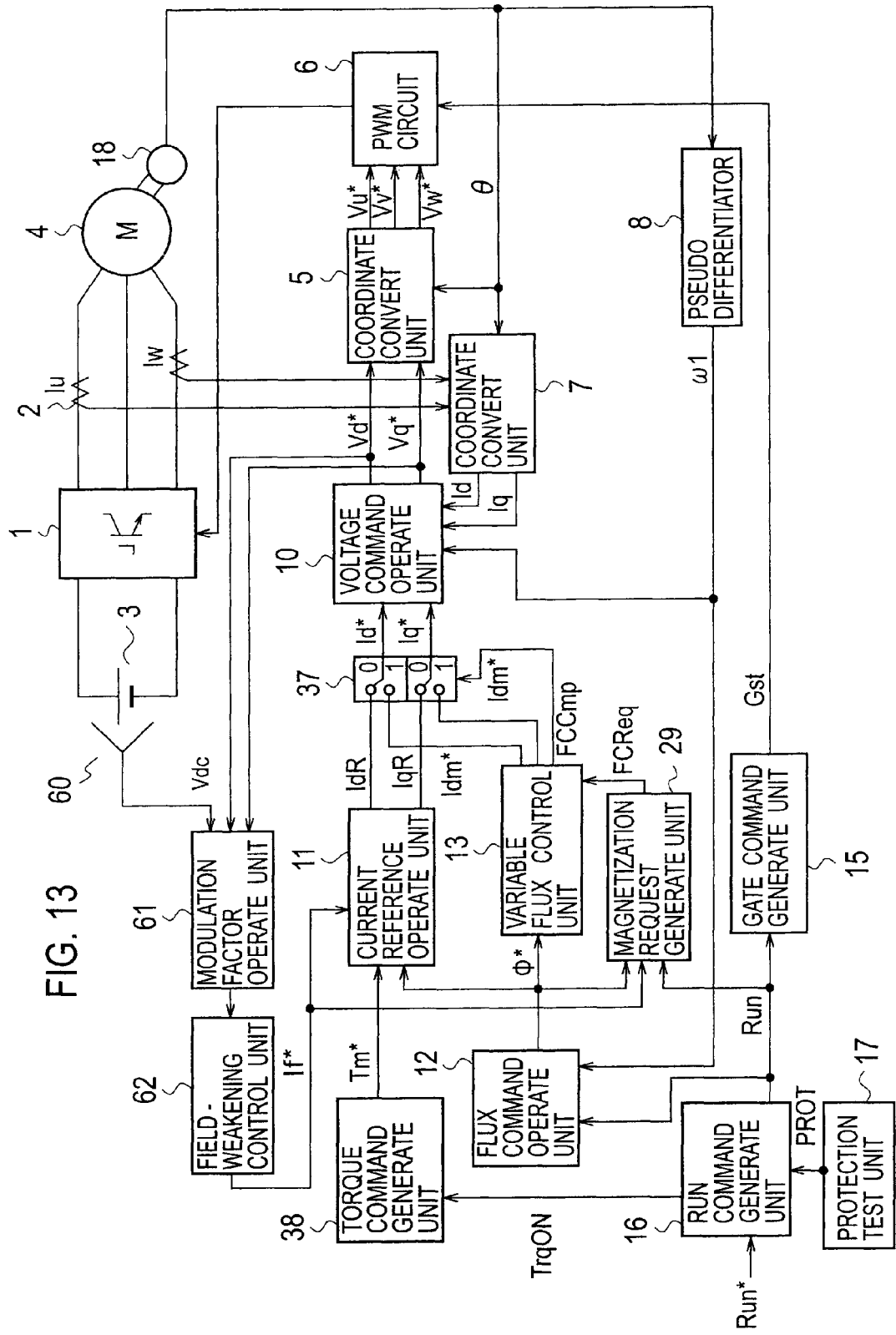
FIG. 13 is a block diagram showing a variable-flux motor drive system according to a third embodiment of the present invention.

FIG. 13 is a block diagram showing a variable-flux motor drive system according to the third embodiment of the present invention. The third embodiment differs from the first embodiment shown in FIG. 1 in that it additionally has a modulation factor operate unit 61 and a field-weakening control unit 62, an output signal from the field-weakening control unit 62 being supplied to a magnetization request generate unit 29. As a result, the magnetization request generate unit 29 generates a magnetization request based on a modulation factor of an inverter 1. The same elements as those of FIG. 1 are represented with the same reference marks, to omit repetitive explanations.

In FIG. 13, a DC voltage Vdc of the inverter 1 is detected by a DC voltage detector 60 and is supplied to the modulation factor operate unit 61. The modulation factor operate unit 61 receives the DC voltage Vdc and D- and Q-axis voltage commands Vd* and Vq* from a voltage command operate unit 10. Based on the D- and Q-axis voltage commands Vd* and Vq*, the modulation factor operate unit 61 calculates a voltage command magnitude V1* on a DQ-axes coordinate system as follows:

[Math. 9]

$$V1* = \sqrt{Vd*^2 + Vq*^2} \quad (12)$$

Based on the DC voltage Vdc, the modulation factor operate unit 61 calculates a maximum DQ-axes voltage V1max to be provided by the inverter 1 according to the below-mentioned expression. This maximum output is achieved in a one-pulse mode.

[Math. 10]

$$V1max = \frac{\sqrt{6}}{\pi} \cdot Vdc \quad (13)$$

A modulation factor AL is expressed as mentioned below. The modulation factor operate unit 61 outputs the modulation factor AL. The modulation factor AL is a value between 0 and 1.

[Math. 11]

$$AL = \frac{V1*}{V1max} \quad (14)$$

The field-weakening control unit 62 receives the modulation factor AL from the modulation factor operate unit 61, and if the modulation factor AL is above a predetermined maximum modulation factor ALmax, corrects and controls D- and Q-axis currents so as to equalize AL with ALmax. This is the field weakening control. The predetermined maximum modulation factor is an optional value and never exceeds 1. An example of the field-weakening control calculates a correction amount If* for D- and Q-axis currents as follows:

[Math. 12]

$$If* = \frac{Kp \cdot s + Ki}{s} \cdot (AL - ALmax) \quad (15)$$

Here, s is a Laplace operator, Kp is a proportional gain, and Ki is an integral gain. If* is confined in a range above 0. The above-mentioned expression controls the compensation current command If* for field-weakening so that the modulation factor AL may agree with the maximum modulation factor ALmax.

The compensation current command If* for field-weakening makes D- and Q-axis current references IdR and IqR be applied to a current reference operate unit 11, thereby completing the compensation. Namely, the compensation is made by subtracting the correction amount from the last stages of the expressions (5) and (6) of the current reference operate unit 11.

In practice, the compensation current command If* is not simply subtracted from the D- and Q-axis current references IdR and IqR. Instead, proportions of the D- and Q-axes are determined according to operating conditions, and then, the correction is carried out.

In this way, the field-weakening control is realized. The field-weakening control provides the field-weakening compensation current command If* with a value equal to or larger than 0 (it is 0 if no field-weakening is carried out and is a positive value to carry out the field-weakening), to compensate D- and Q-axis current references.

Figure 14:
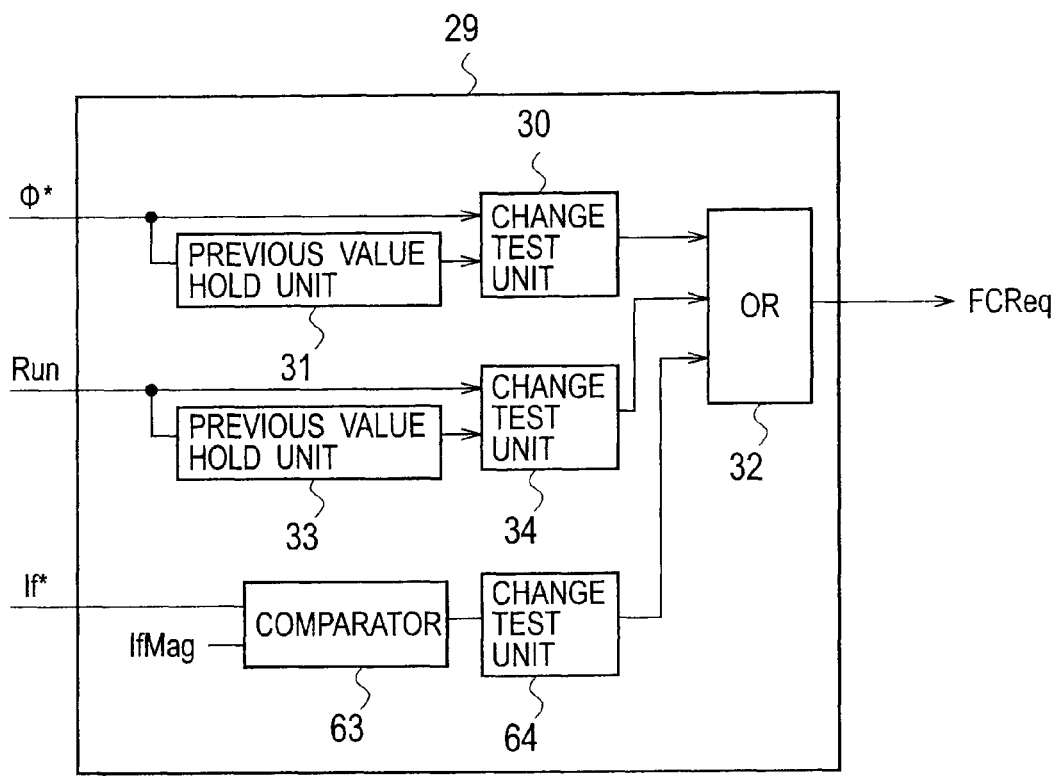
FIG. 14 is a block diagram showing an example of an internal configuration of a magnetization request generate unit according to the third embodiment of the present invention.

The field-weakening compensation current command If* is also input to a magnetization request generate unit 29. The magnetization request generate unit 29 generates a magnetization request flag FCReq (=1) in a zone in which the modulation factor of the inverter becomes maximum. FIG. 14 is a block diagram showing an example of the magnetization request generate unit 29 according to the third embodiment. Compared with the magnetization request generate unit 29 according to the first embodiment shown in FIG. 6, the third embodiment additionally has a comparator 63 to compare the field-weakening compensation current command If* with a predetermined set value IfMag and a change test unit 64 to find a change in the comparison result. The same elements as those of FIG. 6 are represented with the same reference marks, to omit repetitive explanations.

The field-weakening compensation current command If* is compared by the comparator 63 with the predetermined set value IfMag. The compensation current command If* positively increases in a field-weakening zone, and therefore, the set value IfMag is set to be positive. When the compensation current command If* increases to exceed the set value IfMag, "1" is output, and if it is below the set value, "0" is output. The change test unit 64 detects a time point when the output from the comparator 63 changes and outputs the detected result to an OR circuit 32. An output from the OR circuit 32 is a magnetization request flag FCReq to carry out a magnetization process. Namely, when a field-weakening depth becomes large in the field-weakening zone, the magnetization process is carried out.

In the magnetization process, a large flux command Φ* is given on a low-speed side and a small flux command Φ* is given on a high-speed side. For this, a flux command operate unit 12 may be set according to the above-mentioned expression (2). Namely, the flux command Φ* is changed depending on a speed condition.

Figures 15, 16:
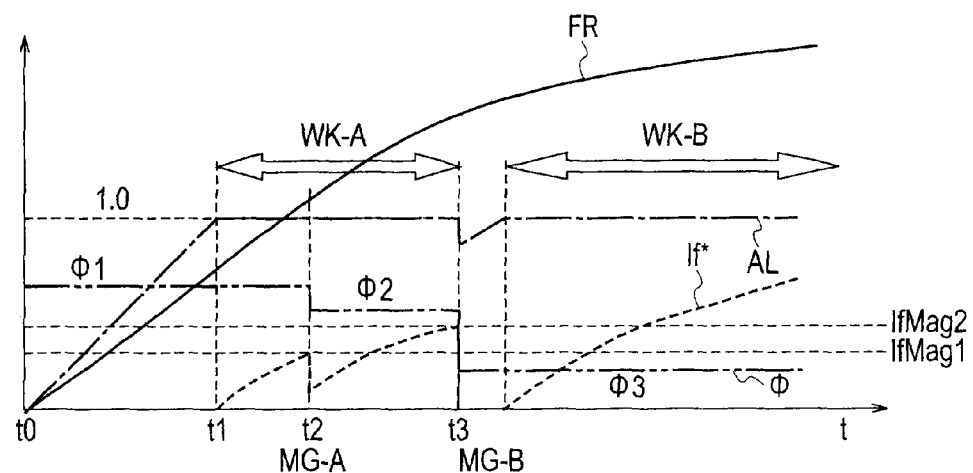
FIG. 15 is a characteristic diagram showing response waveforms when accelerating a variable-flux motor according to the third embodiment of the present invention.
FIG. 16 is a characteristic diagram showing response waveforms when decelerating the variable-flux motor according to the third embodiment of the present invention.

FIG. 15 is a characteristic diagram showing response waveforms at acceleration of a variable-flux motor 4 of the third embodiment. In FIG. 15, an upper limit of the maximum modulation factor ALmax is set at 1. If a speed FR of the variable-flux motor 4 increases from a time point t0, the modulation factor AL increases according to an increase in the speed FR of the variable-flux motor 4. When the modulation factor AL reaches "1" at a time point t1, the field-weakening starts. Namely, the field-weakening compensation current command If* gradually increases to positive values from zero. When the field-weakening compensation current command If* reaches IfMag1 at a time point t2, a magnetization process MG-A is carried out to decrease magnet flux from Φ1 to Φ2. At this time, the magnet flux that is decreasing is still in a field-weakening zone WK-A and the modulation factor keeps 1.

When the field-weakening compensation current command If* reaches IfMag2 at a time point t3, a magnetization process MG-B is carried out to decrease the magnet flux from Φ2 to Φ3. At this time, the decrease of flux is large, and therefore, the modulation factor AL once decreases below "1" out of a field-weakening zone WK-B.

The field-weakening is an imperative function to secure a wide range of speed control. However, in the case of a permanent-magnet synchronous motor, a large current is needed for the field-weakening, to improperly decrease a power factor or efficiency. To cope with this, flux is changed according to the magnitude of the field-weakening compensation current command If* indicative of a field-weakening depth. This suppresses an excessive field-weakening current and prevents the deterioration of the power factor and efficiency of the motor. This provides effects of reducing a loss and miniaturizing a cooling device. Preventing the decrease of power factor enables the use of switching elements of small current capacities.

At high rotational speeds, the field-weakening is continued at reduced magnet flux to realize higher rotational speeds. This expands a range of operational speeds.

The third embodiment sets an upper limit on the maximum modulation factor ALmax at "1." This is a one-pulse mode. The one-pulse mode outputs a maximum voltage that can be provided by an inverter. This mode involves positive and negative pulses, each being provided in one output period, and therefore, the number of times of switching per period of the mode is minimum.

Namely, the one-pulse mode can reduce the switching loss of a switching element, to increase an output voltage and reduce the size of the system. In the magnetization process B, the modulation factor becomes lower than "1" after a flux change. This raises no problem for the variable-flux motor drive system. The magnetization process A can maintain the one-pulse mode at the changed magnet flux value. In this case, there will be no increase in an unnecessary switching loss and it is possible to reduce load on a cooling device.

It is preferable to carry out a magnetization process before setting the field-weakening compensation current command If* that may automatically magnetize the magnet. If the value IfMag set for switching the field-weakening compensation current command If* is large, a current increasing according to the field-weakening control unintentionally carries out magnetization to change magnet flux. Even in this state, the third embodiment employing the variable magnet may realize a wide range of speeds. When the present invention is applied to HEVs and electric trains, it is preferable, however, to reduce a torque shock caused by such flux change. The torque shock occurs because the variable flux control sharply changes magnet flux. To suppress the torque shock, it is preferable to intentionally change flux by conducting, for example, perfect follow-up current control only during a magnetization process.

In FIG. 14, the field-weakening compensation current command If* has only one switching point. Instead, it may have two or more switching points. The example shown in FIG. 15 has two switching points (IfMag1 and IfMag2).

FIG. 16 is a characteristic diagram showing response waveforms at deceleration of the variable-flux motor 4 of the third embodiment. Similar to the example of FIG. 15, a magnetization process MG-A generates a magnetization request at a time point t13 when the field-weakening compensation current command If* becomes lower than a predetermined value IfMag1. A magnetization process MG-B requests a magnetization process out of a field-weakening zone, and therefore, is not achievable with a magnetization request based on the field-weakening compensation current If*. WK-A and WK-B each indicate a field-weakening zone.

Figure 17:
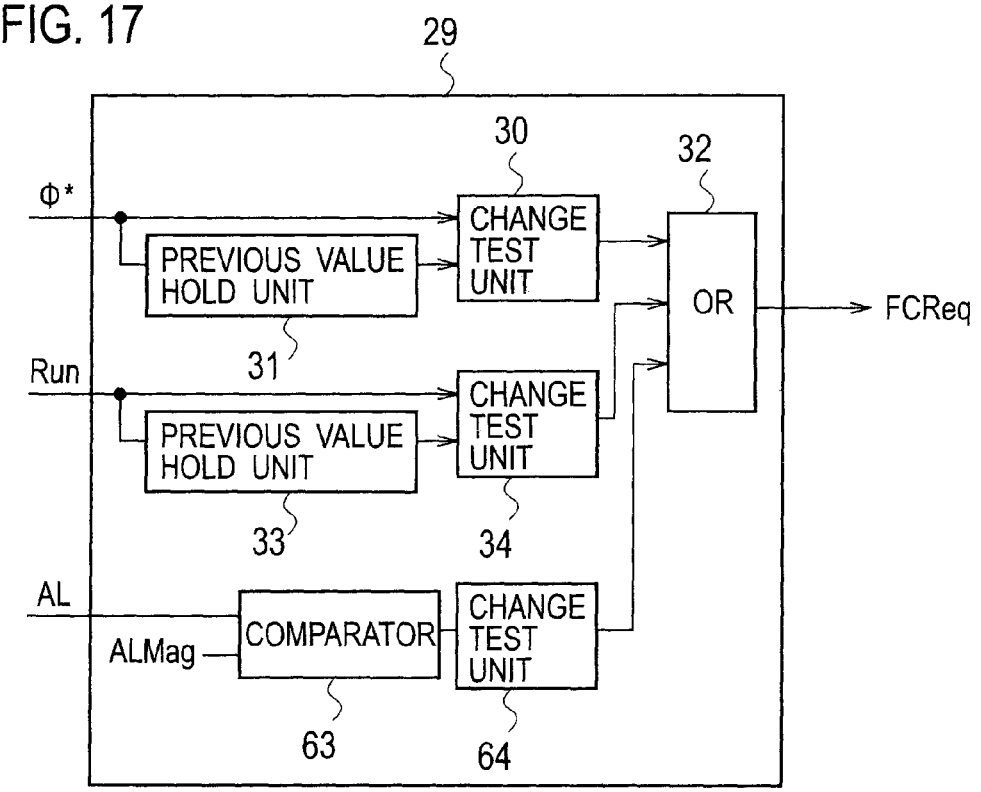
FIG. 17 is a block diagram showing another example of an internal configuration of the magnetization request generate unit according to the third embodiment of the present invention.

To cope with this, the magnetization request generate unit 29 is constituted like FIG. 17 instead of the one shown in FIG. 14. FIG. 17 is a block diagram showing another example of the magnetization request generate unit 29 according to the third embodiment. Namely, the magnetization request generate unit 29 receives the modulation factor AL instead of the field-weakening compensation current command value If*. The comparator 63 compares the modulation factor AL and predetermined set value ALMag with each other. A change in the comparison result is tested by the change test unit 64, which generates a magnetization request to execute the magnetization process B.

Figure 18:
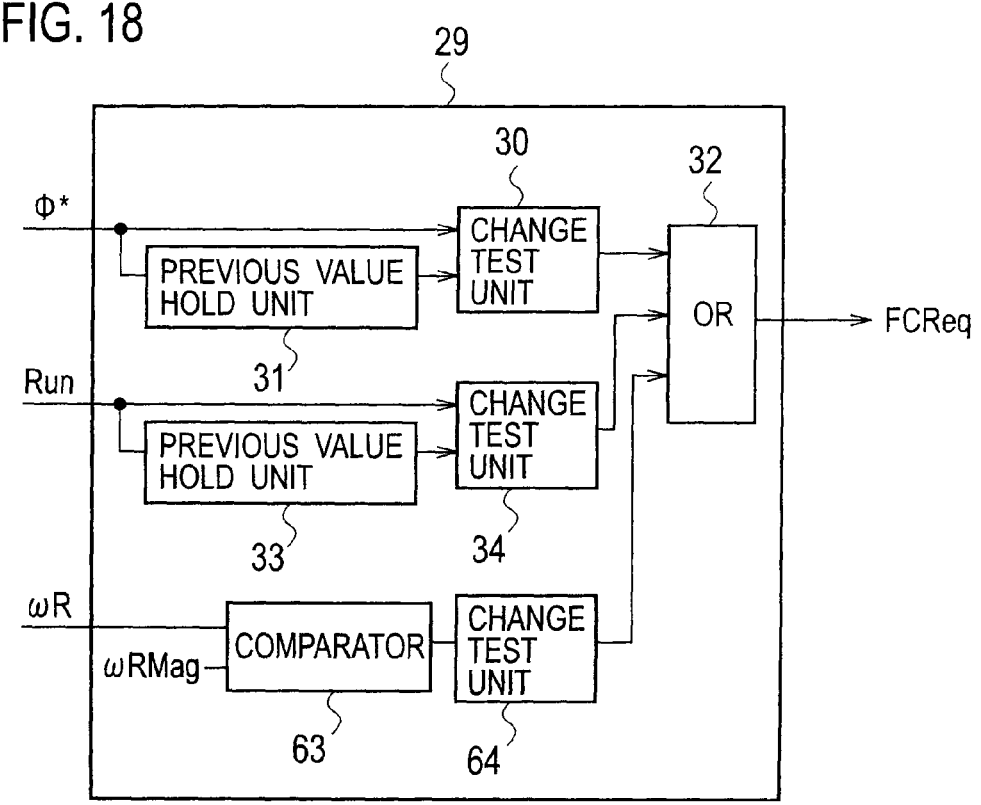
FIG. 18 is a block diagram showing still another example of an internal configuration of the magnetization request generate unit according to the third embodiment of the present invention.

FIG. 18 is a block diagram showing still another example of the magnetization request generate unit 29 according to the third embodiment. This example differs from the example shown in FIG. 17 in that it receives a rotor rotational speed ωR of the variable-flux motor 4 instead of the modulation factor AL of FIG. 17. The rotor rotational speed ωR is obtained by differentiating a rotational angle θ that is detected by a rotational angle sensor 18.

The magnetization request generate unit 29 receives the rotor rotational speed ωR of the variable-flux motor 4. The comparator 63 compares the rotor rotational speed ωR and a predetermined set value ωRMag with each other. The comparison result is tested by the change test unit 64, which generates a magnetization request. The example of FIG. 18 realizes a wide range of speeds by switching flux according to the rotor rotational speed ωR such that the flux is increased at low speeds and is decreased at high speeds.

(Fourth Embodiment)

Figure 19:
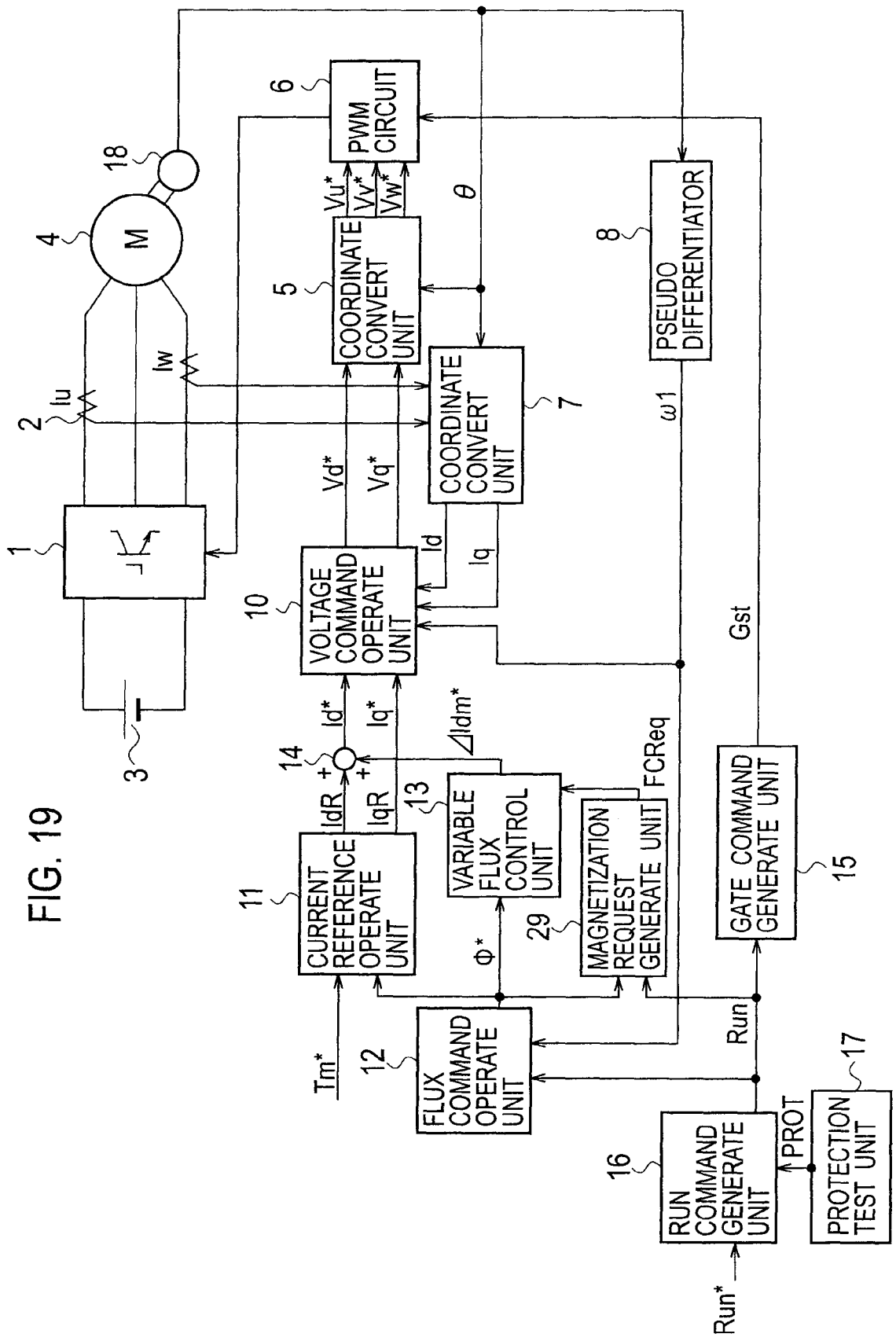
FIG. 19 is a block diagram showing a variable-flux motor drive system according to a fourth embodiment of the present invention.

FIG. 19 is a block diagram showing a variable-flux motor drive system according to the fourth embodiment of the present invention. In this embodiment, a variable-flux motor that is a permanent-magnet synchronous motor is the same as that of the first embodiment explained with reference to FIGS. 2 to 5.

According to this embodiment, a main circuit consists of a DC power source 3, an inverter 1 to invert DC power into AC power, and the variable-flux motor 4 driven by the AC power of the inverter 1. The main circuit includes an AC current detector 2 to detect motor power and a rotational angle sensor (resolver) 18 to detect a motor speed.

Next, control operation of the above-mentioned system will be explained. Inputs thereto are a run command Run* and a torque command Tm*. A run command generate unit 16 receives the run command Run* and a protect signal PROT from a protection test unit 17 and generates and outputs a run state flag Run. Basically, the run state flag Run is set to a run state (Run=1) when a run command is input (Run*=1) and to a stop state (Run=0) when the run command indicates a stoppage (Run*=0). When protection is detected (PROT=1), the run state is set to the stop state (Run=0) even if the run command Run* is 1.

A gate command generate unit 15 receives the run state flag Run and generates and outputs a gate command Gst to switching elements incorporated in the inverter 1. The gate command generate unit 15 immediately sets a gate start (Gst=1) if the run state flag Run changes from stoppage (Run=0) to run (Run=1) and sets a gate off (Gst=0) a predetermined time after the run state flag Run changes from run (Run=1) to stoppage (Run=0).

A flux command operate unit 12 receives the run state flag Run and an inverter frequency ω1, i.e., a rotor rotational frequency ωR and generates and outputs a flux command Φ* according to, for example, the below-mentioned expression (16). If it is the stop state (Run=0), the flux command Φ* is minimized to Φmin. If it is the run state (Run=1) and if the rotational frequency ωR is lower than a predetermined value, the flux command Φ* is maximized to Φmax. If the speed is higher than the predetermined value, the flux command Φ* is minimized to Φmin.

[Math. 13]

If(Run=0)Φ*=Φmin

Else if (|ω1|<ωA)Φ*=Φmax

Else Φ*=Φmin         (16)

Here, Φmin is a minimum flux amount (>0) to be taken by the variable-flux motor 4, Φmax is a maximum flux amount to be taken by the variable-flux motor 4, and ωA is the predetermined rotational frequency. Setting the flux amounts Φmin and Φmax will be explained later in connection with a variable flux control unit 13.

A current reference operate unit 11 receives the torque command Tm* and flux command Φ* and calculates a D-axis current reference IdR and a Q-axis current reference IqR according to the following expressions (17) and (18):

[Math. 14]

$$IdR=0 \quad (17)$$

$$IqR=Tm^*/\Phi^* \quad (18)$$

The expressions (17) and (18) are based on an assumption that reluctance torque of the motor is not used and the number of poles is 0. The motor may be a salient motor involving a difference ΔL between a D-axis inductance Ld and a Q-axis inductance Lq, or a non-salient motor having no such difference.

It is effective, however, to consider the reluctance torque in order to optimize efficiency and maximize an output at a predetermined current. In this case, the following expression may be employed:

[Math. 15]

$$IqR=(-\Phi^*+\sqrt{\Phi^{*2}-4\times(Ld-Lq)\times K\times Tm^*})/2\times(Ld-Lq)\times K \quad (19)$$

$$IdR=K\times IqR \quad (20)$$

Here, K is a ratio between a D-axis current and a Q-axis current and is variable depending on the above-mentioned efficiency optimization and output maximization. For the optimization, it takes a form of function with torque, speed, and the like as arguments. The expression may be replaced with a simple approximation, or may be prepared in the form of a table. The flux command Φ* in the expression (19) is calculable if replaced with an estimated flux value Φh to be explained later.

The structural details of a magnetization request generate unit 29 are similar to those of the first embodiment shown in FIG. 6.

Figure 20:
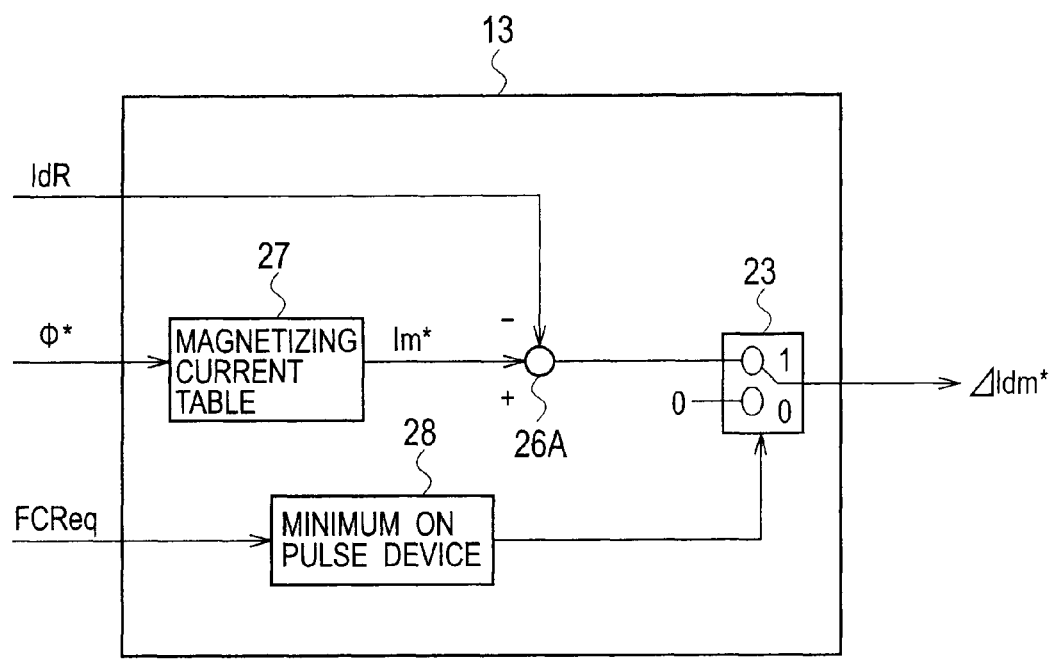
FIG. 20 is a block diagram showing an internal configuration of a variable flux control unit according to the fourth embodiment of the present invention.

FIG. 20 shows structural details of the variable flux control unit 13. The variable flux control unit 13 receives the flux command Φ* from the flux command operate unit 12 and outputs a D-axis magnetizing current difference ΔIdm* for correcting the D-axis current reference IdR. The magnetizing current difference ΔIdm* is generated according to the below-mentioned process.

To magnetize a variable magnet VMG, a predetermined magnetizing current command Im* must be calculated according to the BH characteristic of the variable magnet like the first embodiment shown in FIG. 4. The magnitude of the magnetizing current command Im* is set to be equal to or higher than H1sat of FIG. 4, i.e., within the magnetization saturation zone Y of the variable magnet.

To pass a magnetizing current up to the magnetization saturation zone Y, the flux command operate unit 12 sets the flux amounts Φmin and Φmax by adding a fixed magnet portion to a positive or negative maximum (saturation) flux value of the variable magnet. Supposing the variable magnet VMG has a positive maximum flux amount ΦVARmax (the absolute value of a negative maximum is supposed to be equal to that of the positive maximum) and the fixed magnet FMG has a flux amount ΦFIX, the following are established:

[Math. 16]

$$\Phi min = \Phi FIX - \Phi VARmax \quad (21)$$

$$\Phi max = \Phi FIX + \Phi VARmax \quad (22)$$

The flux command Φ* is input to the unit 13 and a magnetizing current table 27 storing corresponding magnetizing currents retrieves a magnetizing current command Im* corresponding to the flux command Φ*.

Basically, the magnetizing direction of a magnet is in the D-axis direction, and therefore, the magnetizing current command Im* is set to provide a D-axis current command Id*. According to this embodiment, the D-axis current reference IdR from the current reference operate unit 11 is corrected according to the D-axis magnetizing current command difference ΔIdm*, thereby providing the D-axis current command Id*. Accordingly, a subtracter 26A finds the D-axis magnetizing current difference ΔIdm* as follows:

[Math. 17]

$$\Delta Idm^* = Im^* - IdR \quad (23)$$

To change flux, a configuration of directly applying the magnetizing current Im* to the D-axis current command Id* is also possible.

On the other hand, a magnetization request flag FCReq at least instantaneously rises (FCReq=1) when flux is needed to be changed. To surely change flux, the magnetization request flag FCReq is sent to a minimum ON pulse device 28, which outputs a magnetization completion flag (=1 to indicate that magnetization is in progress and =0 to indicate the completion of magnetization). This magnetization completion flag has a function of not being turned off (=0) for a predetermined time once it is turned on (=1). If the input is ON (=1) for a period exceeding the predetermined time, the device 28 turns off the flag, i.e., turns off the output thereof.

A switch 23 receives the magnetization completion flag. If magnetization is in progress (the magnetization completion flag=1), the switch 23 provides the output from the subtracter 26A, and if the magnetization is completed (the magnetization completion flag=0), provides zero.

A voltage command operate unit 10 of FIG. 19 receives the D- and Q-axis current commands Id* and Iq* and generates D- and Q-axis voltage commands Vd* and Vq* so that currents corresponding to the commands may be passed.

The D- and Q-axis voltage commands Vd* and Vq* from the voltage command operate unit 10 are converted by a coordinate convert unit 5 into three-phase voltage commands Vu*, Vv*, and Vw*. According to the three-phase voltage commands, a PWM circuit 6 generates a gate signal to PWM-control the inverter 1. A coordinate convert unit 7 converts AC currents Iu and Iw detected by the current detector 2 into D- and Q-axis current detected values Id and Iq, which are input to the voltage command operate unit 10. A pseudo differentiator 8 differentiates an angle signal θ from the rotational angle sensor (resolver) 18 into an inverter frequency ω1. The voltage command operate unit 10, coordinate convert units 5 and 7, and PWM circuit 6 are known ones.

Figure 21:
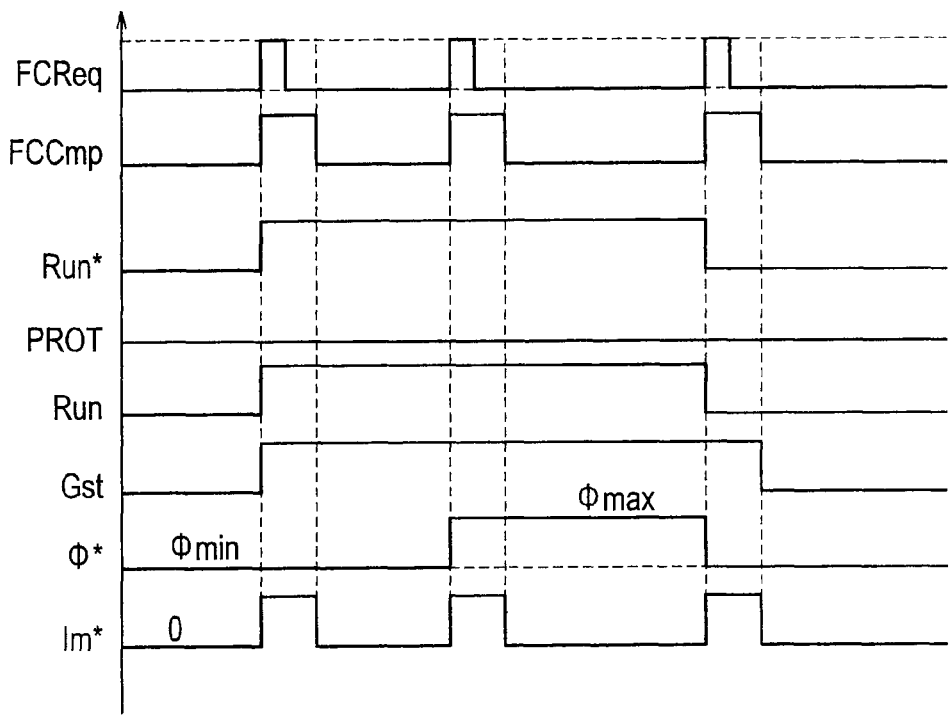
FIG. 21 is a timing chart showing variable-flux motor control according to the fourth embodiment of the present invention.

FIG. 21 is an example of a timing chart showing operation of various signals. In this example, the protect signal is not established (PROT=0). According to a change in the run state flag Run or a change in the flux command Φ*, a magnetization request flag is set and a magnetization completion flag to secure the magnetization request flag for a predetermined time is set. During the period in which the magnetization completion flag is set, the magnetizing current command Im* has a value.

This embodiment with the above-mentioned configuration provides effects mentioned below. The variable-flux motor 4 shows a steep characteristic change with respect to an inverter current for magnetization, as shown in the BH characteristic of FIG. 4. Accordingly, it is difficult in practice to repeatedly obtain the same flux even if the same control is repeated, because there are an axial deviation between the D-axis and a flux axis caused by position-sensor-less control, a current response difference, and an individual motor difference. The poor flux repeatability deteriorates a torque accuracy, and therefore, is not preferable.

For this, the variable-flux motor drive system of the embodiment passes a magnetizing current higher than a magnetization saturation zone of the magnetize characteristic of the variable magnet VMG, to fix a variable flux amount after magnetization, improve a repeatability, secure a torque accuracy, and improve a driving reliability.

The variable-flux motor drive system of the embodiment sets a minimum time for passing a magnetizing current, and therefore, magnetization will not incompletely terminate. This suppresses a variable flux amount after the completion of a magnetization process from varying and improves a torque accuracy.

(Fifth Embodiment)

Figure 22:
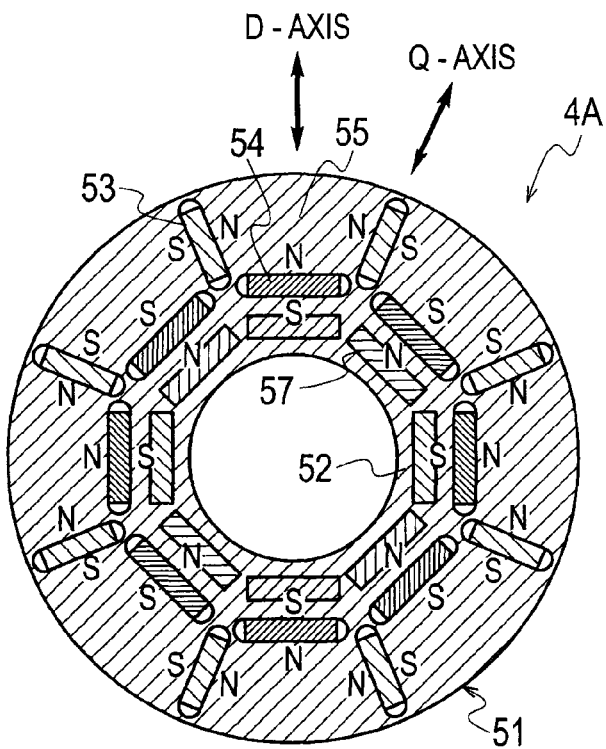
FIG. 22 is a sectional view showing a variable-flux motor used by a variable-flux motor drive system according to a fifth embodiment of the present invention.

With reference to FIGS. 22 to 25, a variable-flux motor drive system according to the fifth embodiment of the present invention will be explained. FIG. 22 shows the structure of a variable-flux motor 4A to be controlled by the variable-flux motor drive system according to the fifth embodiment of the present invention. The variable-flux motor 4A of this embodiment differs form the variable-flux motor 4 of the fourth embodiment in that a variable magnet VMG consists of a pair of two different low-coercive-force permanent magnets.

Namely, a rotor 51 has a rotor iron core 52 that includes magnet combinations each consisting of a high-coercive-force permanent magnet 54 such as a neodymium magnet (NdFeB), a low-coercive-force permanent magnet A 53, and a low-coercive-force permanent magnet B 57, the magnet A 53 and the magnet B 57 being, for example, alnico (AlNiCo) magnets and forming a pair. The high-coercive-force magnet 54 is a fixed magnet FMG and is arranged in a magnet pole part 55 in a direction orthogonal to the diameter of the rotor iron core 52. The low-coercive-force magnet A 53 is a variable magnet VMG and is arranged on each side of the magnetic pole part 55 in the direction of the diameter of the rotor iron core 52. Namely, the magnet A 53 is in a boundary area between the adjacent magnetic pole parts 55. The other low-coercive-force permanent magnet B 57 is arranged in parallel with the high-coercive-force permanent magnet 54 on the center side of the rotor 51. The two low-coercive-force permanent magnet A 53 and magnet B 57 are made of the same magnetic material, i.e., alnico (AlNiCo) similar to the fourth embodiment.

In this way, each variable magnet VMG is composed of the low-coercive-force permanent magnet A 53 and magnet B 57 that are made of the same magnetic material and are arranged at different positions. Accordingly, the two low-coercive-force permanent magnet A 53 and magnet B 57 provide different magnetizing actions with respect to a D-axis magnetizing current. This forms a variable magnet structure having two BH characteristics shown in FIG. 23.

Figure 23:
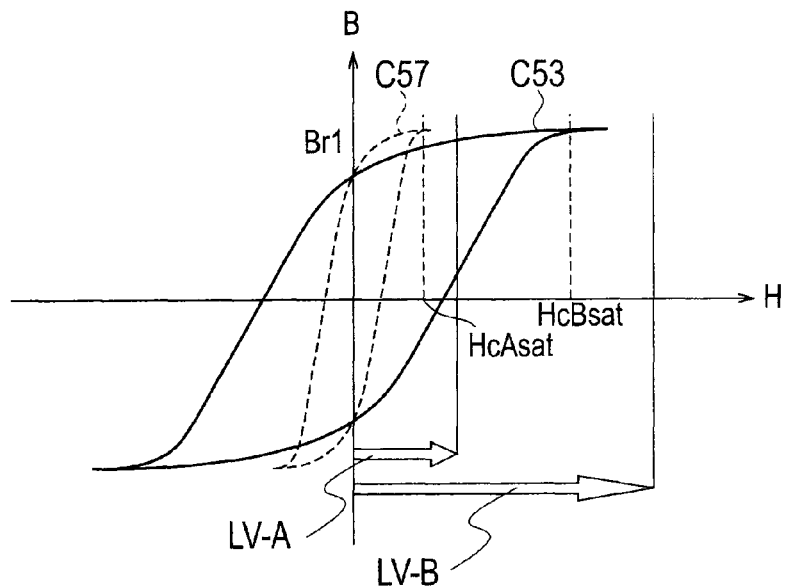
FIG. 23 is a BH characteristic diagram showing two variable magnets adopted by the variable-flux motor according to the fifth embodiment of the present invention.

FIG. 23 shows the different BH characteristics, i.e., variable magnet curves C53 and C57. The two variable magnet curves C53 and C57 are provided by the alnico magnets arranged at different spatial positions. Employing a pair of two low-coercive-force permanent magnets of different materials may also provide two BH characteristics. The magnets of the same magnetic material have an identical BH characteristic. However, depending on the positions thereof in the motor, they show different flux values Φ with respect to magnetization H by a current. The characteristics shown in FIG. 23 show relationships between a magnetizing current from an inverter and flux and are not simply based on materials. LV-A is a magnetizing current set level A of the inverter and LV-B is a magnetizing current set level B of the inverter.

Figure 24:
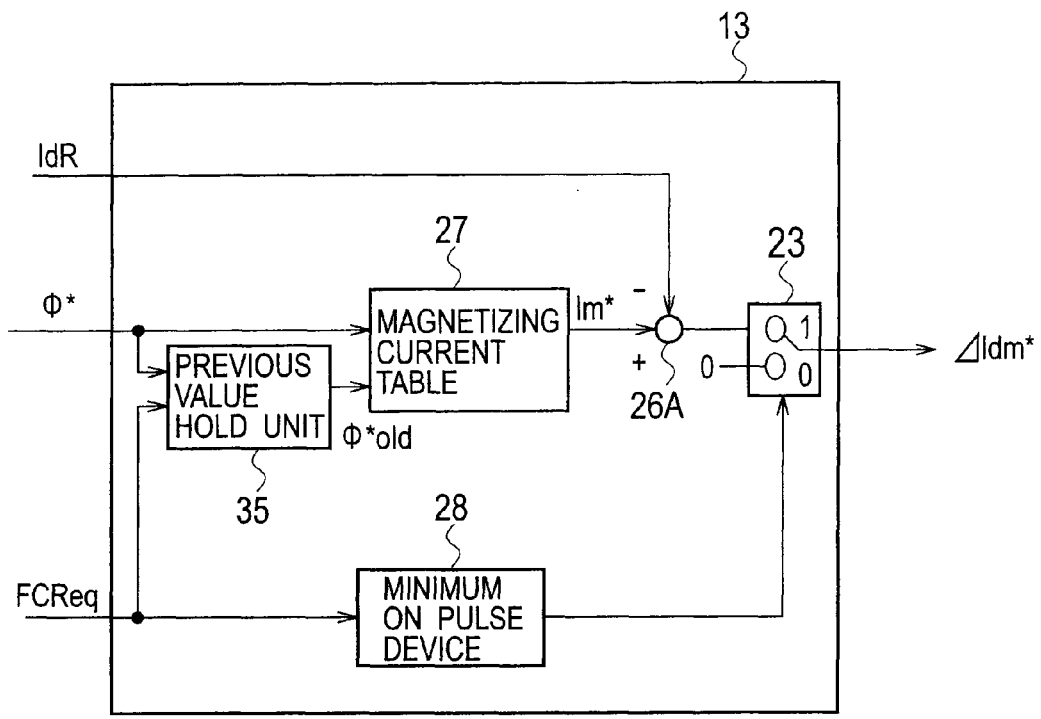
FIG. 24 is a block diagram showing an internal configuration of a variable flux control unit according to the fifth embodiment of the present invention.

According to this embodiment, the structure of the variable-flux motor 4A differs from that of the fourth embodiment as mentioned above and the setting of the magnitude of a magnetizing current to change flux differs from that of the first embodiment. According to this embodiment, the configuration of the variable-flux motor drive system is similar to that of the fourth embodiment shown in FIG. 19. A functional configuration of a variable flux control unit 13 is shown in FIG. 24 and differs from that of the fourth embodiment. The details of the variable flux control unit 13 according to this embodiment will be explained.

The variable magnet of small coercive force is referred to as the variable magnet A and the variable magnet of high coercive force is referred to as the variable magnet B. Two magnetizing current commands Im_A and Im_B are provided step by step.

Im_A is in a magnetization saturation zone, i.e., over HcAsat of the variable magnet A and in a reversible zone of the variable magnet B.

Im_B is in the magnetization saturation zone, i.e., over HcBsat with respect to both the variable magnets B and A.

The variable flux control unit 13 selects one of the two magnetizing current commands (a positive-negative combination is possible) according to the level of a requested flux command Φ* and provides a magnetizing current command Im*.

The variable flux control unit 13 calculates the magnetizing current command Im* according to the flux command Φ*. The variable flux control unit 13 of this embodiment differs from that of the fourth embodiment shown in FIG. 20 in that a previous value hold unit 35 is added and a magnetizing current table 27 has two arguments. A control microcomputer is employed to repeat a control process at predetermined intervals.

The flux command Φ* and a magnetization request flag FCReq are input to the previous value hold unit 35. The unit 35 stores the flux command Φ* at each up edge of the magnetization request flag. An output from the previous value hold unit 35 is a value of the flux command Φ* provided when the magnetization request flag FCReq has raised to 1 last time, i.e., a value of the flux command Φ* for a previous magnetization process. Here, the previous flux command value is referred to as Φ*old. The magnetizing current table 27 receives the flux command value Φ* of this time and the previous flux command value Φ*old.

The magnetizing current table 27 is set as shown in FIG. 25. A maximum flux of the variable magnet A 53 is VARAmax and a maximum flux of the variable magnet B 57 is VARBmax. Then, the flux command may take the following four values:

[Math. 18]

(i) $\Phi1=\Phi FIX-\Phi VARAmax-\Phi VARBmax$ (ii) $\Phi2=\Phi FIX+\Phi VARAmax-\Phi VARBmax$ (iii) $\Phi3=\Phi FIX-\Phi VARAmax+\Phi VARBmax$ (iv) $\Phi4=\Phi FIX+\Phi VARAmax+\Phi VARBmax$ (24)

As is apparent from the table of FIG. 25, the magnetizing current table 27 is characterized in that even the same flux may take a different magnetization process, i.e., a different magnetizing current depending on a previous state. For example, in the table of FIG. 25, a case with a previous flux command value Φ*old=Φ2 and a present flux command value Φ*=Φ3 corresponds to "Im_B→−Im_A." This means that a magnetization process is first carried out with Im*=Im_B, and then, is continued with Im*=−Im_A. This may simply be achievable by changing the magnetizing current command Φ* from Im_B to −Im_A according to time. To surely perform the magnetization process, it is carried out with Im_B, and after the perfect completion of magnetization like the fourth embodiment or the sixth embodiment to be explained later, is continued by changing the flux command Φ* to −Im_A and by again setting the magnetization request flag.

According to this embodiment, the variable-flux motor drive system employs two or more variable magnet A 53 and magnet B 57 of different characteristics, to set four levels of flux amounts instead of two that is achievable with a single variable magnet. In particular, this embodiment sets a magnetizing current to be within a magnetize reversible zone or a saturation zone, and therefore, every variable magnet has a definite value. Accordingly, this embodiment can set flux that is reproducible and has a high repeatability, to improve a torque accuracy. The ability to take a plurality of flux levels allows a flux amount to be finely adjusted depending on operating conditions. In this way, the embodiment makes the best use of the variable-flux motor to improve system efficiency. Although the embodiment employs a combination of two variable magnets A and B, a combination of three or more variable magnets is also possible.

(Sixth Embodiment)

Figure 26:
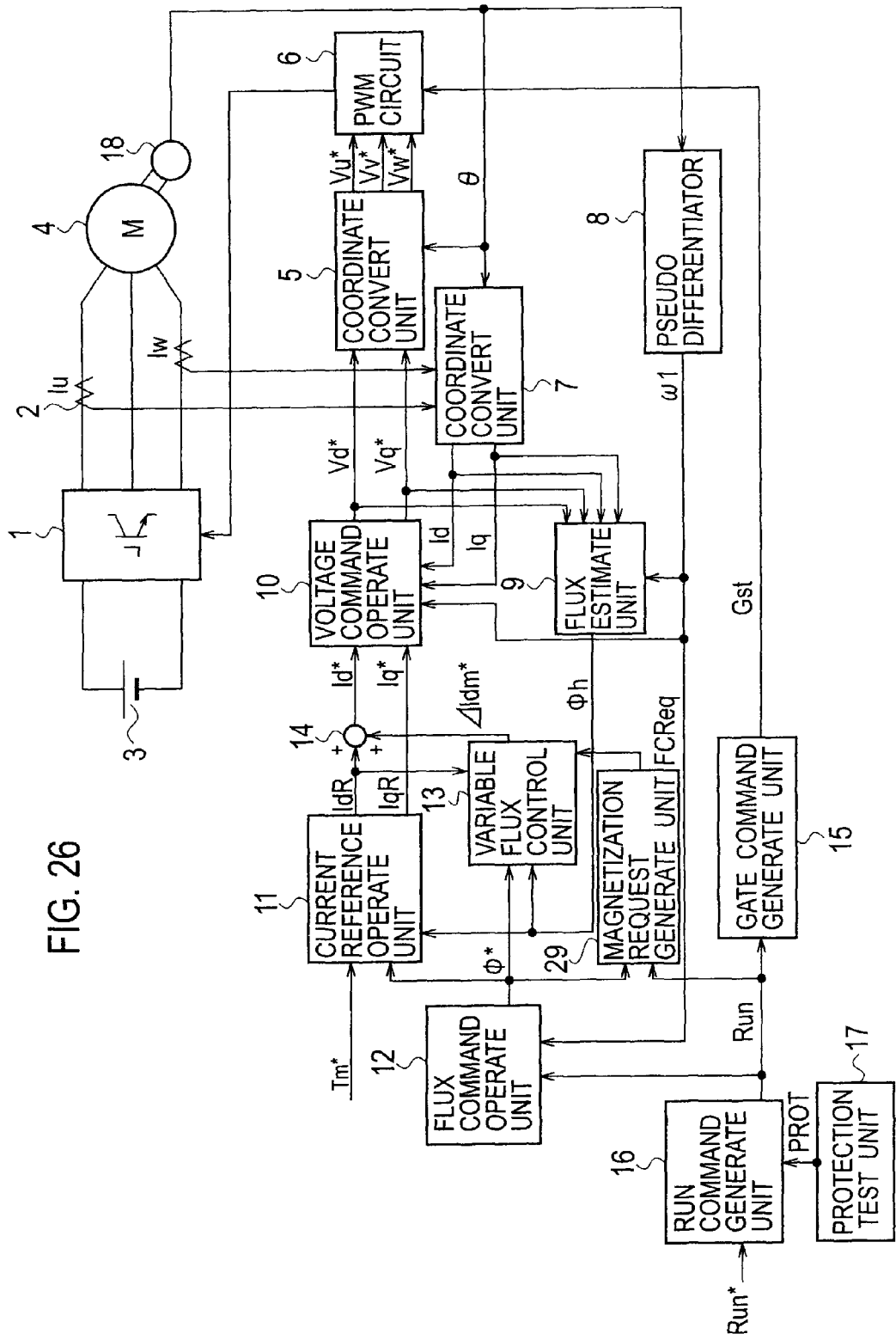
FIG. 26 is a block diagram showing a variable-flux motor drive system according to a sixth embodiment of the present invention.

FIG. 26 shows a variable-flux motor drive system according to the sixth embodiment of the present invention. In FIG. 26, parts common to the fourth embodiment shown in FIG. 19 are represented with the same reference marks.

The variable-flux motor drive system according to the sixth embodiment differs from the fourth embodiment shown in FIG. 19 in that a flux estimate unit 9 is additionally arranged to estimate a flux Φh with the use of voltage commands Vd* and Vq* from a voltage command operate unit 10, D- and Q-axis currents Id and Iq from a coordinate convert unit 7, and a rotor rotational angle frequency ω1 and output the estimated flux to a variable flux control unit 13. In addition, the variable flux control unit 13 has a configuration shown in FIG. 27.

The flux estimate unit 9 uses the D- and Q-axis voltage commands Vd* and Vq*, D- and Q-axis currents Id and Iq, and rotor rotational angle frequency ω1 (inverter frequency), to estimate a D-axis flux amount as follows:

[Math. 19]

$$\Phi h = (Vq^* - R1 \times Iq - \omega 1 \times Ld \times Id - Lq \times dIq/dt)/\Phi 1 \quad (25)$$

The estimated flux value Φh and a flux command Φ* from a flux command operate unit 12 are input to the variable flux control unit 13.

Figure 27:
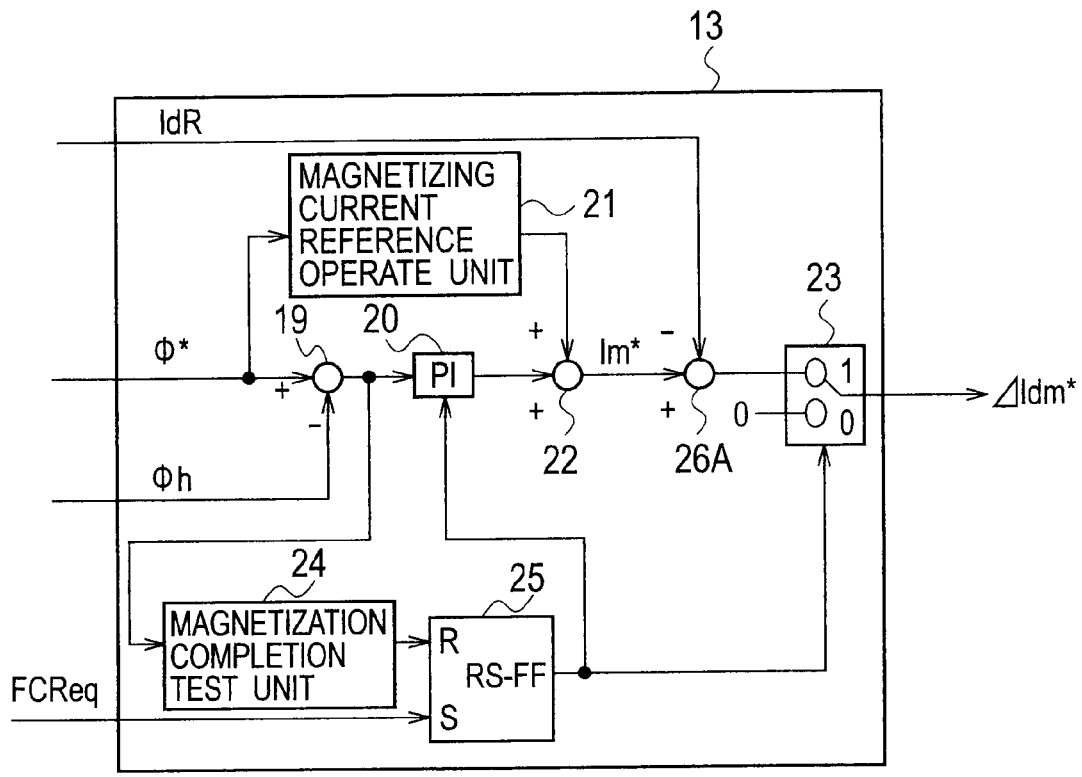
FIG. 27 is a block diagram showing an internal configuration of a variable flux control unit according to the sixth embodiment of the present invention.

A detailed configuration of the variable flux control unit 13 of this embodiment is shown in FIG. 27. A subtracter 19 calculates a deviation between the flux command Φ* and the estimated flux value Φh and supplies the deviation to a PI controller 20. The flux command Φ* is input to a magnetizing current reference operate unit 21. The magnetizing current reference operate unit 21 calculates a magnetizing current command Im* with the use of a table or a functional equation, so that magnetization is carried out to realize flux corresponding to the flux command Φ*. At this time, a BH characteristic like the one mentioned above is used. An adder 22 adds an output from the magnetizing current reference operate unit 21 to an output from the PI control unit 20.

The adder 22 provides the magnetizing current command Im*. For magnetization, the magnetizing current command Im* is applied as a D-axis current command Id*. To make Id* and Im* agree with each other, the embodiment uses a subtracter 26A to subtract a D-axis current reference IdR from the magnetizing current command Im* and provide a D-axis magnetizing current command difference ΔIdm*. This difference is added to the D-axis current reference IdR by an adder 14, and therefore, the D-axis current command Id* agrees with the magnetizing current command Im*.

A switch 23 in the variable flux control unit 13 selects one of two inputs according to a magnetization completion flag to be explained later and outputs the magnetizing current command Idm*. If the magnetization completion flag is 0 (magnetization completed), the D-axis magnetizing current command difference ΔIdm* is set to zero. If the magnetization completion flag is 1 (in magnetization), the output of the adder 22 is provided as ΔIdm*.

The deviation between the flux command Φ* from the subtracter 19 and the estimated flux value Φh is input to a magnetization completion test unit 24. The magnetization completion test unit 24 provides 1 if the absolute value of the flux deviation is smaller than a predetermined value α, and if it is greater than α, provides 0. A flip-flop (RS-FF) 25 receives a magnetization request flag FCReq at a set terminal S and an output from the magnetization completion test unit 24 at a reset terminal R. An output from the RS-FF 25 is the magnetization completion flag, which is input to the PI control unit 20 and switch 23. If the magnetization completion flag is 0, it indicates that magnetization has been completed, and if 1, it indicates that magnetization is in progress.

The estimated flux value Φh from the flux estimate unit 9 is also input to a current reference operate unit 11. The current reference operate unit 11 uses the estimated flux value Φh, instead of the flux command Φ* used by the expression of the first embodiment, and calculates D- and Q-axis current references IdR and IqR as follows:

[Math. 20]

$$IqR = (-\Phi h + \sqrt{\Phi h^2 - 4 \times (Ld-Lq) \times K \times Tm^*})/2 \times (Ld-Lq) \times K \quad (26)$$

$$IdR = K \times IqR \quad (27)$$

With the above-mentioned configuration, this embodiment provides actions and effects mentioned below. If there is a magnetization request, the magnetization request flag rises to 1 at least instantaneously. The RS-FF 25 is then set to provide the magnetization completion flag of 1 to indicate that magnetization is in progress. The switch 23 provides, as the magnetizing current command Im*, the outputs from the PI controller 20 and magnetizing current reference operate unit 21. This magnetizing current reference operate unit 21 provides, in a feed-forward manner, a magnetizing current based on a predetermined BH characteristic so as to achieve the flux command Φ*. This results in instantaneously carrying out magnetization up to nearly the command value. Since the duration of magnetization is shortened, the generation of unnecessary torque or loss can be suppressed. The BH characteristic may be obtained beforehand through tests.

Figure 28:
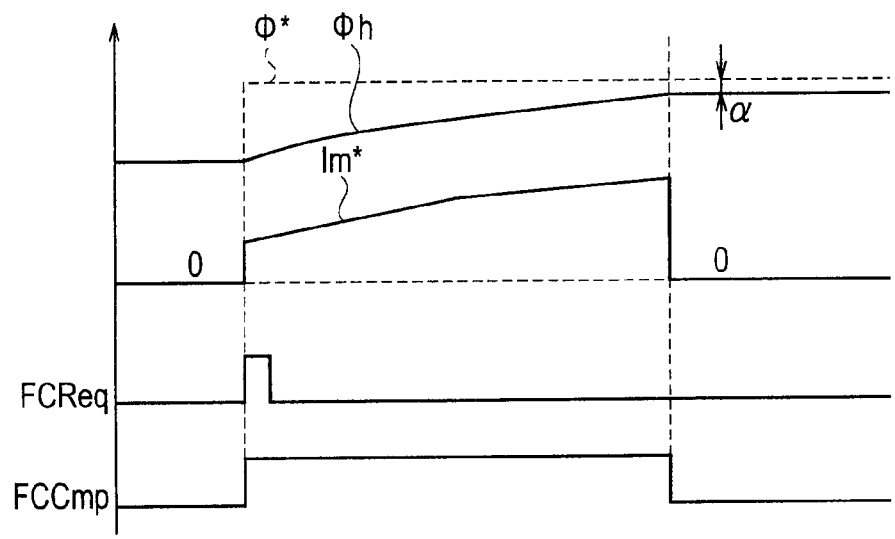
FIG. 28 is a timing chart showing variable-flux motor control according to the sixth embodiment of the present invention.

As mentioned above, it is difficult to precisely make flux agree with a specified value. Accordingly, this embodiment corrects the magnetizing current Im* as shown in FIG. 28 so that the flux deviation |Φ*−Φh| approaches 0 due to the action of the PI controller 20 in the variable flux control unit 13. In the last stage, this makes the flux command Φ* and estimated flux value Φh (i.e., actual flux if there is no estimation error) agree with each other. This improves a flux repeatability in a magnetization process and increases a torque accuracy.

According to this embodiment, the magnetization completion test unit 24 in the variable flux control unit 13 outputs 1 if the absolute value of the flux deviation comes in the predetermined range a as shown in FIG. 28, to indicate that a specified flux amount has actually been attained and magnetization has been completed. In response to the reset request, the RS-FF 25 provides the magnetization completion flag FCCmp of 0. In this way, when the estimated flux value agrees with the flux command Φ*, the magnetization process is terminated. As a result, this embodiment improves a flux repeatability in a magnetization process and increases a torque accuracy.

According to this embodiment, the D- and Q-axis current references IdR and IqR are generated with the use of the estimated flux value Φh estimated from voltages and currents, and therefore, D- and Q-axis current commands are corrected according to actual conditions even if a flux amount varies due to a magnetization process. Since D- and Q-axis currents are passed according to the D- and Q-axis current commands, an influence of flux amount variations on torque can be reduced and a torque accuracy can be improved.

This embodiment is based on an estimated flux value. The estimated flux value includes motor inductances such as Ld and Lq. These values vary according to magnetic saturation. In particular, the variable-flux motor changes its magnetic saturation depending on a variable flux amount. It is, therefore, advantageous for improving a flux estimation accuracy and torque accuracy to employ a function or table that receives an estimated value of variable flux and outputs a motor inductance.

Even if such a table is prepared, it is sometimes difficult to correctly grasp inductance characteristics. In this case, the estimation of flux may be replaced with a flux detector consisting of Hall elements and the like to detect actual flux Φr and use the same in place of the estimated flux value Φh. This will further improve a flux estimation accuracy and torque accuracy.

(Seventh Embodiment)

Figure 29:
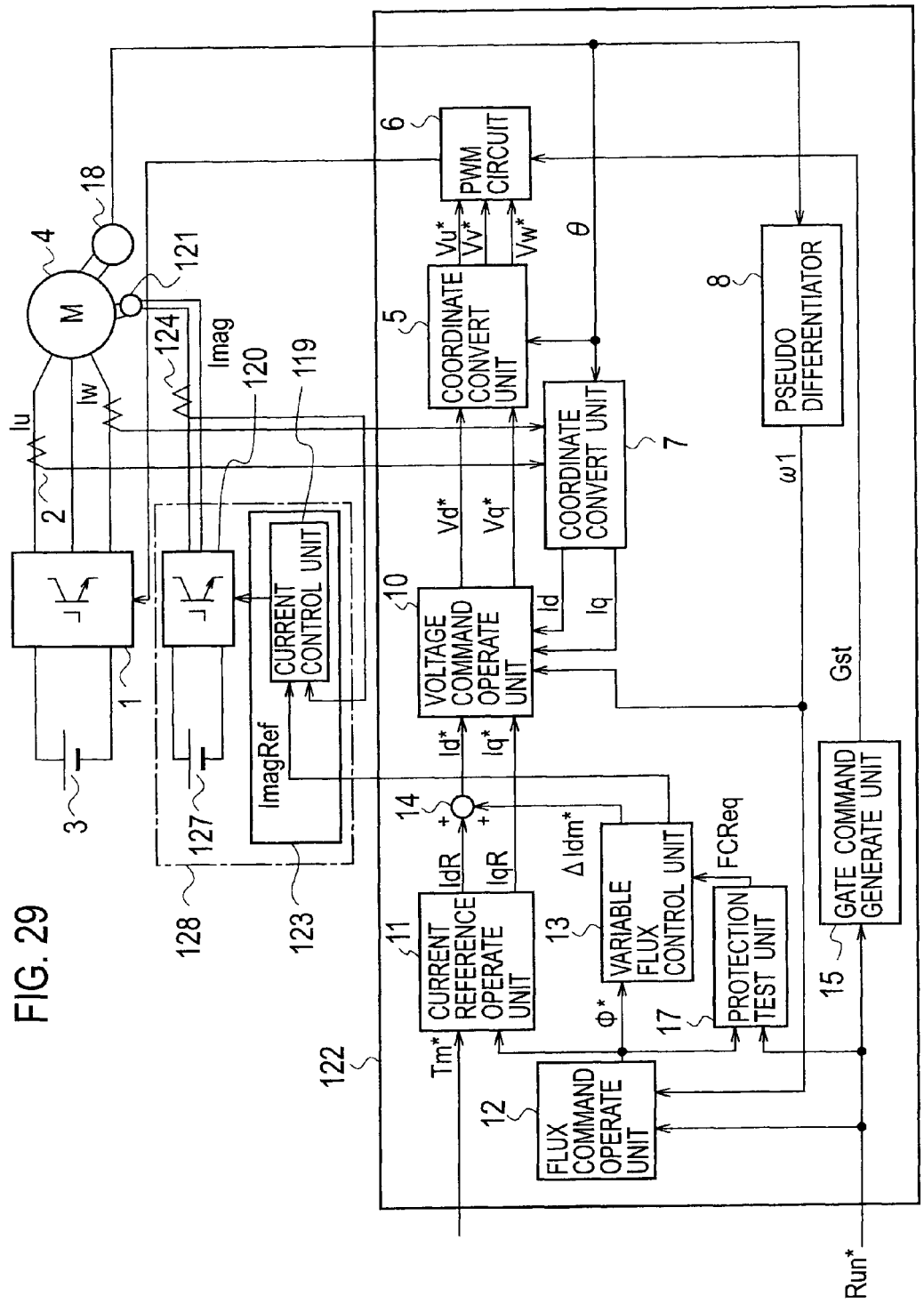
FIG. 29 is a block diagram showing a variable-flux motor drive system according to a seventh embodiment of the present invention.

FIG. 29 is a block diagram showing a variable-flux motor drive system according to the seventh embodiment of the present invention. First, a main circuit including a variable-flux motor 4 of the drive system will be explained. An inverter 1 inverts DC power from a DC power source 3 into AC power, which is supplied to the variable-flux motor 4. Currents Iu and Iw supplied to the variable-flux motor 4 are detected by a current detector 2 and are input to a coordinate convert unit 7 of a main control unit 122. The coordinate convert unit 7 converts them into a D-axis current Id and a Q-axis current Iq, which are input to a voltage command operate unit 10.

The voltage command operate unit 10 outputs a D-axis voltage command Vd* and a Q-axis voltage command Vq* to a coordinate convert unit 5, which converts them into three-phase voltage commands Vu*, Vv*, and Vw*, which are input to a PWM circuit 6. The PWM circuit 6 controls ON/OFF of switching elements of the inverter 1 according to a gate command Gst from a gate command generate unit 15. A rotational angle of the variable-flux motor 4 is detected by a rotational angle sensor 18 and is differentiated by a pseudo differentiator 8, which provides an inverter frequency ω1 to be input to the voltage command operate unit 10 and a flux command operate unit 12.

The flux command operate unit 12 receives a run command Run and the inverter frequency ω1, i.e., a rotor rotational frequency ωR (the angle detected by the rotational angle sensor 18 and differentiated by the pseudo differentiator 8 being the rotor rotational frequency, i.e., the inverter output frequency) and calculates a flux command Φ*. A current reference operate unit 11 receives a torque command Tm* and the flux command Φ* and calculates a D-axis current reference IdR and a Q-axis current reference IqR. A variable flux control unit 13 changes flux according to a magnetizing current from the inverter 1, thereby magnetizing a variable magnet. For this, the unit 13 generates a magnetize correction amount ΔIdm* based on the flux command Φ*. The flux command Φ* is added by an adder 14 to the D-axis current reference IdR to prepare a D-axis current command Id*, which is input to the voltage command operate unit 10. The voltage command operate unit 10 also receives the Q-axis current Iq as a Q-axis current command Iq*.

The variable-flux motor 4 has a magnetize coil to be explained later, to receive a magnetizing current from a magnetize circuit 128. The magnetize circuit 128 consists of a magnetize inverter 120, a DC power source 127, and a magnetizing current control unit 123. The magnetizing current control unit 123 has a current control unit 119. The magnetize coil is connected through a slip ring 121 to the magnetize inverter 120 of the magnetize circuit 128. The magnetize inverter 120 of the magnetize circuit 128 is connected to the DC power source 127, to supply a magnetizing current to the magnetize coil. The current passed to the magnetize coil is detected by a current detector 124. The current control unit 119 generates a gate signal for the magnetize inverter 120, so that the detected magnetizing current may agree with a magnetizing current command value ImagRef.

The variable-flux motor 4 of this embodiment is similar to that of the first embodiment and is constituted like the simple model shown in FIG. 2. However, the structure of a rotor 51 differs from that of the first embodiment shown in FIG. 3 and is as shown in FIG. 30.

Figure 30:
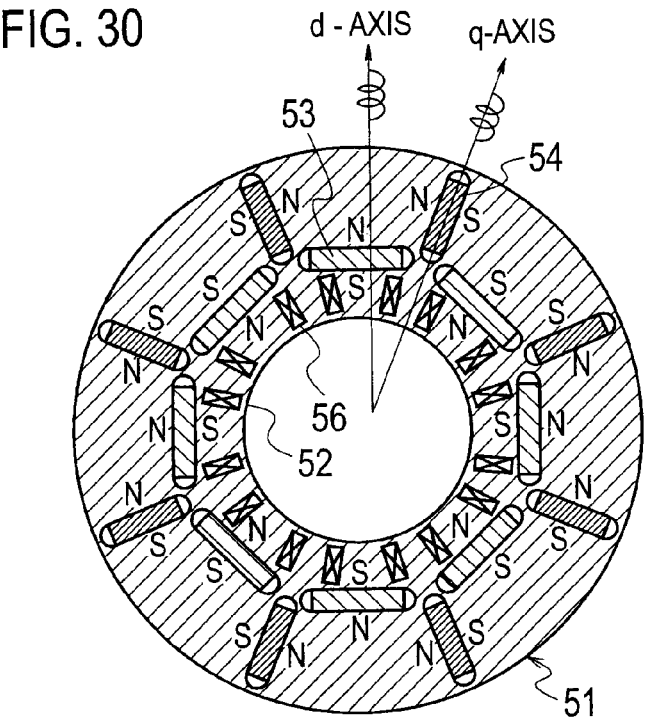
FIG. 30 is a schematic view showing an example of a rotor in a variable-flux motor according to the seventh embodiment of the present invention.

The rotor 51 of this embodiment shown in FIG. 30 includes a combination of a fixed magnet 54 of, for example, neodymium NdFeB having high coercive force and a variable magnet 53 of, for example, alnico AlNiCo having low coercive force, the combination being arranged on a rotor iron core 52. A magnetized direction of the variable magnet 53 is orthogonal to the Q-axis direction, and therefore, is free from the influence of a Q-axis current and can be magnetized with a D-axis current. The rotor 51 has the magnetize coil 56, which receives a current from the magnetize circuit 9 so that a magnetic field thereof may directly act on the variable magnet 53.

BH characteristics (flux density-magnetize characteristics) of the fixed magnet 54 and variable magnet 53 are similar to those of the first embodiment shown in FIGS. 4 and 5.

Next, characteristic parts of the variable-flux motor drive system for the variable-flux motor 4 according to this embodiment will be explained with reference to FIG. 29. Blocks characteristic to the variable-flux motor drive system are the flux command operate unit 12, flux request generate unit 17, and variable flux control unit 13.

The flux command operate unit 12 calculates flux (fixed magnet flux+variable magnet flux) that is suitable for a situation at the moment. The magnetization request generate unit 17 sets a magnetization request flag FCReq for requesting a magnetization process to magnetize (demagnetize or magnetize) the variable magnet when a flux command Φ* from the flux command operate unit 12 has changed or when the inverter enters into a run state (when Run* changes from 0 to 1).

If the magnetization request flag FCReq is set, the variable flux control unit 13 carries out a magnetization process to bring a flux amount after magnetization to the flux command Φ*. This is achieved by adding a magnetize correction amount ΔIdm* to a D-axis current reference IdR, to provide a D-axis current command Id*. The voltage command operate unit 10 calculates a D-axis voltage command Vd* so that a D-axis current may follow the D-axis current command Id*. So-called current PI control or the like is included in the voltage command operate unit 10.

This embodiment is characterized in that the rotor 51 of the variable speed motor 4 is provided with the magnetize coil 56 as shown in FIG. 30 and the magnetize coil 56 receives a magnetizing current from the magnetize circuit 128 through the slip ring 121 (FIG. 29).

First, the magnetize coil 56 provided for the variable-flux motor 4 will be explained. As shown in FIG. 30, the magnetize coil 56 is arranged in the vicinity of the variable magnet 53 of the rotor 51. This single-phase magnetize coil 56 is connected through the slip ring 121 to the magnetize inverter 120 of the magnetize circuit 128 as shown in FIG. 29. The magnetize inverter 120 is connected to the DC power source 127, to supply a magnetizing current Imag to the magnetize coil 56. The current passed to the magnetize coil 56 is detected by the current detector 124 and is input to the current control unit 119. The current control unit 119 generates a gate signal for the magnetize inverter 120 so that the detected magnetizing current may agree with the magnetizing current command value ImagRef.

The current passed to the magnetize coil 56 needs no regeneration and requires the magnetizing current Imag be passed in positive and negative directions (for magnetization and demagnetization), and therefore, the magnetize inverter 120 is realized by a known single-phase full-bridge inverter. The current control unit 119 controls a current by PI control so that the magnetizing current Imag may agree with the magnetizing current command value ImagRef. To pass the magnetizing current Imag, it is necessary to make it fast and accurate. Accordingly, the PI control may be replaced with a hysteresis comparator. The magnetizing current command ImagRef is generated by the variable flux control unit 13 like the related art.

This configuration can pass the predetermined magnetizing current Imag to the magnetize coil 56 embedded in the rotor 51, to directly control the magnetization of the variable magnet 53 by a magnetic field created by the magnetizing current Imag. Compared to the related art that passes an excessively large D-axis current to a main coil for magnetization, the magnetizing current Imag to the magnetize coil 56 can variably control the flux of the variable magnet 53.

This results in decreasing the current capacity of the inverter 1, thereby reducing the size, weight, and cost of the inverter 1. The flux of the magnetize coil 56 embedded in the rotor iron core 52 is synchronized with magnet flux, and therefore, there is no flux that links with the magnetize coil 56 and temporally changes. As a result, the magnetize coil 56 does not generate a counter electromotive voltage, and therefore, a DC voltage of the magnetize inverter 120 may be greatly lower than that of the inverter 1. This allows small-capacity, large current elements to be adopted, to reduce the capacity of the magnetize inverter 120.

If the inverter 1 is used for magnetizing the variable magnet 53, the variable magnet 53 and fixed magnet 54 enhance each other. In this case, flux on the stator side saturates, so that a magnetic field created by a magnetizing current, if it is passed, hardly acts on the variable magnet. Compared to demagnetizing the variable magnet 53, magnetizing the variable magnet 53 needs an excessively large magnetizing current to be passed to a stator coil. This results in increasing the rated capacity of each element of the inverter 1, to increase the cost and size of the system.

To cope with this, the embodiment arranges the magnetize coil 56 on the rotor 51, to eliminate the influence of magnetic saturation. With a minimum current from the magnetize inverter 120, the variable magnet 53 can easily be magnetized.

If an excessively large magnetizing current is passed as a stator D-axis current, a transitional current response thereof may generate transient torque. In particular, if the variable-flux motor is salient, passing the D-axis current may vary reluctance torque to vary the torque of the variable-flux motor 4. Namely, passing an excessively large magnetizing current as a D-axis current causes an excessively large torque variation. Such a torque variation may induce mechanical vibrations in the case of a vehicle and increase a risk of badly affecting the system. In the case of a vehicle, the passengers may feel uncomfortable.

To cope with this, the embodiment passes only a required minimum magnetizing current, to minimize the generation of transient torque. In particular, when the motor is salient, the current passed to the magnetize coil 56 will not directly cause reluctance torque. Compared to the related art that employs the inverter 1 for magnetization from the stator side, the embodiment can remarkably suppress torque variations due to magnetization.

When passing a magnetizing current from the inverter 1, a voltage margin is needed. Generally, an output voltage changes according to a speed. For high-speed rotation, a one-pulse mode is adopted to increase an output voltage and decrease a loss. When operating the inverter 1 at a maximum output voltage, there is no margin to pass a positive magnetizing current, i.e., a positive D-axis current in order to increase the flux of the variable magnet 53. If there is no voltage margin, a magnetizing current slowly rises to elongate a period for passing the current. During this period, the temperature of the inverter 1 increases to cause a risk of breaking the system. To avoid this, a cooler must be enhanced.

To cope with this, this embodiment produces no counter electromotive voltage on the magnetize coil 56 and causes no state in which no magnetize voltage margin is present due to other factors like the case of the inverter 1. The embodiment can optionally apply a voltage at any time to pass a magnetizing current. If the inverter 1 is employed for magnetization, there will be no inductance freedom. Motor inductance is designed in consideration of the output and efficiency of the motor, and therefore, optimizing magnetization is not always given high priority. On the other hand, employing the exclusive-use magnetize coil 56 increases the freedom of designing inductance to realize optimum inductance for magnetization.

In the above explanation, the magnetize coil 56 generates flux to magnetize the variable magnet 53. For this, the magnetize coil 56 is arranged close to the variable magnet 53, as shown in FIG. 30. Instead, as shown in FIG. 31, the magnetize coil 56 may be arranged close to the fixed magnet 54 so that the flux generated by the magnetize coil 56 may cancel the flux of the fixed magnet 54.

Figure 31:
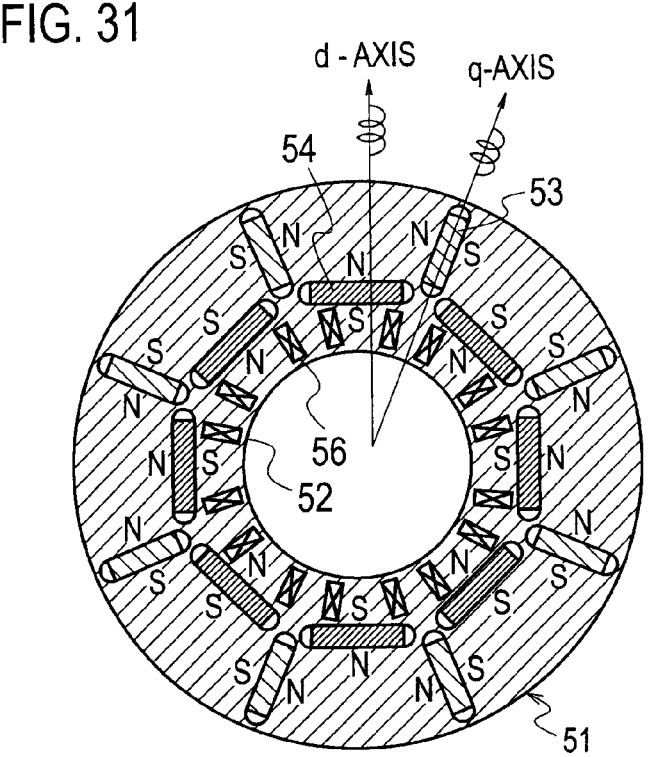
FIG. 31 is a schematic view showing another example of the rotor in the variable-flux motor according to the seventh embodiment of the present invention.

In a rotor 51 shown in FIG. 31, the magnetize coil 56 is arranged in the vicinity of the fixed magnet 54 that is a high coercive force magnet. This arrangement weakens the flux of the fixed magnet 54 by passing a magnetizing current to the magnetize coil 56.

As explained above, the problem caused when the inverter 1 passes a magnetizing current is that the stator side magnetically saturates when magnetizing the variable magnet 53. To completely magnetize the variable magnet 53, an excessively large stator current must be passed. Passing such an excessively large current may produce torque variations at the time of magnetization. Also, an increase in the current capacity of the inverter 1 raises a problem of increasing the cost and volume of the system.

To cope with this, the embodiment of FIG. 31 arranges the magnetize coil 56 to weaken the flux of the fixed magnet 54. The magnetize coil 56 acts on the fixed magnet 54, to cancel the flux of the fixed magnet 54. This reduces magnetic saturation of the stator side, so that the inverter 1 may pass a smaller magnetizing current to magnetize the variable magnet 53.

Figure 32:
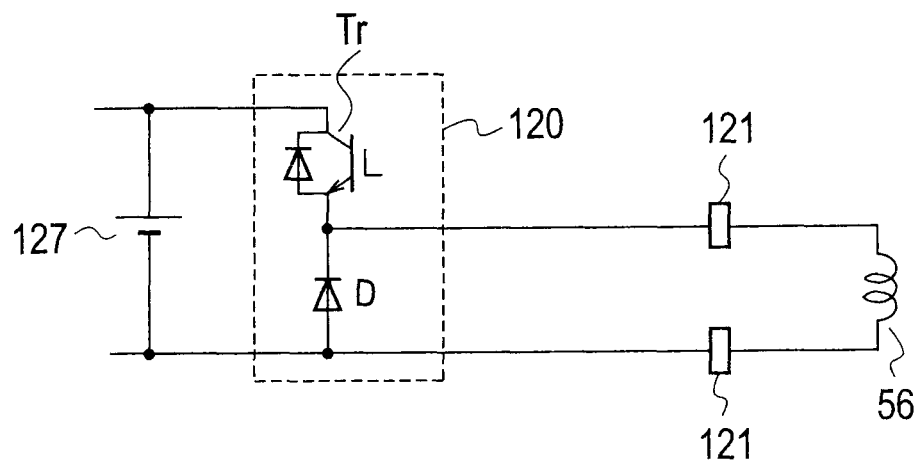
FIG. 32 is a circuit diagram showing an example of an internal configuration of a magnetize inverter according to the seventh embodiment of the present invention.
Figure 33:
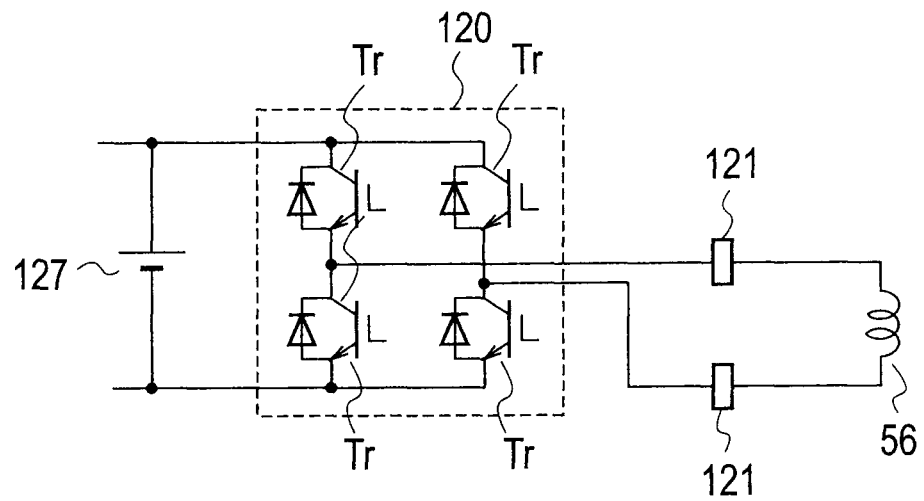
FIG. 33 is a circuit diagram showing another example of an internal configuration of the magnetize inverter according to the seventh embodiment of the present invention.

In this case, the magnetize inverter 120 may be simplified to operate only in a single quadrant to pass only a negative magnetizing current. For example, as shown in FIG. 32, the magnetize inverter 120 may consist of one switching element Tr and one diode D. On the other hand, if the magnetizing current must be passed in both directions, a full-bridge inverter capable of operating in two quadrants is needed. The full-bridge inverter must have, for example, four switching elements Tr as shown in FIG. 33, to allow the magnetize inverter 120 to pass positive and negative currents to the magnetize coil 56. In this way, the embodiment can simplify the magnetize inverter 120, to reduce the size and cost of the system.

Figure 34:
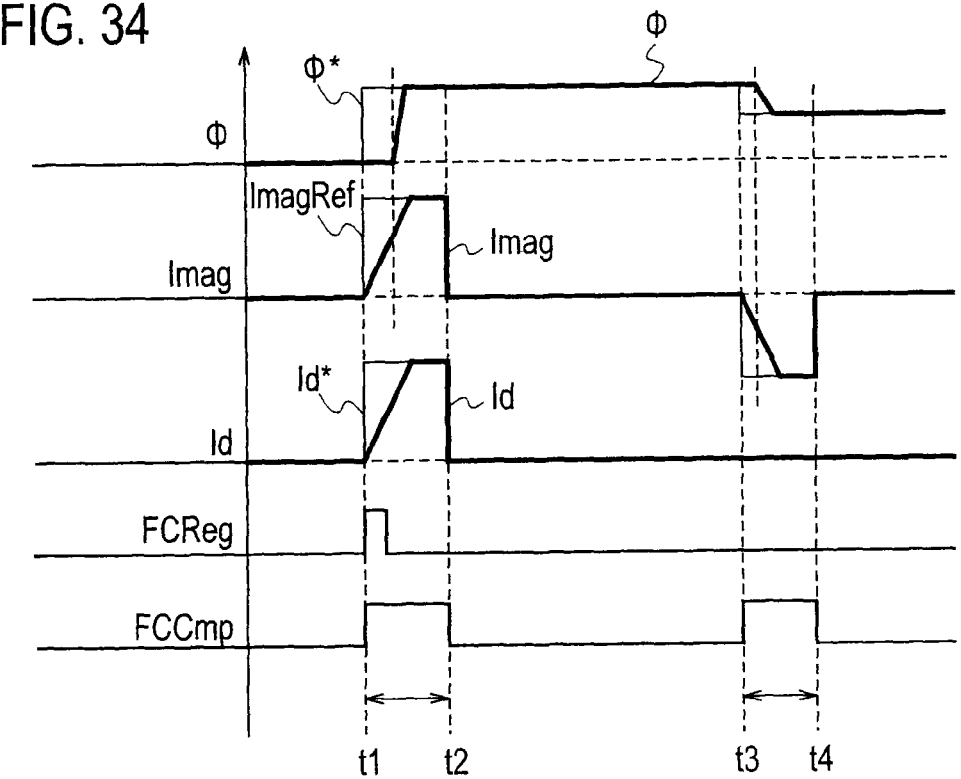
FIG. 34 is a waveform diagram showing examples of waveforms when a magnetize coil is used for magnetization according to the seventh embodiment of the present invention.

FIG. 34 is a waveform diagram showing examples of waveforms when the magnetize coil 56 is used for magnetization. The case shown in FIG. 34 carries out magnetization not only with the magnetize coil 56 but also with the inverter 1. When the flux command $\Phi^*$ calculated by the flux command operate unit 12 changes, the magnetization request generate unit 17 instantaneously sets the magnetization request flag FCReq to "1." Receiving the magnetization request flag FCReq, the variable flux control unit 13 carries out a magnetization process for a predetermined time Ta. The magnetization process provides the magnetizing current command value ImagRef for the magnetize coil 56 and the D-axis current command Id* that is a current command for the magnetization by the main control unit 122 of the inverter 1.

A magnetizing current Imag and a D-axis current Id of the inverter 1 are used to control and pass currents. The magnetizing current Imag and D-axis current Id form magnetic fields to change the variable magnet. In FIG. 34, magnetization between time points t1 and t2 magnetizes the variable magnet 53 and magnetization between time points t3 and t4 demagnetizes the variable magnet 53.

Compared to the demagnetizing side, the magnetizing side is not easy due to magnetic saturation. Accordingly, the magnetization is carried out simultaneously from the magnetize coil 56 and inverter 1. On the other hand, the demagnetizing side is easier than the magnetizing side, and therefore, only the magnetize coil 56 is used.

Magnetization by the inverter 1 more or less causes torque variation, and therefore, is not preferable. If the magnetize coil 56 alone is insufficient for magnetization, the inverter 1 may be used in harmony with the magnetize coil 56, to easily carry out the magnetization.

Figure 35:
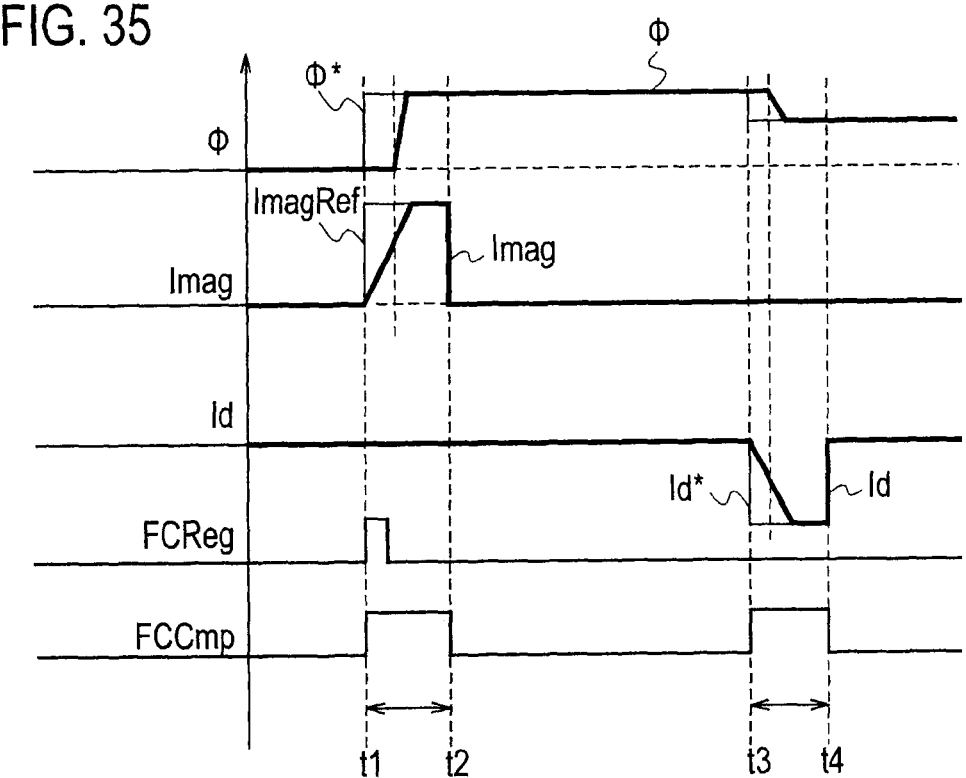
FIG. 35 is a waveform diagram showing other examples of waveforms when the magnetize coil is used for magnetization according to the seventh embodiment of the present invention.

FIG. 35 is a waveform diagram showing another example of a magnetization process. The magnetize coil 56 acts only on the magnetizing side. As mentioned above, the demagnetizing side is easier than the magnetizing side, and therefore, is achieved by the inverter 1 without operating the magnetize circuit 128, i.e., without passing a magnetizing current to the magnetize coil 56. In this case, the magnetize inverter 120 can be simplified to operate in one quadrant as shown in FIG. 32. This contributes to reduce the size and weight of the system. A gate of the magnetize inverter 120 is turned on only during a magnetization process (t1 to t2 and t3 to t4).

Figure 36:
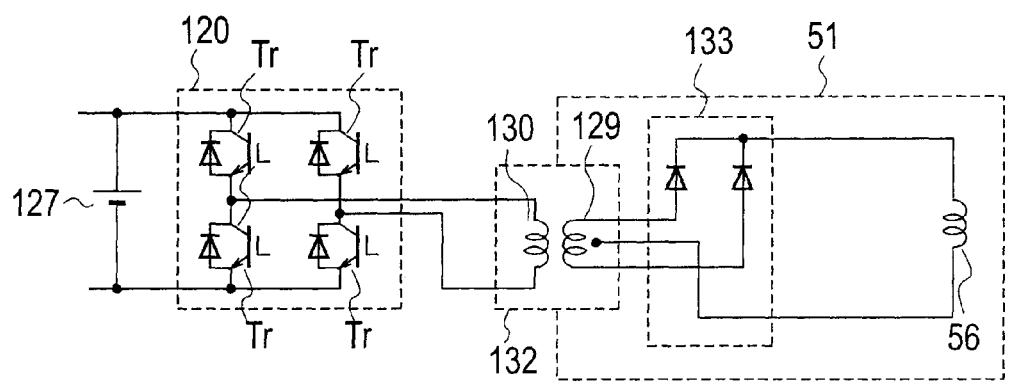
FIG. 36 is a schematic view showing an example of noncontact power supply from a magnetize circuit to a magnetize coil of a rotor according to the seventh embodiment of the present invention.

Power supply from the magnetize circuit 128 to the magnetize coil 56 of the rotor 51 may be achieved in a noncontact manner. FIG. 36 is a schematic view showing such a case. In FIG. 29, the magnetize inverter 120 supplies power through the slip ring 121 to the magnetize coil 56. In FIG. 36, a rotary transformer 132 supplies power to the magnetize coil in a noncontact manner. The rotary transformer 132 has a power-supply-side winding 130 arranged on the stator and a power-receive-side winding 129 arranged on the rotor 51.

The magnetize inverter 120 applies to the magnetize coil 56 a high-frequency voltage conforming to a magnetizing current command. The power receiving coil 129 of the rotary transformer 132 induces the same voltage. The power-receive-side winding 129 has a neutral point and a rectify circuit 133 to conduct full-wave rectification. An output of the rectify circuit 133 is connected to the magnetize coil 56, which receives the full-wave-converted direct current and passes a magnetizing current to change the flux of the variable magnet 53.

Compared to the slip ring 121, this embodiment can conduct magnetization in a noncontact manner, to improve maintenance performance and reliability. The circuit on the power receiving side includes only the diodes that are arranged on the rotor 51 that may increase temperature. However, improved semiconductor technology such as SiC may cause no temperature problem. As mentioned above, the magnetize coil 56 needs a small voltage and the rotary transformer needs no large space.

Figure 37:
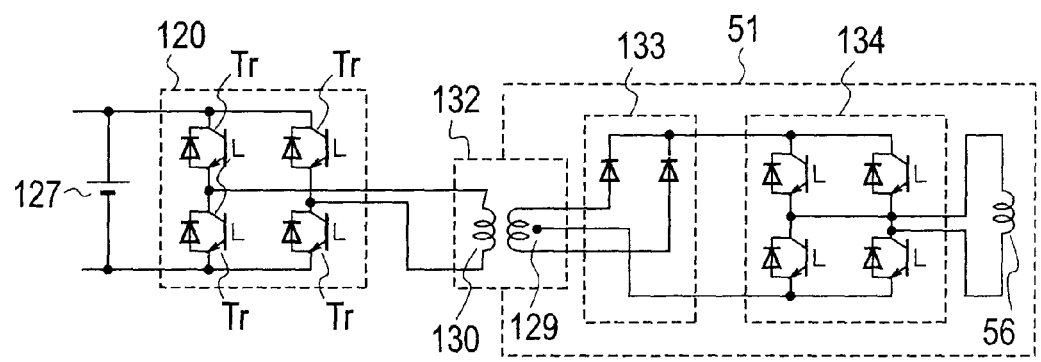
FIG. 37 is a schematic view showing another example of noncontact power supply from the magnetize circuit to the magnetize coil of the rotor according to the seventh embodiment of the present invention.

In this example, the current to the magnetize coil 56 is passed in one direction. When the inverter 1 is used for magnetization, it is not necessary to pass an excessively large stator current because the stator will not magnetically saturate, as shown in the waveforms of FIG. 34. If a magnetizing current is passed in both directions as shown in FIG. 35, the DC output side of the rectifier 133 may have a second magnetize inverter 134 as shown in FIG. 37. This configuration can pass a magnetizing current in both directions through the magnetize coil 56. The magnetize circuit 128 may be arranged on the rotor 51 of the variable-flux motor 4. In this case, the slip ring 121 and rotary transformer 132 are not necessary.

(Eighth Embodiment)

Figure 38:
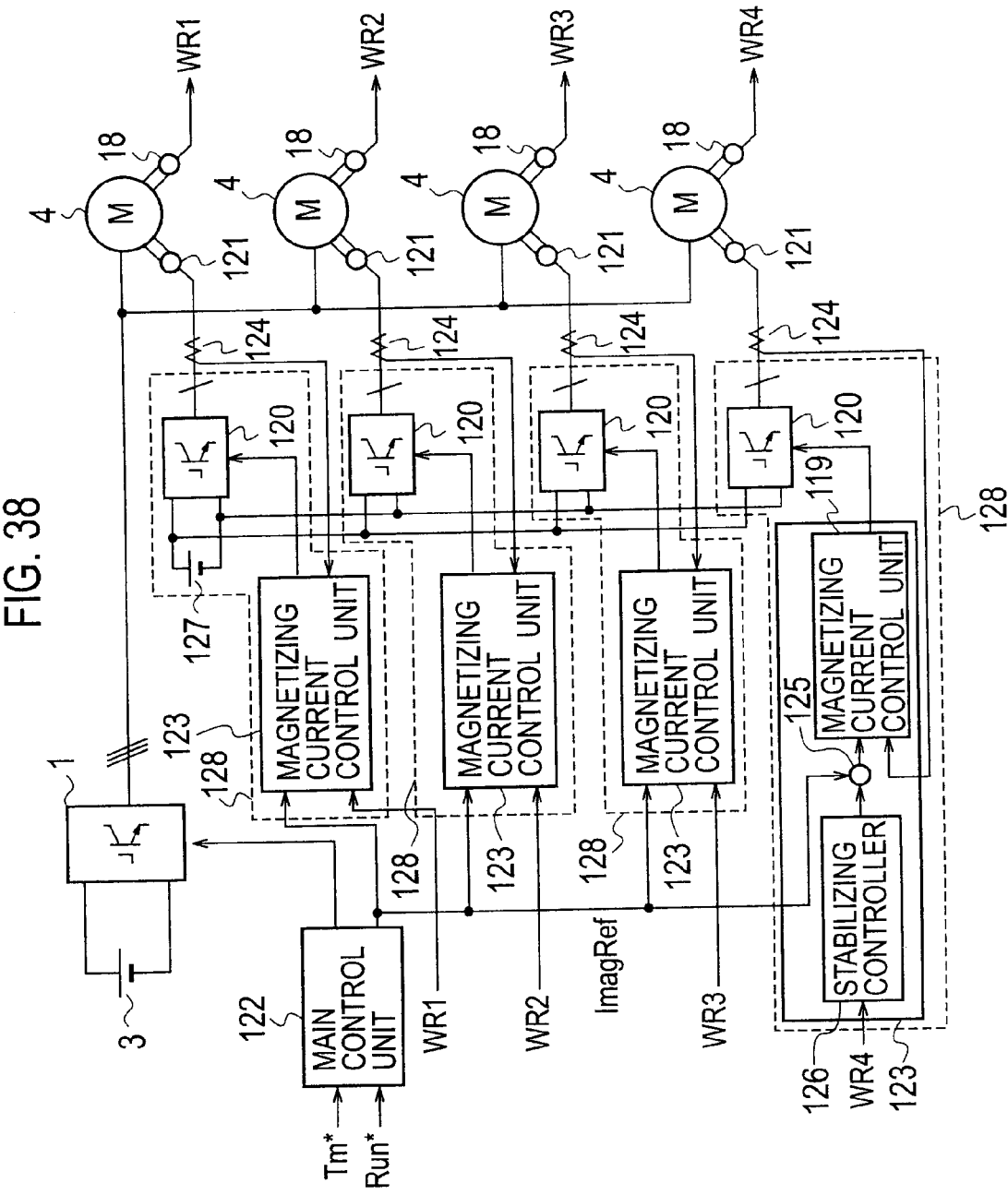
FIG. 38 is a block diagram showing a variable-flux motor drive system according to an eighth embodiment of the present invention.

A variable-flux motor drive system according to the eighth embodiment of the present invention will be explained with reference to FIG. 38. According to the seventh embodiment shown in FIG. 29, one inverter 1 drives one variable-flux motor 4. On the other hand, the variable-flux motor drive system of this embodiment drives four variable-flux motors 4 by one inverter 1. In FIG. 38, parts common to those of the seventh and other embodiments are represented with the common reference marks.

A main control unit 122 of the inverter 1 is constituted like that of FIG. 29. Each variable-flux motor 4 is provided with a magnetize circuit 128 including a magnetizing current control unit 123 and a magnetize inverter 120. A DC power source 127 is commonly arranged. The magnetizing current control unit 123 additionally has a stabilizing controller 126 whose output is added to a magnetizing current command ImagRef. The stabilizing controller 126 receives the number of revolutions WR(x) of the variable-flux motor 4(*x*), differentiates the same, multiplies the result by a gain, and outputs the product to correct the magnetizing current command ImagRef.

Generally, driving a plurality of synchronous motors with one inverter 1 may vibrate and destabilize the numbers of revolutions of the synchronous motors, if load on the variable-flux motors 4 is unbalanced. The inverter 1 has no means to stabilize the individual synchronous motors, and therefore, may loss synchronism and become inoperable. Due to this, there are few examples to simultaneously drive synchronous motors. The system employing one inverter for one synchronous motor, i.e., one variable-flux motor 4 is higher in cost compared to a drive system capable of simultaneously driving a plurality of, for example, induction motors.

On the other hand, the embodiment shown in FIG. 38 has the stabilizing controller 126 that can pass a magnetizing current to suppress a fluctuation in the number of revolutions of the variable-flux motor 4 caused by load imbalance. This stabilizes the number of revolutions of each variable-flux motor 4.

Torque of the variable-flux motor 4 is determined by magnet flux and stator current. The stator current is common and is uncontrollable. By increasing the flux of a variable magnet 53 with a current of a magnetize coil 56, total flux becomes controllable. To stabilize the number of revolutions, a variation in the number of revolutions may be fed back to torque (because it is equivalent to viscous friction). This is realized by feeding back a differentiation of the number of revolutions. Providing the magnetize coil 56 for each variable-flux motor 4 may realize a simultaneous operation of the variable-flux motors 4 that are synchronous motors. Such a simultaneous operation is unachievable by related arts. The embodiment centrally arranges the inverter 1, to reduce the size and cost of the system.

As explained above, the magnetize coil 56 provided for the rotor 51 produces no counter electromotive voltage, and therefore, a necessary voltage is small. Basically, applying a voltage corresponding to coil resistance is sufficient. Compared to magnetization with the inverter 1, the embodiment can very easily magnetize the variable magnet 53 and can always individually control torque with the use of the magnetize coil 56.

(Ninth Embodiment)

Figure 39:
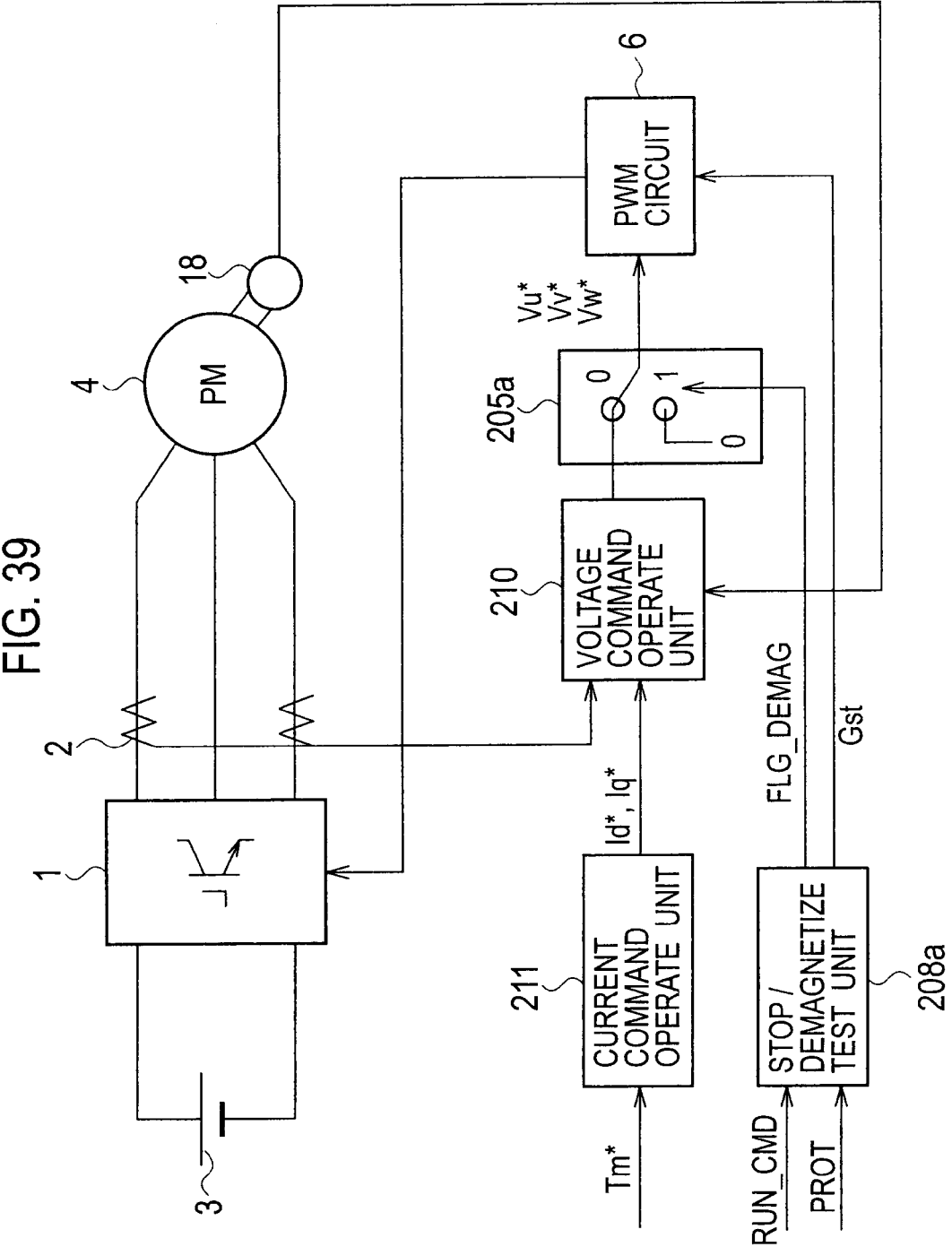
FIG. 39 is a block diagram showing a variable-flux motor drive system according to a ninth embodiment of the present invention.

FIG. 39 is a block diagram showing a configuration of a variable-flux motor drive system according to the ninth embodiment of the present invention. In FIG. 39 and in the below-mentioned embodiments, elements that are the same as or equivalent to those of the embodiments already explained are represented with the same reference marks to omit repetitive explanations. A permanent-magnet synchronous motor, i.e., a variable-flux motor 4 is the same as that of the first embodiment shown in FIGS. 2 to 5.

The variable-flux motor drive system according to this embodiment includes the variable-flux motor 4, a current detector 2, a DC power source 3, an inverter 1 to invert DC power into AC power, a switch 205a, a PWM circuit 6, a stop/demagnetize test unit 208a, a voltage command operate unit 210, a current command operate unit 211, and a rotational angle sensor 18. The variable-flux motor drive system is dividable into a main circuit and a control circuit. The DC power source 3, inverter 1, variable-flux motor 4, current detector 2 for detecting a motor current, and rotational angle sensor 18 for detecting a rotational angle of the variable-flux motor 4 form the main circuit. The switch 205a, PWM circuit 6, stop/demagnetize test unit 208a, voltage command operate unit 210, and current command operate unit 211 form the control circuit. The variable-flux motor 4 has a variable magnet (for example, an alnico magnet) that is a permanent magnet of low coercive force.

The inverter 1 drives the variable-flux motor 4. Also, the inverter 1 corresponds to the magnetize unit of the present invention, to supply a magnetizing current for controlling the flux of the variable magnet of the variable-flux motor 4. Further, the inverter 1 corresponds to the demagnetize unit of the present invention, to demagnetize the variable magnet according to a demagnetize signal generated by the stop/demagnetize test unit 208a. The inverter 1 is directly connected to the variable-flux motor 4, and unlike related arts, needs no load contactor. According to the embodiment, there is one demagnetize unit. It is possible to arrange a plurality of demagnetize units. An embodiment employing a plurality of demagnetize units will be explained later.

The stop/demagnetize test unit 208a corresponds to the demagnetization test unit of the present invention that tests if the variable magnet of the variable-flux motor 4 must be demagnetized, and according to a result of the test, generates a demagnetize signal. If the inverter 1 stops to operate or if a failure occurs inside or outside the variable-flux motor drive system, the stop/demagnetize test unit 208a determines to demagnetize the variable magnet and generates the demagnetize signal to stop the system for protection.

Figure 57:
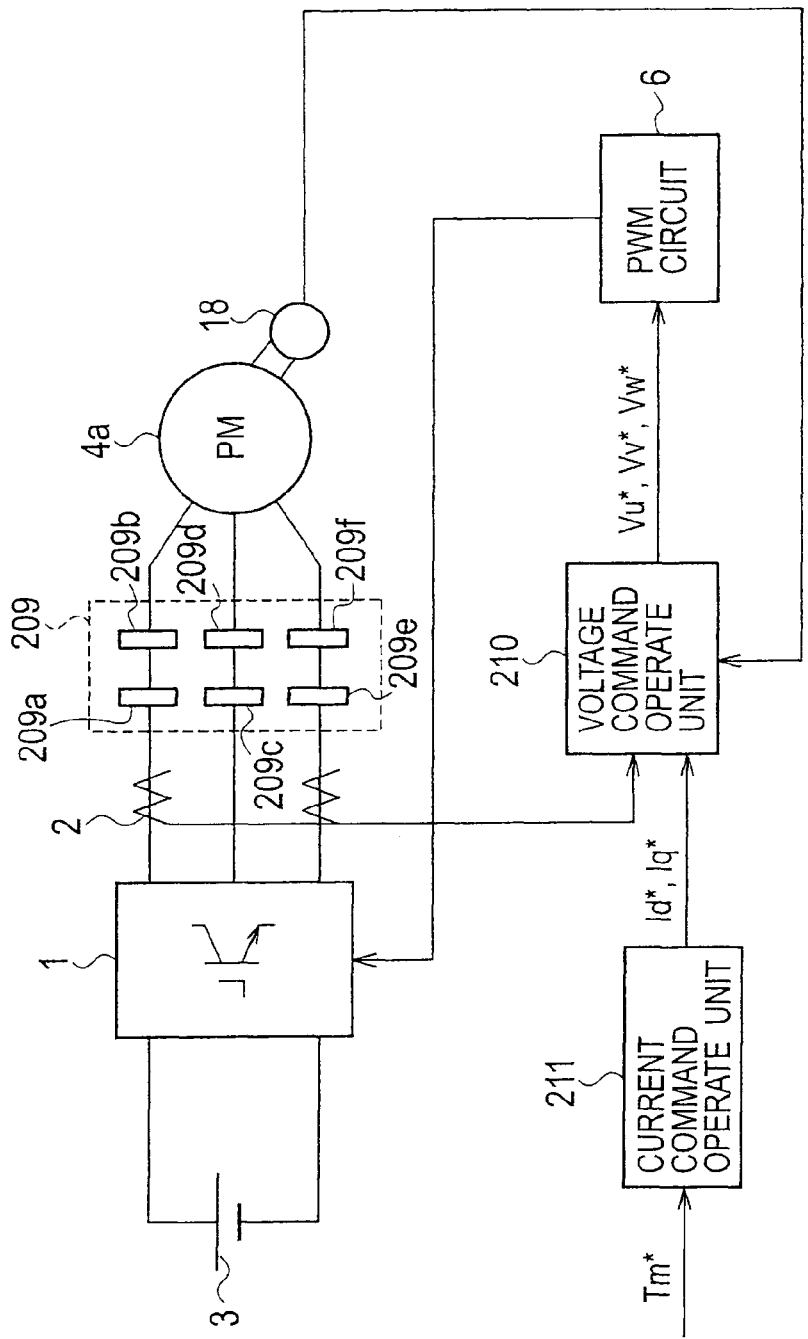
FIG. 57 is a block diagram showing a variable-flux motor drive system according to a related art.

The voltage command operate unit 210, current command operate unit 211, and rotational angle sensor 18 are the same as those of the related art shown in FIG. 57, and therefore, repetitive explanations are omitted.

The switch 205a switches an output to another according to a demagnetize signal generated by the stop/demagnetize test unit 208a. If no demagnetize signal is provided from the stop/demagnetize test unit 208a (demagnetize flag FLG_DEMAG=0), the switch 205a provides the PWM circuit 6 with three-phase voltage commands Vu*, Vv*, and Vw* generated by the voltage command operate unit 210.

On the other hand, if the stop/demagnetize test unit 208a outputs a demagnetize signal (demagnetize flag FLG_DEMAG=1), the switch 205a outputs 0. In this case, the PWM circuit 6 provides the inverter 1 with a control signal so that U, V, and W phases simultaneously repeat ON/OFF operations. The inverter 1, therefore, short-circuits wires of the variable-flux motor 4 to demagnetize the variable magnet.

Figure 40:
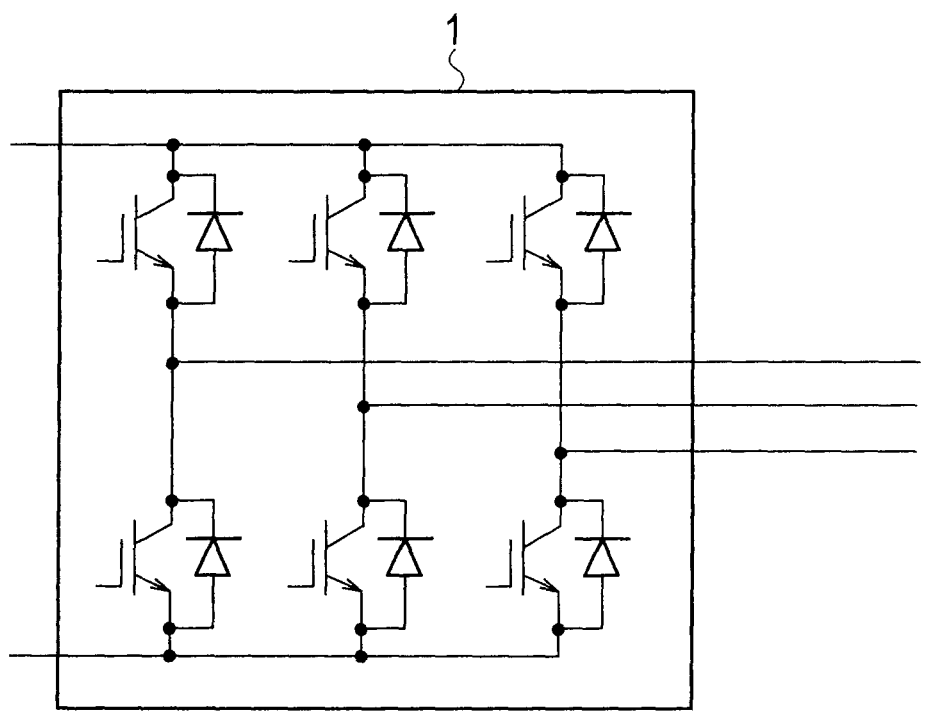
FIG. 40 is a circuit diagram showing an inverter used by the variable-flux motor drive system according to the ninth embodiment of the present invention.

FIG. 40 shows a detailed configuration of the inverter 1. As mentioned above, the stop/demagnetize test unit 208a outputs a demagnetize signal to simultaneously turn on or off three-phase switching elements. Consequently, the inverter 1 short-circuits the wires of the variable-flux motor 4, to demagnetize the variable magnet 53. One method of demagnetizing the variable magnet 53 of the variable-flux motor 4 is to turn on one of the six switching elements of the inverter 1. Turning on one of the switching elements may bring the rotor 51 to a predetermined phase angle, so that a demagnetizing current may be passed to demagnetize an induced voltage. The induced voltage of the variable-flux motor 4 causes a problem if the variable-flux motor 4 is rotating. Due to the rotation, the rotor 51 surely crosses the predetermined rotational phase angle, and therefore, the variable magnet 53 can be demagnetized.

Another method is to decrease an output voltage of the inverter 1, to achieve demagnetization. Short-circuiting the wires of the variable-flux motor 4 is equal to zeroing the output voltage of the inverter 1. Only by decreasing the output voltage, demagnetization is sufficiently achieved. For example, like a normal magnetization process, a magnetizing current command necessary for achieving a demagnetize target flux amount is given as a D-axis current command, to pass a magnetizing current for demagnetization. The output voltage decreases in response to a decrease in magnet flux, i.e., demagnetization of the magnet depending on a period for passing the magnetizing current.

When the demagnetize unit of the present invention short-circuits at least one wire-to-wire of the variable-flux motor 4 for demagnetization and when a demagnetizing current is at a predetermined level, the short-circuit period may be very short. Only an instantaneous short circuit will be sufficient.

Figure 41:
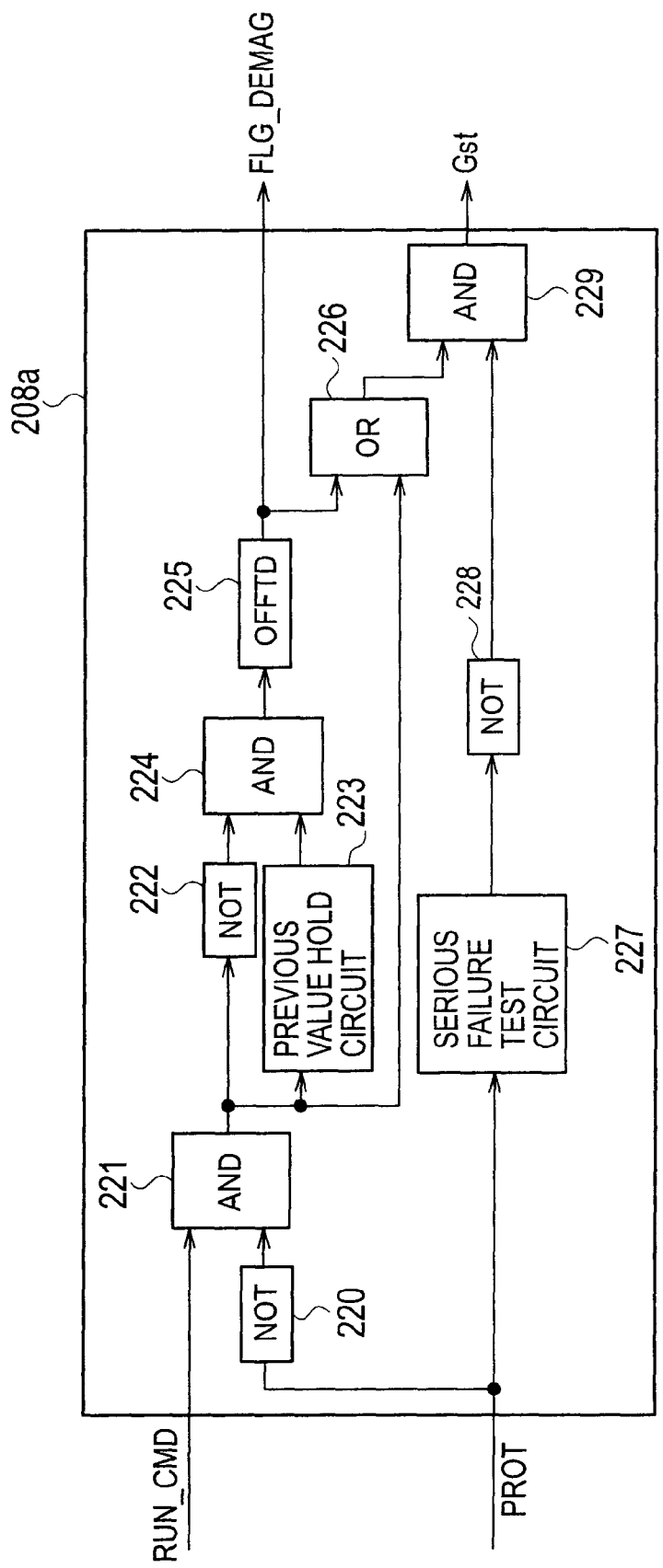
FIG. 41 is a block diagram showing an example of an internal configuration of a stop/demagnetize test unit used by the variable-flux motor drive system according to the ninth embodiment of the present invention.

Operation of the embodiment having the above-mentioned configuration will be explained. FIG. 41 is a block diagram showing a detailed configuration of the stop/demagnetize test unit 208a. Inputs to the unit are a protect signal PROT and a run command RUN_CMD. These signals are generated by proper means in the system. Based on these signals, the stop/demagnetize test unit 208a gets the timing when the inverter 1 stops operation or the timing when the variable-flux motor drive system must be protected.

Basically, when the run command is entered, the run command is in a run state (RUN_CMD=1), and when the run command specifies stoppage, the run command is in a stop state (RUN_CMD=0).

Figure 42:
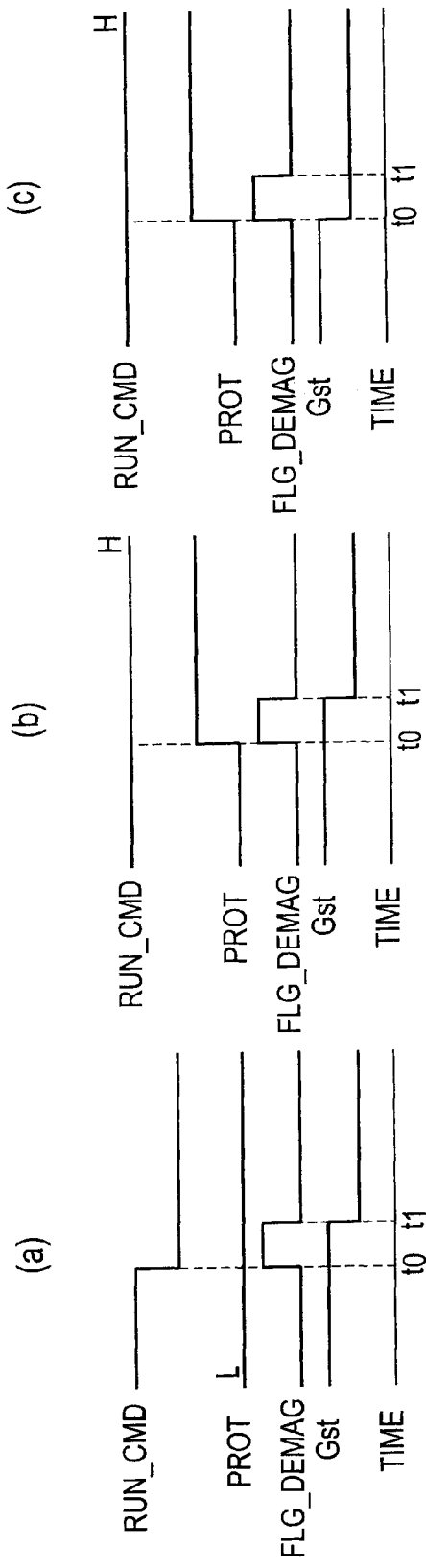
FIG. 42 shows timing charts of demagnetize control of the variable-flux motor drive system according to the ninth embodiment of the present invention.

First, a normal stoppage will be explained. FIG. 42(*a*) shows states of signals along a time axis during the normal stoppage. In a normal run state, the run command RUN_CMD=1 and the protect signal PROT=0. Accordingly, a NOT circuit 220 outputs 1 and an AND circuit 221 also outputs 1. Here, the output from the AND circuit 221 is considered as a run command including protection.

If the normal run continues, a previous value hold circuit 223 outputs 1. Since a NOT circuit 222 outputs 0, an AND circuit 224 outputs 0. On receiving 1, an OFF time delay (OFFTD) circuit 225 outputs 0 after a predetermined time. In this example, 0 is continuously supplied to the OFFTD circuit 225, and therefore, the OFFTD circuit 225 continuously outputs 0. As a result, a demagnetize flag FLG_DEMAG=0. An OR circuit 226 outputs 1.

A serious failure test circuit 227 obtains, through a proper means, a state of the variable-flux motor drive system. If the variable-flux motor drive system is sound, or in a state of minor failure, or in a state of other apparatus abnormality, the serious failure test circuit 227 outputs 0. If the variable-flux motor drive system has a serious failure, the serious failure test circuit 227 outputs 1. In this example, the system is sound, and therefore, the serious failure test circuit 227 outputs 0. Accordingly, a NOT circuit 228 outputs 1 and an AND circuit 229 outputs 1.

As a result, the stop/demagnetize test unit 208a outputs a gate command Gst of 1. Based on the gate command Gst generated by the stop/demagnetize test unit 208a, the PWM circuit 6 controls (gates on) switching elements incorporated in the inverter 1.

At time t0 of FIG. 42(a), the run command specifies stoppage (RUN_CMD=0), the OFFTD circuit 225 receives 1, and the demagnetize flag rises (FLG_DEMAG=1). At the time to, the gate command Gst keeps 1. Since the demagnetize flag is ON, the switch 205a outputs 0 as mentioned above. In this case, the PWM circuit 6 provides the inverter 1 with a control signal so that the U, V, and W phases simultaneously repeat ON/OFF operations. Consequently, the inverter 1 short-circuits the wires of the variable-flux motor 4, to demagnetize the variable magnet.

After elapsing a predetermined time from the time to, the OFFTD circuit 225 outputs 0 at time t1. As a result, the demagnetize flag falls (FLG_DEMAG=0). Only during the interval (from t0 to t1) in which the demagnetize flag is ON, the switch 205a outputs 0 and the inverter 1 carries out demagnetization.

At the time t1, the gate command Gst becomes 0. Accordingly, the switching elements of the inverter 1 are gated off and the inverter 1 stops operating.

Next, a protective stoppage at a minor failure will be explained. FIG. 42(b) shows signal states along a time axis at the time of protective stoppage at a minor failure. At time t0, the protection signal PROT changes from 0 to 1. The AND circuit 221 outputs a run command including protection of 0. Then, the OFFTD circuit 225 outputs 1 and the demagnetize flag rises (FLG_DEMAG=1), to carry out demagnetization by the inverter 1. After passing a predetermined time, the gate command Gst becomes 0 at time t1. As a result, the switching elements of the inverter 1 are gated off and the inverter 1 stops operating. What is different from the normal stoppage is that the run command keeps the run state (RUN_CMD=1) and the protection signal PROT becomes 1 to carry out demagnetization and stop the inverter 1.

Lastly, a protective stoppage at a serious failure will be explained. FIG. 42(c) shows signal states along a time axis at a protective stoppage at a serious failure. Criteria for minor failure and serious failure can optionally be set by a designer or a user. Usually, the serious failure is a failure that is of the system, is dangerous if gates are turned on according to a gate command, and needs the system to be stopped at once. At time t0, the protection signal PROT changes from 0 to 1. At the same time, the serious failure test circuit 227 outputs 1 to indicate that it is a serious failure. As a result, the gate command Gst becomes 0 to immediately stop the inverter 1.

At the time t0, the OFFTD circuit 25 outputs 1 and the demagnetize flag rises (FLG_DEMAG=1). However, the inverter 1 is stopped, and therefore, no demagnetization is carried out.

As explained above, the variable-flux motor drive system of this embodiment carries out demagnetization when the variable-flux motor drive system must be protected or when the inverter 1 stops. This suppresses a counter electromotive voltage, prevents a braking force, and safely protects the system.

When the stop/demagnetize test unit 208a outputs a demagnetize signal, the inverter 1 is controlled to simply carry out demagnetization. Accordingly, existing apparatuses can effectively be used to realize this system. Carrying out demagnetization can suppress a counter electromotive voltage, to eliminate the load contactor 209 shown in FIG. 57, thereby reducing costs.

Although this embodiment directly connects the inverter 1 and variable-flux motor 4 to each other, a contactor for controlling electrical connection may be arranged between the inverter 1 and the variable-flux motor 4 like the related art. In this case, the demagnetization test unit 208a outputs a control signal to open the contactor when the inverter 1 stops to operate or when the variable-flux motor drive system must be protected. This configuration improves the reliability of the variable-flux motor drive system. This variable-flux motor drive system has the inverter 1 serving as a demagnetize unit, and therefore, each phase may have only one contactor (instead of dual arrangement).

Figure 43:
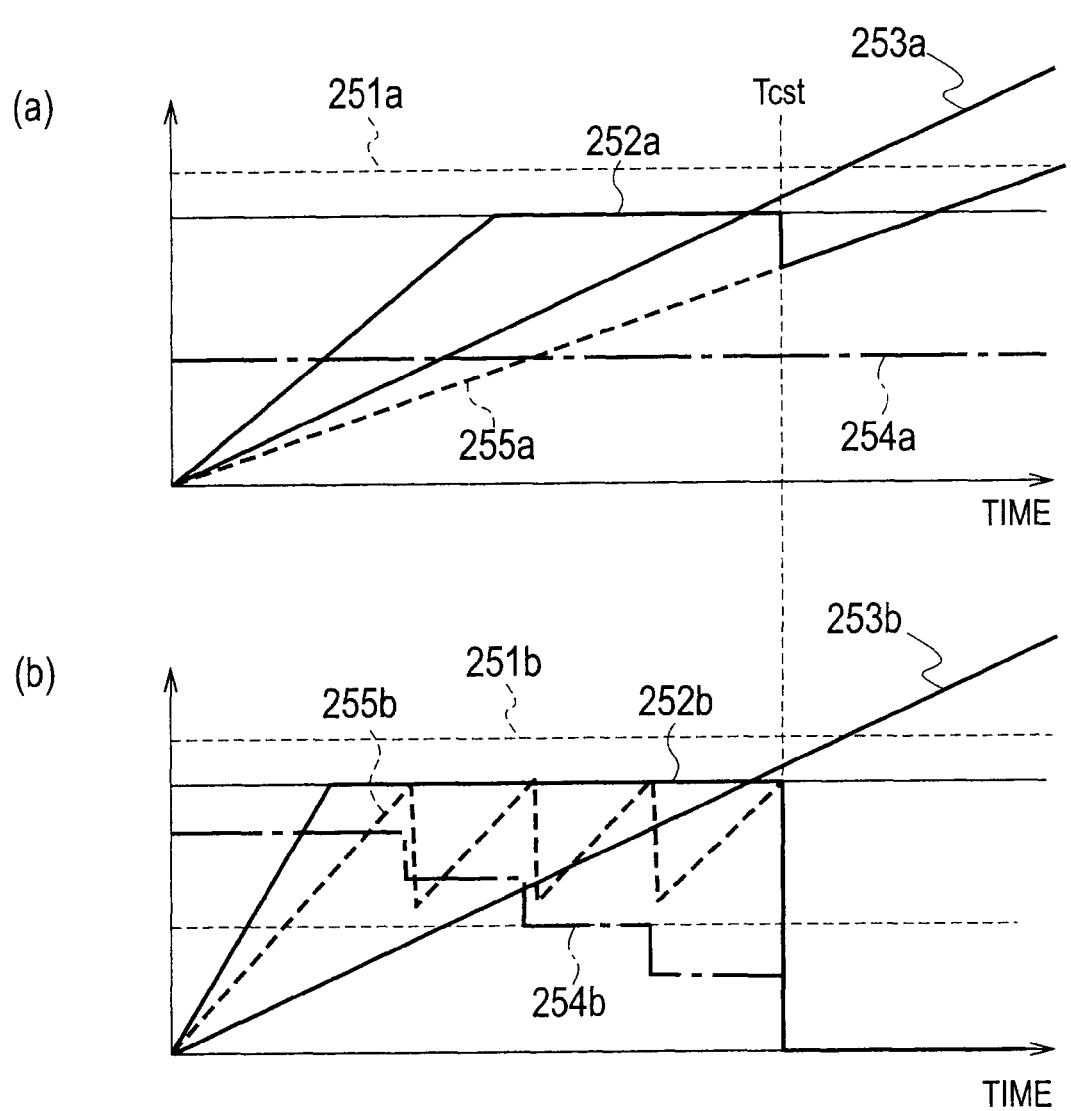
FIG. 43 is an explanatory view showing a comparison of flux control between an existing drive and the variable-flux motor drive according to the ninth embodiment of the present invention.

FIG. 43 shows a comparison of flux control between an existing drive and the variable-flux motor drive of the embodiment. In FIGS. 43, 251a and 251b are inverter withstand voltages, 252a and 252b are motor terminal voltages, 253a and 253b are rotational speeds, 254a and 254b are magnet flux amounts, and 255a and 255b are counter electromotive voltages. Tcst is the timing of coasting.

FIG. 43(a) shows flux control of the existing drive, i.e., a fixed-flux permanent-magnet synchronous motor (PRM). The magnet flux 254a of the PRM is constant without regard to rotational speed, and therefore, the generated counter electromotive voltage 255a increases according to an increase in the rotational speed 253a. In the case of an electric train, EV, HEV, or ship, a plurality of drive systems drive a single object. In this case, each drive is unable to determine by itself the speed (the number of revolutions of a motor) of the object. An external force (wind, slope, and the like) acting on the object may accelerate the object. In such a case, the rotational speed will increase even if the inverter 1 is stopped so that the motor rotates by inertia and the counter electromotive voltage 255a increases according to the rotational speed. As explained above, there is a possibility that the counter electromotive voltage 255a exceeds the withstand voltage 251a of the inverter 1 to break the drive, generate a braking force applied to the motor, and cause a short circuit failure.

To cope with this, the variable-flux motor drive of the embodiment shown in FIG. 43(b) carries out demagnetization when stopping the inverter 1, to minimize the magnet flux 254b. Even if the rotational speed 253b increases when the variable-flux motor 4 rotates by inertia, the counter electromotive voltage 255b is suppressed to safely protect the system. In a low-speed zone, the magnet flux 254b can be increased to reduce a current passed to the variable-flux motor 4, thereby reducing the size and cost of the inverter 1.

(Tenth Embodiment)

Figure 44:
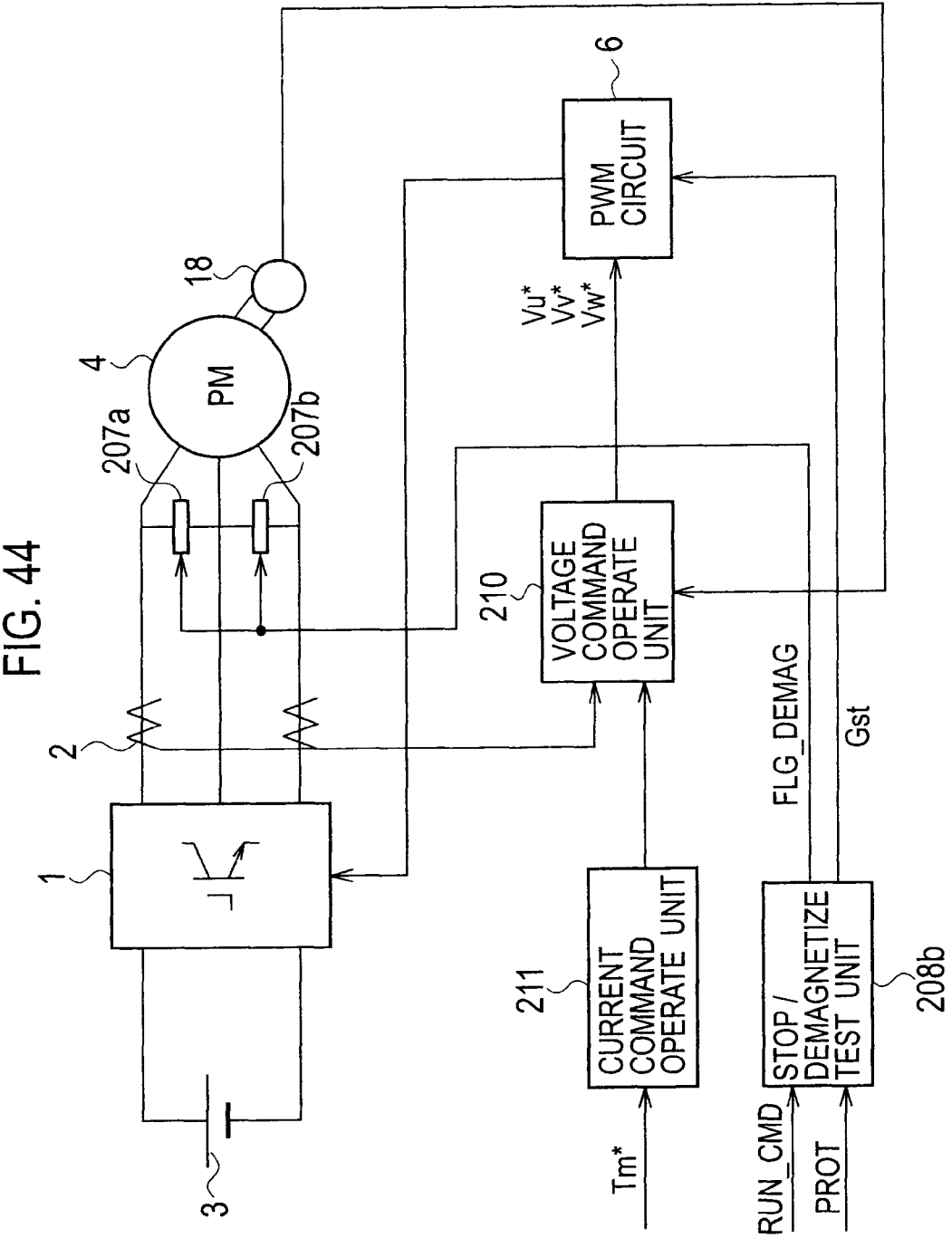
FIG. 44 is a block diagram showing a variable-flux motor drive system according to a tenth embodiment of the present invention.

FIG. 44 is a block diagram showing a configuration of a variable-flux motor drive system according to the tenth embodiment of the present invention. This embodiment differs from the ninth embodiment in that no switch 205a is arranged, contactors 207a and 207b are arranged between wires of a variable-flux motor 4, and a stop/demagnetize test unit 208b outputs a demagnetize signal to control the contactors 207a and 207b.

The contactors 207a and 207b correspond to the demagnetize unit of the present invention, and based on the demagnetize signal generated by the stop/demagnetize test unit 208b, short-circuit the wires of a variable magnet, thereby carrying out demagnetization. This embodiment, therefore, includes two demagnetize units. Like the first embodiment, the stop/demagnetize test unit 208b determines that the variable magnet 53 must be demagnetized if an inverter 1 stops to operate or if the variable-flux motor drive system must be protected and generates the demagnetize signal to be supplied to the contactors 207a and 207b. The remaining configuration of the embodiment is the same as that of the ninth embodiment, and therefore, repetitive explanations are omitted.

Figure 45:
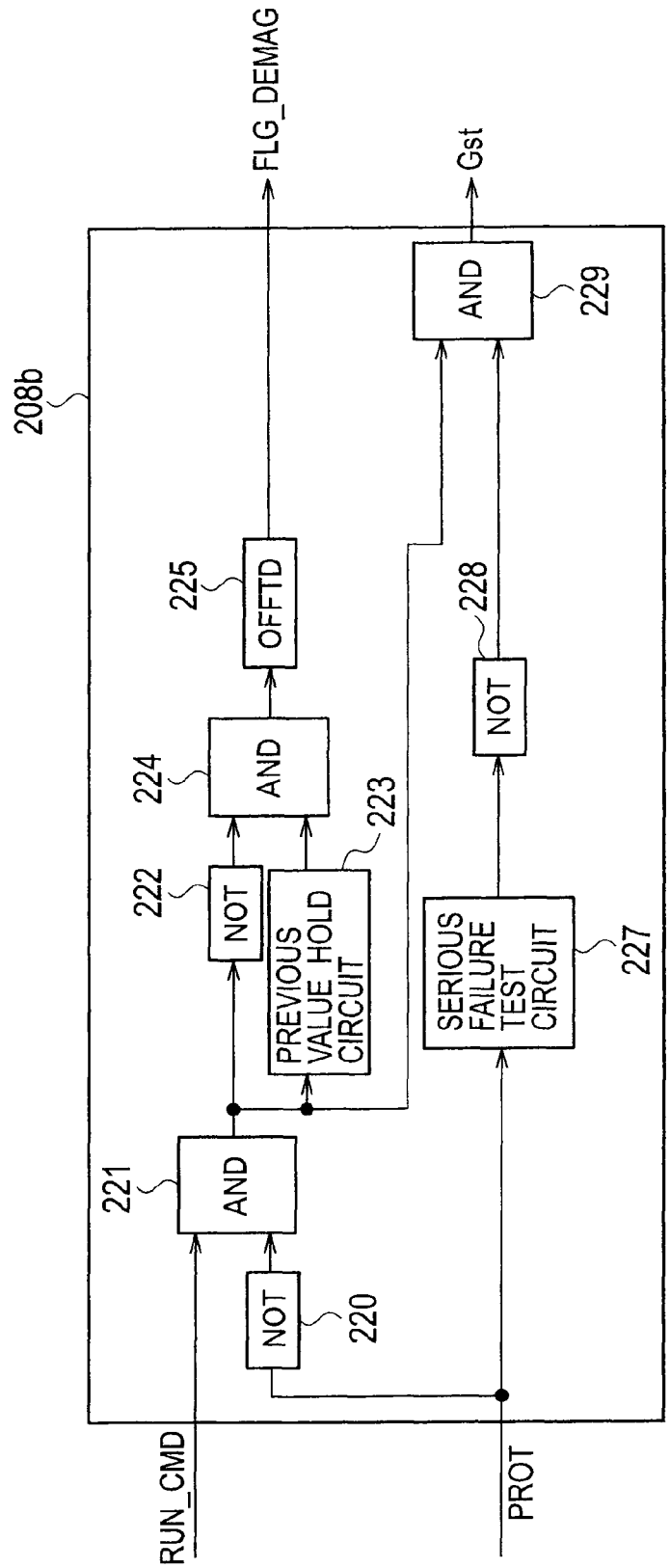
FIG. 45 is a block diagram showing an example of an internal configuration of a stop/demagnetize test unit used by the variable-flux motor drive system according to the tenth embodiment of the present invention.

Next, operation of the embodiment with the above-mentioned configuration will be explained. FIG. 45 is a block diagram showing a detailed configuration of the stop/demagnetize test unit 208b. Inputs thereto are a protect signal PROT and a run command RUN_CMD. These signals are generated by proper means in the system.

The run command is basically set to a run state (RUN_CMD=1), and when the run command specifies a stoppage, the run command is set to a stop state (RUN_CMD=0).

Figure 46:
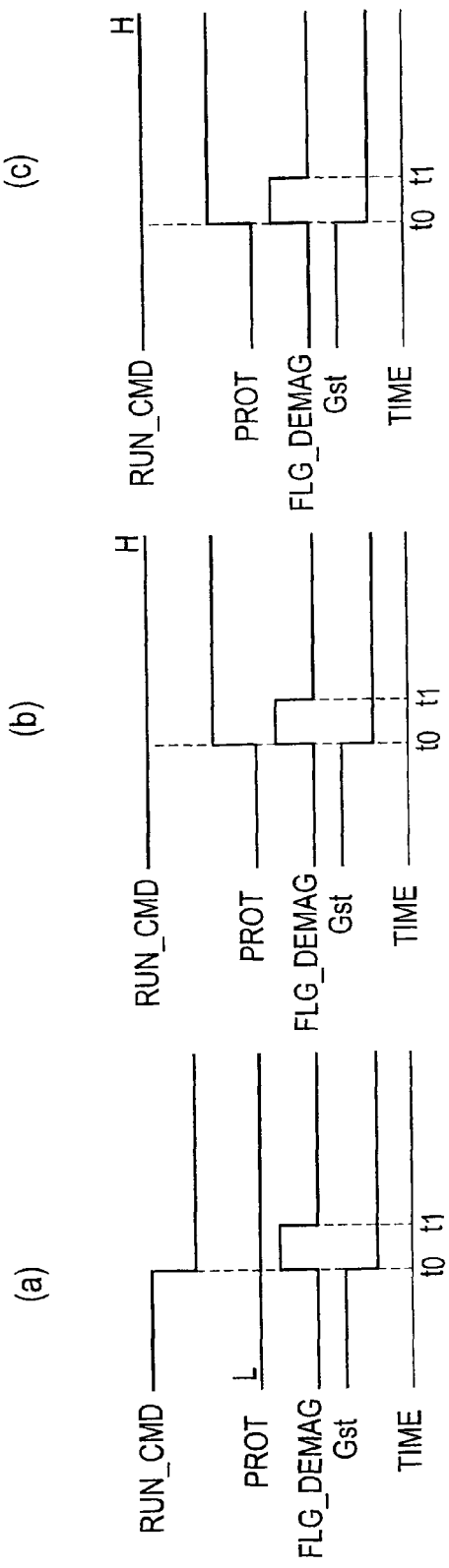
FIG. 46 shows timing charts of demagnetize control of the variable-flux motor drive system according to the tenth embodiment of the present invention.

First, a normal stoppage will be explained. FIG. 46(a) shows signal states along a time axis during the normal stoppage. In a normal run state, the run command RUN_CMD=1 and the protect signal PROT=0. Accordingly, a demagnetize flag FLG_DEMAG=0. The stop/demagnetize test unit 208b outputs a gate command Gst of 1. A PWM circuit 6 receives the gate command Gst generated by the stop/demagnetize test unit 208b and controls switching elements incorporated in the inverter 1, accordingly.

At time t0 of FIG. 46(a), the run command specifies a stoppage (RUN_CMD=0), an OFFTD circuit 225 receives 1, and the demagnetize flag becomes ON (FLG_DEMAG=1). At this time, the stop/demagnetize test unit 208b outputs a demagnetize signal to the contactors 207a and 207b. Based on the demagnetize signal, the contactors 207a and 207b short-circuit the wires of the variable magnet, thereby conducting demagnetization.

Unlike the ninth embodiment, the gate command Gst becomes 0 at the time t0. Accordingly, the switching elements of the inverter 1 are gated off and the inverter 1 stops operating. According to the ninth embodiment, the inverter 1 serves as a demagnetize unit, and therefore, no demagnetization is performed if the inverter 1 stops. The variable-flux motor drive system of the tenth embodiment employs the contactors 207a and 207b as demagnetize units, and therefore, can perform demagnetization even if the inverter 1 stops.

After a predetermined time from the time t0, the OFFTD circuit 225 outputs 0 at time t1. As a result, the demagnetize flag becomes OFF (FLG_DEMAG=0) and the contactors 207a and 207b stop the wire-to-wire short circuit demagnetization.

Next, a protective stoppage at a minor failure will be explained. FIG. 46(b) shows signal states along a time axis at a protective stoppage on a minor failure. At time t0, the protection signal PROT changes from 0 to 1. The OFFTD circuit 225 outputs 1 and the demagnetize flag rises (FLG_DEMAG=1), so that the contactors 207a and 207b carry out demagnetization. At the same time, the gate command Gst becomes 0. This gates off the switching elements of the inverter 1 and the inverter 1 stops operating. What is different from the normal stoppage is that the run command keeps the run state (RUN_CMD=1) and the protection signal PROT becomes 1 to stop the inverter 1 and carry out demagnetization.

Lastly, a protective stoppage at a serious failure will be explained. FIG. 46(c) shows signal states along a time axis at a protective stoppage on a serious failure. At time t0, the protection signal PROT changes from 0 to 1. At the same time, a serious failure test circuit 227 outputs 1 to indicate that it is a serious failure. As a result, the gate command Gst becomes 0 and the inverter 1 stops operating at once. According to the embodiment employing the stop/demagnetize test unit 208b, the variable-flux motor drive system similarly operates for a minor failure and a serious failure.

Figure 47:
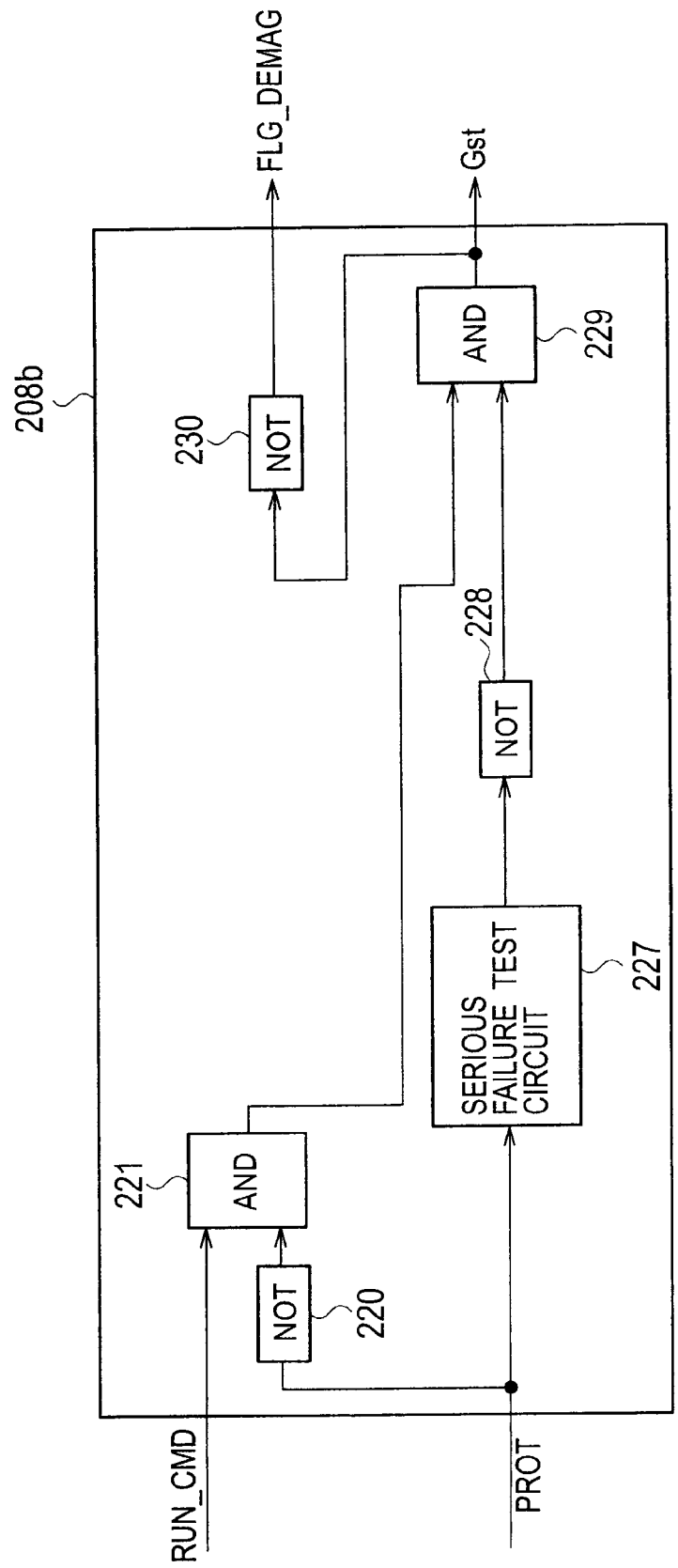
FIG. 47 is a block diagram showing an example of an internal configuration of the stop/demagnetize test unit used by the variable-flux motor drive system according to the tenth embodiment of the present invention.
Figure 48:
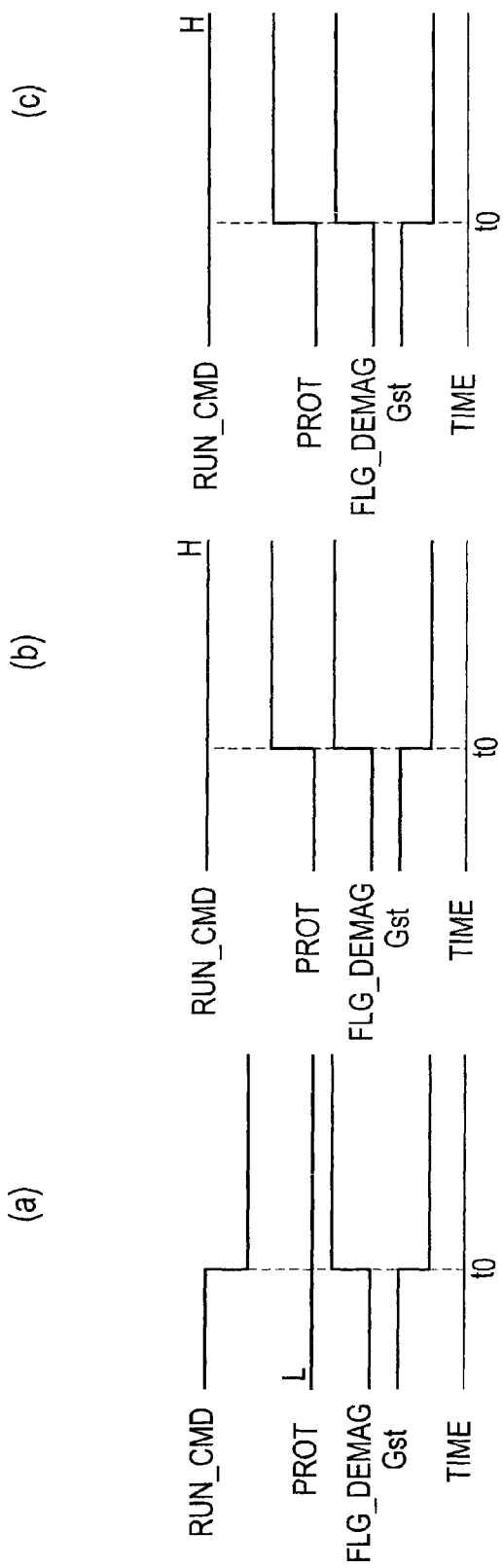
FIG. 48 shows timing charts of demagnetize control of the variable-flux motor drive system according to the tenth embodiment of the present invention.

FIG. 47 is a block diagram showing another configuration example of the stop/demagnetize test unit 208b. First, a normal stoppage will be explained. FIG. 48(a) shows signal states along a time axis during the normal stoppage. In a normal run state, the run command RUN_CMD=1 and the protect signal PROT=0. Accordingly, the demagnetize flag FLG_DEMAG=0. The stop/demagnetize test unit 208b outputs the gate command Gst of 1. The PWM circuit 6 receives the gate command Gst generated by the stop/demagnetize test unit 208a and controls the switching elements incorporated in the inverter 1, accordingly.

At time t0 of FIG. 48(a), the run command specifies a stoppage (RUN_CMD=0) and the demagnetize flag becomes ON (FLG_DEMAG=1). At this time, the stop/demagnetize test unit 208b outputs a demagnetize signal to the contactors 207a and 207b. Based on the demagnetize signal, the contactors 207a and 207b short-circuit the wires of the variable magnet 53, thereby conducting demagnetization. At the time t0, the gate command Gst becomes 0, and therefore, the switching elements of the inverter 1 are gated off to stop the inverter 1. Thereafter, the demagnetize flag keeps ON (FLG_DEMAG=1), to continue the demagnetization. The gate command Gst keeps 0.

Next, a protective stoppage at a minor failure will be explained. FIG. 48(b) shows signal states along a time axis at a protective stoppage on a minor failure. At time t0, the protection signal PROT changes from 0 to 1. As a result, the demagnetize flag turns on (FLG_DEMAG=1), so that the contactors 207a and 207b carry out demagnetization. At the same time, the gate command Gst becomes 0. This gates off the switching elements of the inverter 1 to stop the inverter 1.

Lastly, a protective stoppage at a serious failure will be explained. FIG. 48(c) shows signal states along a time axis at a protective stoppage on a serious failure. At time t0, the protection signal PROT changes from 0 to 1. At the same time, a serious failure test circuit 227 outputs 1 to indicate that it is a serious failure. As a result, the gate command Gst becomes 0 to immediately stop the inverter 1.

As mentioned above, the variable-flux motor drive system according to the tenth embodiment has the contactors 207a and 207b serving as demagnetize units, and therefore, is capable of carrying out demagnetization after the inverter 1 stops operating, in addition to the effect of the ninth embodiment. The related art shown in FIG. 57 must have a series-connected load contactor for each phase, and therefore, must have at least three (six for dual arrangement) load contactors 209a to 209f. On the other hand, the embodiment needs only two contactors. The series-connected load contactor provided for each phase must always pass a large current during the operation of the inverter, and therefore, must have a large capacity. According to the embodiment, the contactors 207a and 207b pass currents only during a short demagnetization period. Accordingly, the contactors of the embodiment each may have a reduced current capacity, a reduced size, and a reduced failure ratio.

Employing the stop/demagnetize test unit 208b shown in FIG. 47 reduces the number of internal circuits, size, and cost of the system. When the gates of the inverter 1 are OFF, the contactors 207a and 207b always short-circuit to carry out demagnetization. This may be safe. However, a steadily passing current may generate a braking force applied to the variable-flux motor 4.

Since there are two demagnetize units, i.e., the contactors 207a and 207b, it is possible to carry out demagnetization even if one of them fails. This improves the reliability of the variable-flux motor drive system.

(Eleventh Embodiment)

Figure 49:
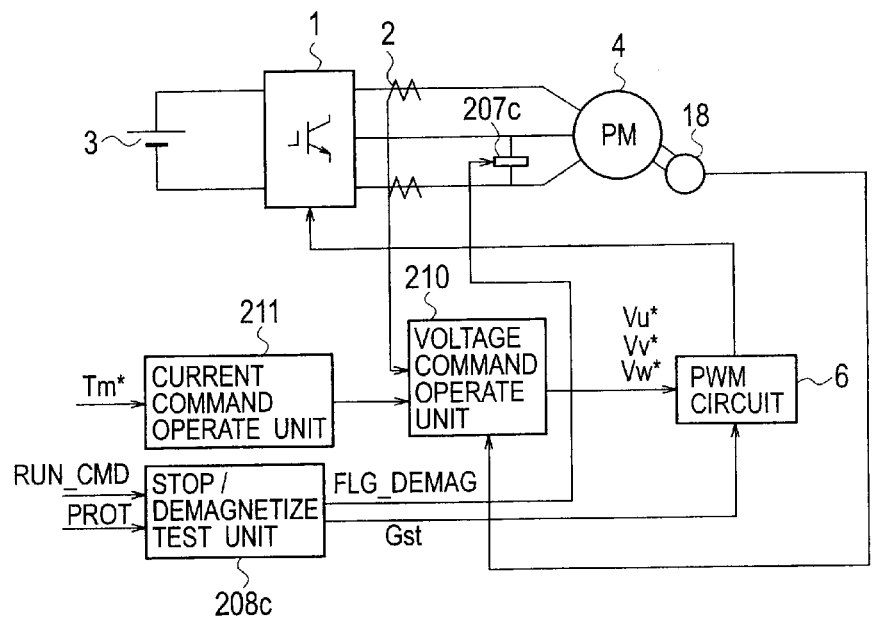
FIG. 49 is a block diagram showing a variable-flux motor drive system according to an eleventh embodiment of the present invention.

FIG. 49 is a block diagram showing a variable-flux motor drive system according to the eleventh embodiment of the present invention. It differs from the tenth embodiment in that a contactor 207c is arranged between wires of a variable-flux motor 4.

The contactor 207c corresponds to the demagnetize unit of the present invention and carries out demagnetization by short-circuiting wires of a variable magnet according to a demagnetize signal generated by a stop/demagnetize test unit 208c. Unlike the tenth embodiment, the demagnetize unit of this embodiment short-circuits only one wire-to-wire. This configuration can demagnetize the variable magnet between the wires short-circuited by the contactor 207c because the variable-flux motor 4 rotates.

Figure 50:
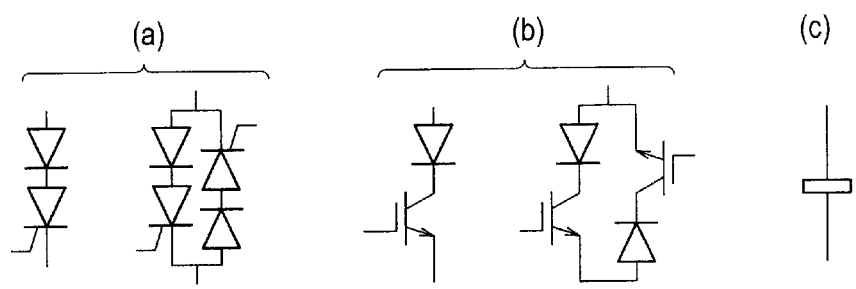
FIG. 50 show circuit diagrams of examples of a demagnetize unit capable of conducting demagnetization by short-circuiting wires of a variable-flux motor according to the eleventh embodiment of the present invention.

FIG. 50 shows examples of the demagnetize unit capable of short-circuiting the wires of the variable-flux motor 4 for demagnetization. According to the embodiment, the demagnetize unit that achieves demagnetization by short-circuiting at least one wire-to-wire of the variable-flux motor 4 consists of the contactor 207c shown in FIG. 50(c). This may be a semiconductor switch. Instead of the contactor 207c, the demagnetize unit of the embodiment may be a combination of thyristors and reverse-blocking diodes shown in FIG. 50(a). Alternatively, it may be a combination of self-arc-suppressing elements (such as GTOs, IGBTs, and MOSFETs) and reverse-blocking elements shown in FIG. 50(b). The contactors 207a and 207b of the tenth embodiment are replaceable with demagnetize units employing the above-mentioned semiconductor switches. The remaining configuration of the eleventh embodiment are similar to that of the tenth embodiment, and therefore, repetitive explanations are omitted.

Next, operation of the embodiment with the above-mentioned configuration will be explained. The stop/demagnetize test unit 208c operates like the stop/demagnetize test unit 208b of the tenth embodiment. When the inverter 1 stops operating or when the variable-flux motor drive system must be protected, the stop/demagnetize test unit 208c determines that the variable magnet 53 must be demagnetized and generates a demagnetize signal, which is output to the contactor 207c.

Based on the input demagnetize signal, the contactor 207c short-circuits the wires of the variable-flux motor 4, to demagnetize the variable magnet 53.

In addition to the effects of the ninth and tenth embodiments, the variable-flux motor drive system of the eleventh embodiment has the contactor 207c serving as the demagnetize unit, to carry out demagnetization even after the inverter 1 is stopped. This embodiment needs only one load contactor, i.e., the contactor 207c, to reduce costs.

(Twelfth Embodiment)

Figure 51:
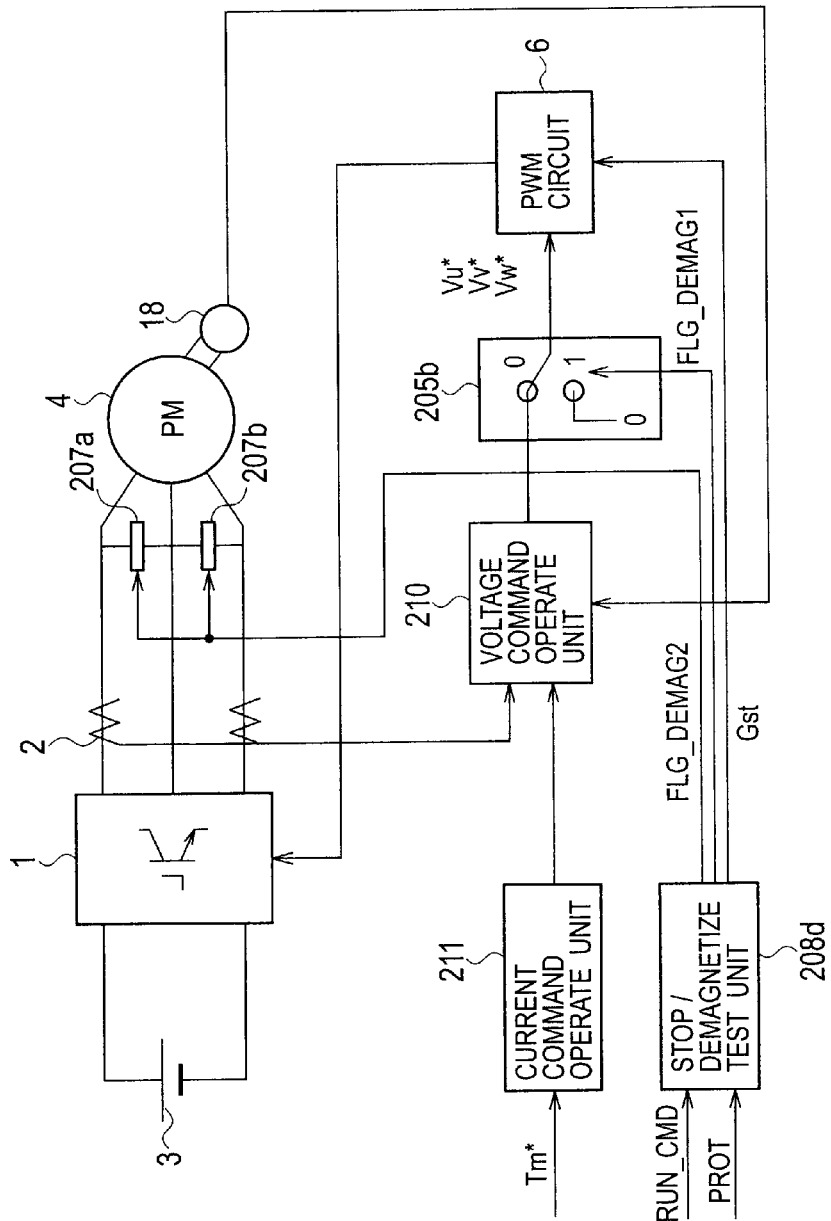
FIG. 51 is a block diagram showing a variable-flux motor drive system according to a twelfth embodiment of the present invention.

FIG. 51 is a block diagram showing a configuration of a variable-flux motor drive system according to the twelfth embodiment of the present invention. This embodiment differs from the ninth embodiment shown in FIG. 39 in that contactors 207a and 207b are arranged between wires of a variable-flux motor 4. According to this embodiment, an inverter 1 and the contactors 207a and 207b each correspond to the demagnetize unit of the present invention. A stop/demagnetize test unit 208d outputs demagnetize flags FLG_DEMAG1 and FLG_DEMAG2 serving as demagnetize signals to the contactors 207a and 207b.

When the inverter 1 stops operating or when the variable-flux motor drive system must be protected, the stop/demagnetize test unit 208d determines that a variable magnet 53 must be demagnetized and generates the demagnetize signals. At this time, if any one of the inverter 1 and contactors 207a and 207b corresponding to the demagnetize units is failed, the stop/demagnetize test unit 208d generates a demagnetize signal to make a sound one of the demagnetize units demagnetize. Similar to the tenth embodiment, the contactors 207a and 207b follow the demagnetize signal generated by the stop/demagnetize test unit 208d, to demagnetize the variable magnet 53 by short-circuiting the wires thereof.

The remaining configuration of the twelfth embodiment is the same as that of the ninth embodiment shown in FIG. 39, and therefore, repetitive explanations are omitted.

Next, operation of the twelfth embodiment with the above-mentioned configuration will be explained. According to the embodiment, a protect signal PROT includes information related to whether or not each of the demagnetize units, i.e., the inverter 1 and contactors 207a and 207b is failed and needs to be protected (failed state). According to the protect signal PROT, the stop/demagnetize test unit 208d checks each of the inverter 1 and contactors 207a and 207b to see if failed.

Figure 52:
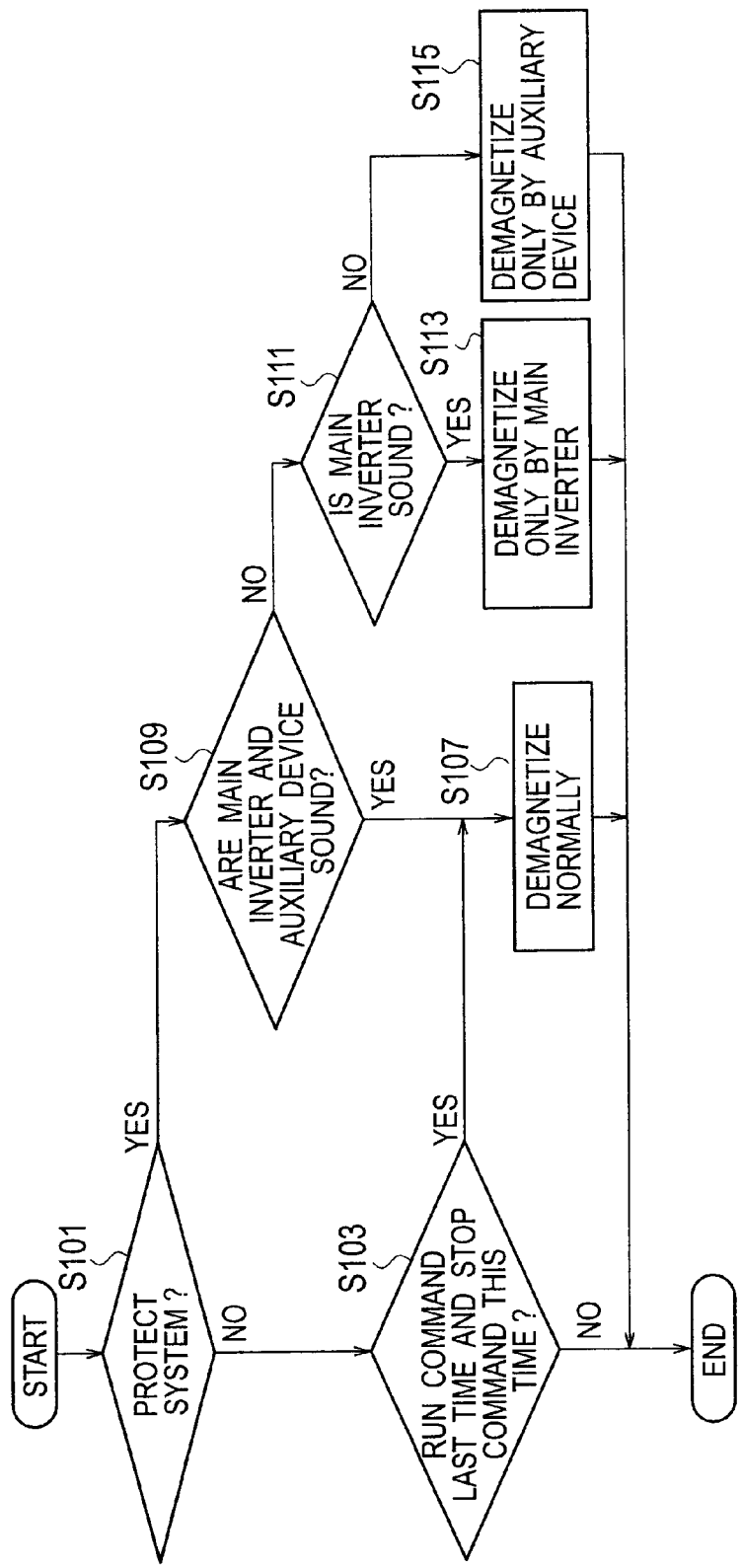
FIG. 52 is a flowchart showing operation of a stop/demagnetize test unit of the variable-flux motor drive system according to the twelfth embodiment of the present invention.

FIG. 52 is a flowchart showing operation of the stop/demagnetize test unit 208d according to the embodiment. First, the stop/demagnetize test unit 208d determines whether or not the variable-flux motor drive system must be protected (step S101). If the system protection is not requested, the stop/demagnetize test unit 208d determines whether or not a previous run command is in a run state (RUN_CMD=1) and a present run command indicates a stoppage (RUN_CMD=0) (step S103). If these conditions are not met, the operation ends here.

If, in step S103, the stop/demagnetize test unit 208d determines that the previous run command is in a run state and the present run command specifies a stoppage, normal demagnetization is carries out (step S107). The normal demagnetization may be carried out by any method. For example, the stop/demagnetize test unit 208d outputs demagnetize signals to a switch 205b and the contactors 207a and 207b. Namely, the unit 208d outputs FLG_DEMAG1=1 and FLG_DEMAG2=1 to simultaneously carry out demagnetization by the inverter 1 and by the contactors 207a and 207b. The stop/demagnetize test unit 208d usually outputs only the demagnetize signal to the switch 205b, i.e., FLG_DEMAG1=1 and FLG_DEMAG2=0, to make only the inverter 1 carry out demagnetization. This can reduce the number of open/close operations, decrease a failure rate, and extend service lives of the contactors 207a and 207b.

If the system protection is requested in step S101, the stop/demagnetize test unit 208d determines whether the inverter 1 serving as a main inverter and the contactors 207a and 207b serving as auxiliary devices are failed or sound (step S109). If all of the main inverter 1 and auxiliary devices are sound (not failed), the stop/demagnetize test unit 208d generates demagnetize signals to carry out the normal demagnetization (step S107).

If one of the main inverter 1 and auxiliary devices is not sound (failed), the stop/demagnetize test unit 208d determines whether or not the inverter 1 is sound (not failed) (step S111). If the inverter 1 is sound, the stop/demagnetize test unit 208d generates a demagnetize signal (FLG_DEMAG1=1) to make the inverter 1 that is sound carry out demagnetization and outputs the signal to the switch 205b. As a result, as explained in the ninth embodiment, the switch 205b outputs 0. The inverter 1 short-circuits the wires of the variable-flux motor 4, to demagnetize the variable magnet 53 (step S113). Accordingly, the contactors 207a and 207b do not execute demagnetization.

If the inverter 1 is not sound and is failed in step S111, the stop/demagnetize test unit 208d generates a demagnetize signal to make the contactors 207a and 207b that are sound carry out demagnetization and outputs the signal (FLG_DEMAG2=1) to the contactors 207a and 207b. Like the second embodiment, the contactors 207a and 207b follow the demagnetize signal generated by the stop/demagnetize test unit 208d, to short-circuit the wires of the variable magnet and demagnetize the same (step S115). Accordingly, the inverter 1 does not perform demagnetization.

In this way, the variable-flux motor drive system of the twelfth embodiment provides, in addition to the effects of the ninth to eleventh embodiments, an effect that, when any one of the demagnetize units is failed, the stop/demagnetize test unit 208d generates a demagnetize signal to make a sound demagnetize unit perform demagnetization. Namely, this embodiment can use only a sound demagnetize unit to carry out demagnetization without using a failed demagnetize unit, thereby safely protecting the system.

(Thirteenth Embodiment)

Figure 53:
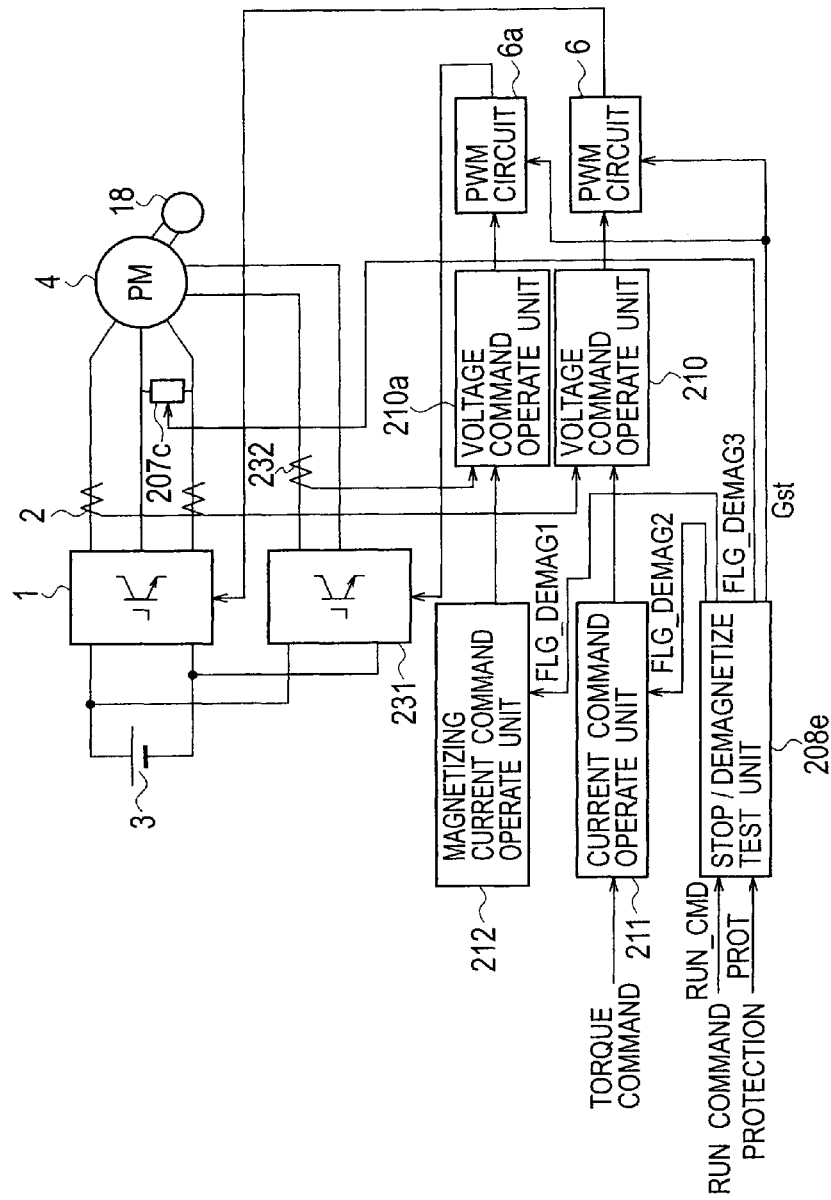
FIG. 53 is a block diagram showing a variable-flux motor drive system according to a thirteenth embodiment of the present invention.

FIG. 53 is a block diagram showing a variable-flux motor drive system according to the thirteenth embodiment of the present invention. This embodiment differs from the tenth embodiment in that it additionally has a magnetize inverter 231, a current detector 232, a magnetizing current command operate unit 212, a voltage command operate unit 210a, and a PWM circuit 6a.

The magnetize inverter 231 corresponds to the magnetize unit of the present invention, is connected to a DC power source 3, and supplies a magnetizing current to a magnetize coil of a variable-flux motor 4, to control the flux of a variable magnet 53 of the variable-flux motor 4. The magnetize inverter 231 also corresponds to the demagnetize unit of the present invention and utilizes a demagnetize signal generated by a stop/demagnetize test unit 208e, to demagnetize the variable magnet 53. A current passed to the magnetize coil needs no regeneration and must be passed in both positive and negative directions for magnetization and demagnetization. Accordingly, the magnetize inverter 231 has a known single-phase, full-bridge inverter configuration. The current detector 232 detects the magnetizing current passed to the magnetize coil and outputs the detected current to the voltage command operate unit 210a.

The magnetizing current command operate unit 212 calculates a necessary magnetizing current, generates a magnetizing current command, and outputs the command to the voltage command operate unit 210a. Generally, the magnetizing current is dependent on a magnetize history of the variable magnet 53. Accordingly, the magnetizing current command operate unit 212 has, for example, table information storing magnetizing currents corresponding to magnetize histories and requested flux values and calculates a necessary magnetizing current according to the table information. The magnetizing current must accurately be passed at high speed, and therefore, PI control may be replaced with a hysteresis comparator.

The voltage command operate unit 210a resorts to the input magnetizing current command, to calculate and generate a voltage command so that the magnetizing current provided by the magnetize inverter 231 may agree with the command. The voltage command is supplied to the PWM circuit 6a. The PWM circuit 6a utilizes the input voltage command to control ON/OFF of switching elements of the magnetize inverter 231.

Accordingly, the inverter 1, magnetize inverter 231, and contactor 207c of the embodiment each correspond to the demagnetize unit of the present invention.

With this configuration, a magnetic field created by the magnetizing current directly controls the magnetization of the variable magnet 53 that is a low-coercive-force permanent magnet. Unlike the related art that passes an excessively large D-axis current to a main coil for magnetization, the embodiment uses a magnetizing current to the magnetize coil, to variably control the flux of the variable magnet 53.

This decreases the current capacity of the inverter 1, to reduce the size, weight, and cost of the inverter 1. The magnetize coil may be embedded in a rotor iron core 52 as shown in FIGS. 30 and 31. In this case, flux linked with the magnetize coil in the rotor 51 does not temporally change, and therefore, the magnetize coil does not generate a counter electromotive voltage. This helps reduce the capacity of the magnetize inverter 231.

When the inverter 1 is used for magnetization, the degree of freedom in designing an inductance is small. A motor inductance is designed in consideration of the output and efficiency of a motor, and therefore, optimization for magnetization is not always given priority. On the other hand, employing the exclusive-use magnetize coil increases the degree of freedom in designing an inductance of the coil and can optimize the inductance for magnetization.

The stop/demagnetize test unit 208e outputs demagnetize flags FLG_DEMAG1, FLG_DEMAG2, and FLG_DEMAG3 serving as demagnetize signals to the magnetizing current command operate unit 212, current command operate unit 211, and contactor 207c, respectively.

When the inverter 1 stops operating or when the variable-flux motor drive system must be protected, the stop/demagnetize test unit 208e determines that the variable magnet 53 must be demagnetized and generates the demagnetize signals. At this time, if any one of the demagnetize units, i.e., the inverter 1, magnetize inverter 231, and contactor 207c is failed, the stop/demagnetize test unit 208e generates the demagnetize signals to make a sound one of the demagnetize units carry out demagnetization. Like the eleventh embodiment, the contactor 207c utilizes the demagnetize signal generated by the stop/demagnetize test unit 208e, to short-circuit wires of the variable magnet 53, thereby demagnetizing the same. The remaining configuration of the embodiment is the same as that of the tenth embodiment, and therefore, repetitive explanations are omitted.

Next, operation of the embodiment having the above-mentioned configuration will be explained. According to the embodiment, a protect signal PROT contains information related to whether or not each of the demagnetize units, i.e., the inverter 1, magnetize inverter 231, and contactor 207c must be protected (failed state) due to, for example, a failure. The stop/demagnetize test unit 208e utilizes the protect signal PROT, to determine whether or not any one of the inverter 1, magnetize inverter 231, and contactor 207c is in a failed state.

Figure 54:
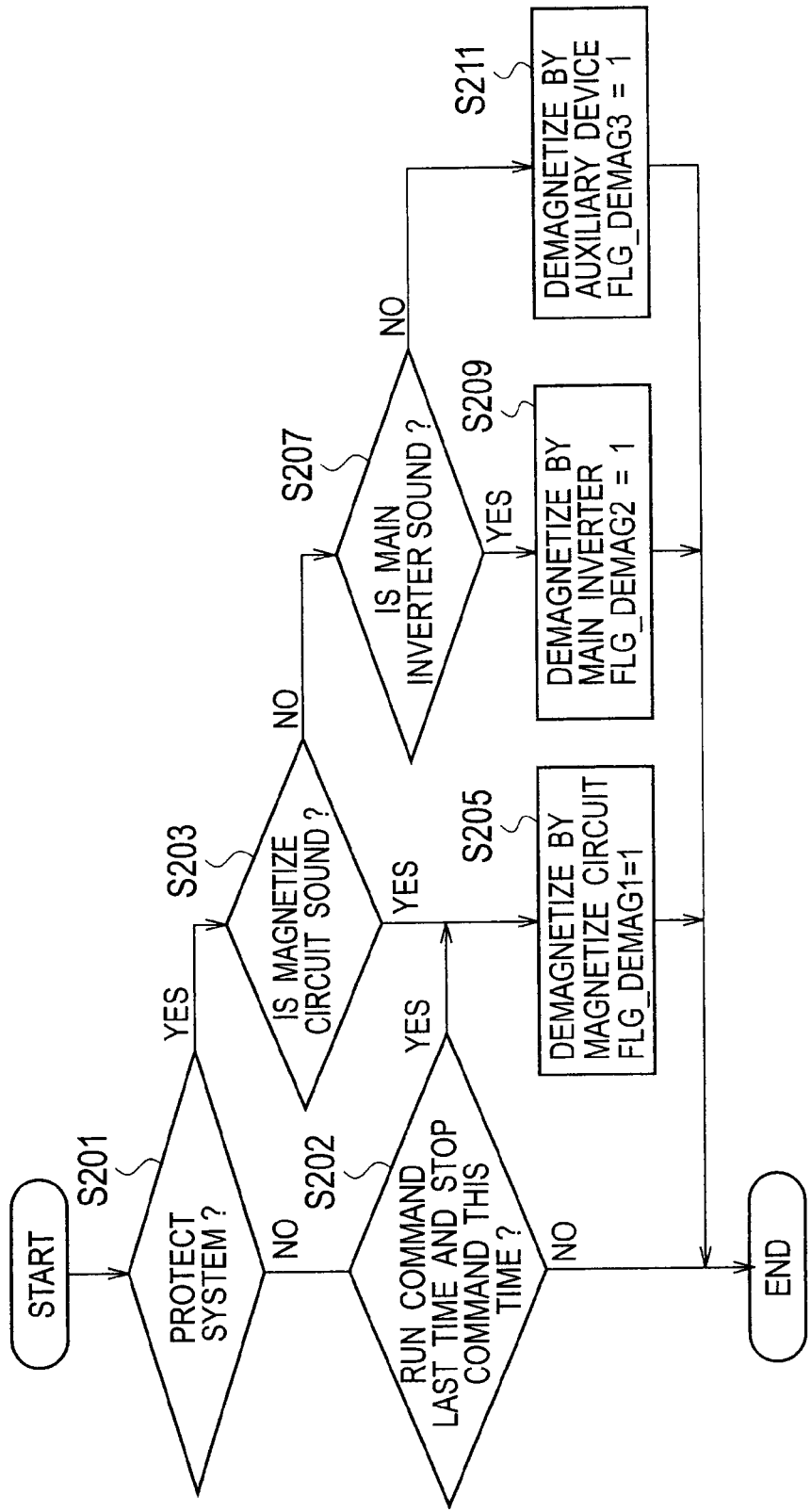
FIG. 54 is a flowchart showing operation of a stop/demagnetize test unit of the variable-flux motor drive system according to the thirteenth embodiment of the present invention.

FIG. 54 is a flowchart showing operation of the stop/demagnetize test unit 208e according to the embodiment. First, the stop/demagnetize test unit 208c determines whether or not the variable-flux motor drive system must be protected (step S201). If the system protection is not requested, the stop/demagnetize test unit 208e determines whether or not a previous run command is in a run state (RUN_CMD=1) and a present run command indicates a stoppage (RUN_CMD=0) (step S202). If these conditions are not met, the operation ends here.

If, in step S202, the stop/demagnetize test unit 208e determines that the previous run command is in a run state and the present run command specifies a stoppage, the magnetize inverter 231 serving as a magnetize circuit carries out demagnetization (step S205). To make the magnetize inverter 231 carry out demagnetization, the stop/demagnetize test unit 208e outputs the demagnetize signal FLG_DEMAG1=1 to the magnetizing current command operate unit 212. The magnetizing current command operate unit 212 calculates a magnetizing current necessary for the magnetize inverter 231 to carry out demagnetization and outputs a magnetizing current command to the voltage command operate unit 210a. The voltage command operate unit 210a and PWM circuit 6a operate as explained above. The magnetize inverter 231 passes the magnetizing current to demagnetize the variable magnet.

If the system protection is requested in step S201, the stop/demagnetize test unit 208e determines whether the magnetize inverter 231 serving as a magnetize circuit is failed or sound (step S203). If the magnetize inverter 231 is sound (not failed), the stop/demagnetize test unit 208e outputs the demagnetize signal FLG_DEMAG1=1 to the magnetizing current command operate unit 212. Based on the demagnetize signal, the magnetize inverter 231 demagnetizes the variable magnet (step S205).

If the magnetize circuit is not sound (failed), the stop/demagnetize test unit 208e determines whether or not the inverter 1 is sound (not failed) (step S207). If the inverter 1 is sound, the stop/demagnetize test unit 208e generates a demagnetize signal to make the inverter 1 that is sound carry out demagnetization and outputs FLG_DEMAG2=1 to the current command operate unit 211. The current command operate unit 211 calculates a current necessary for the inverter 1 to carry out demagnetization and outputs a current command to a voltage command operate unit 210. The current command operate unit 211 can also generate a current command so that the voltage command operate unit 210 may output 0. In this case, the inverter 1 short-circuits wires of the variable-flux motor 4 like the ninth embodiment, to demagnetize the variable magnet 53 (step S209).

If the inverter 1 is not sound and is failed in step S207, the stop/demagnetize test unit 208e generates the demagnetize signal (FLG_DEMAG3=1) to make the contactor 207c that is sound carry out demagnetization and outputs the signal to the contactor 207c. Like the eleventh embodiment, the contactor 207c utilizes the demagnetize signal generated by the stop/demagnetize test unit 208e, to short-circuit wires of the variable magnet 53 and demagnetize the same (step S211).

In this way, the variable-flux motor drive system of this embodiment provides, like the twelfth embodiment, an effect that, when one or more of the demagnetize units are failed, the stop/demagnetize test unit 208e generates demagnetize signals to make a sound demagnetize unit perform demagnetization. Namely, this embodiment can use only a sound demagnetize unit to carry out demagnetization without using failed demagnetize units, thereby safely protecting the system.

Employing the magnetize inverter 231 can reduce the current capacity of the inverter 1, to decrease the size, weight, and cost of the inverter 1.

(Fourteenth Embodiment)

Figure 55:
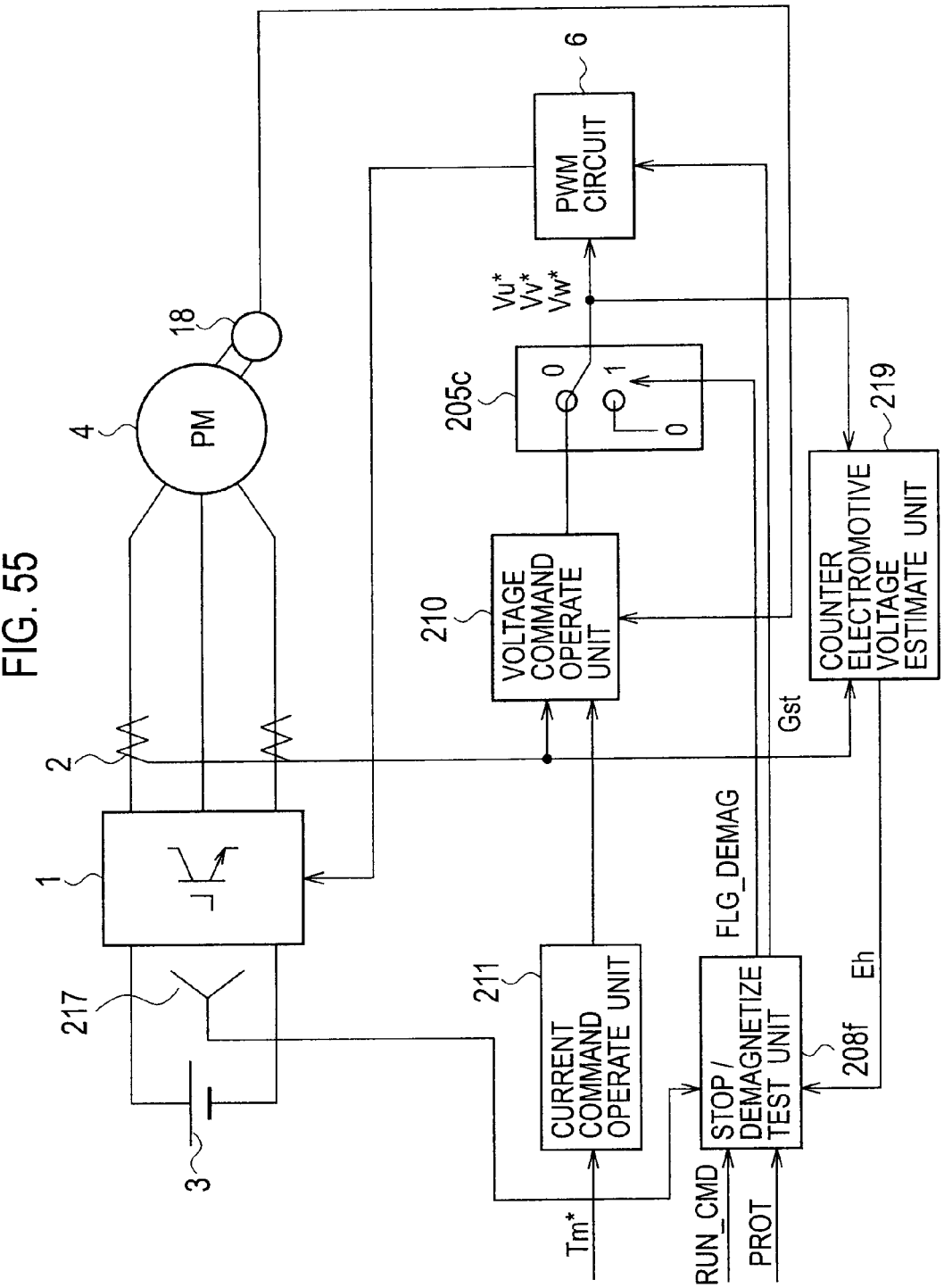
FIG. 55 is a block diagram showing a variable-flux motor drive system according to a fourteenth embodiment of the present invention.

FIG. 55 is a block diagram showing a variable-flux motor drive system according to the fourteenth embodiment of the present invention. What is different from the ninth embodiment shown in FIG. 39 is that it has a DC voltage detector 217 and a counter electromotive voltage estimate unit 219.

The DC voltage detector 217 corresponds to the first voltage detect unit of the present invention and detects a DC voltage supplied from a DC power source 3 to an inverter 1. The counter electromotive voltage estimate unit 219 utilizes voltages and currents provided by the inverter 1, to estimate a counter electromotive voltage of a variable magnet 53 of a variable-flux motor 4. Only when the counter electromotive voltage estimated by the counter electromotive voltage estimate unit 219 is equal to or higher than the DC voltage detected by the DC voltage detector 217, a stop/demagnetize test unit 208f determines that the variable magnet 53 must be demagnetized and generates a demagnetize signal.

Here, the estimation of a counter electromotive voltage will be explained. When the inverter 1 is stopped (gated off), a counter electromotive voltage can be grasped by measuring a wire-to-wire voltage of the variable-flux motor 4. When the inverter 1 is operating, however, it is impossible to directly measure the counter electromotive voltage. According to the embodiment, when the inverter 1 stops operating or when the variable-flux motor drive system is stopped for protection, the stop/demagnetize test unit 208f determines that the variable magnet must be demagnetized and generates a demagnetize signal. For this, the counter electromotive voltage estimate unit 219 estimates a counter electromotive voltage during the operation of the inverter 1.

This will be explained on a known DQ-axes rotating coordinate system. A D-axis is defined in the same direction as a magnet flux vector. A characteristic equation in a steady state is follows:

[Math. 21]

$$Vd = R \times Id - \omega \times Lq \times Iq \qquad (28)$$

$$Vq = R \times Iq - \omega \times Ld \times Id + E \qquad (29)$$

Here, R is coil resistance, Ld and Lq are D-axis inductance and Q-axis inductance, respectively, Vd and Vq are D-axis voltage and Q-axis voltage, respectively, Id and Iq are D-axis current and Q-axis current, respectively, ω is a rotational angle frequency (electrical angle) of a rotor, and E is a counter electromotive voltage.

An estimated counter electromotive voltage Eh is expressed as follows:

[Math. 22]

$$Eh = Vq - R \times Iq - \omega \times Ld \times Id \qquad (30)$$

With this expression, the counter electromotive voltage is calculable.

A current detector 2 detects currents supplied to the variable-flux motor 4 and outputs the detected currents to a voltage command operate unit 210 and the counter electromotive voltage estimate unit 219. The counter electromotive voltage estimate unit 219 converts coordinates of the input U- and W-phase currents into D- and Q-axis currents, to obtain a D-axis current Id and a Q-axis current Iq. Also, the counter electromotive voltage estimate unit 219 utilizes three-phase voltage commands provided by a switch 205c, to conduct a coordinate conversion that provides a D-axis voltage Vd and a Q-axis voltage Vq. The counter electromotive voltage estimate unit 219 may obtain the D- and Q-axis voltages by directly measuring actual values. The remaining configuration of this embodiment is the same as that of the ninth embodiment, and therefore, repetitive explanations are omitted.

Next, operation of the embodiment with the above-mentioned configuration will be explained. While the inverter 1 is operating, the counter electromotive voltage estimate unit 219 estimates a counter electromotive voltage of the variable magnet 53 according to voltages and currents provided by the inverter 1. The estimated counter electromotive voltage Eh based on the equation (30) is on DQ-axes coordinates. Since a voltage on the DQ-axes coordinates is equal to a wire-to-wire voltage (RMS), an amplitude Eh' of the counter electromotive voltage converted into a wire-to-wire voltage is expressed as follows:

[Math. 23]

$$Eh' = Eh \times \sqrt{2} \qquad (31)$$

The counter electromotive voltage estimate unit 219 outputs the calculated Eh' to the stop/demagnetize test unit 208f. The DC voltage detector 217 detects a DC voltage Vdc supplied from the DC power source 3 to the inverter 1 and outputs the detected voltage to the stop/demagnetize test unit 208f.

When the inverter 1 stops operating or when the variable-flux motor drive system must be protected, the stop/demagnetize test unit 208*f* compares the counter electromotive voltage Eh' and DC voltage Vdc with each other and determines whether or not the variable magnet 53 must be demagnetized. The counter electromotive voltage Eh' indicates a peak counter electromotive voltage. Accordingly, if the counter electromotive voltage Eh' is equal to or greater than the DC voltage Vdc, the peak counter electromotive voltage has a possibility of exceeding the DC voltage Vdc. Accordingly, the stop/demagnetize test unit 208*f* determines that the variable magnet 53 must be demagnetized, generates a demagnetize signal (FLG_DEMAG=1), and outputs the signal to the switch 205*c*. If the counter electromotive voltage Eh' is lower than the DC voltage Vdc, the stop/demagnetize test unit 208*f* generates no demagnetize signal. The remaining operation of the embodiment is the same as that of the ninth embodiment, and therefore, repetitive explanations are omitted.

As mentioned above, the variable-flux motor drive system of the embodiment provides, in addition to the effect of the ninth embodiment, an effect of comparing a counter electromotive voltage estimated by the counter electromotive voltage estimate unit 219 with a DC voltage detected by the DC voltage detector 217 and determining whether or not demagnetization must be carried out. If the counter electromotive voltage is lower than the DC voltage of the DC power source 3, the embodiment carries out no demagnetization, to reduce the number of times of unnecessary demagnetization and elongate the service lives of elements.

If the counter electromotive voltage is equal to or larger than the DC voltage of the DC power source 3, a large current will be passed to the inverter 1 to break elements and cause overheat. In addition, the variable-flux motor 4 may receive a braking force. To cope with them, the stop/demagnetize test unit 208*f* generates and outputs a demagnetize signal to prevent the inverter from receiving an overvoltage and an excessively large current and avoid the braking force.

This embodiment determines a stoppage or demagnetization only by comparing a DC voltage with a counter electromotive voltage. Electric trains, EVs, HEVs, ships, and the like employ a plurality of drive systems to drive one object. In this case, each drive is unable to determine by itself the speed (the number of revolutions of a motor) of the object. Also, an external force (wind, slope, and the like) acting on the object may accelerate the object. In such a case, a determination whether or not demagnetization must be carried out may be made by considering a maximum number of revolutions in a driving plan of the object and an increase in the speed (the number of revolutions) of the object due to disturbance.

(Fifteenth Embodiment)

Figure 56:
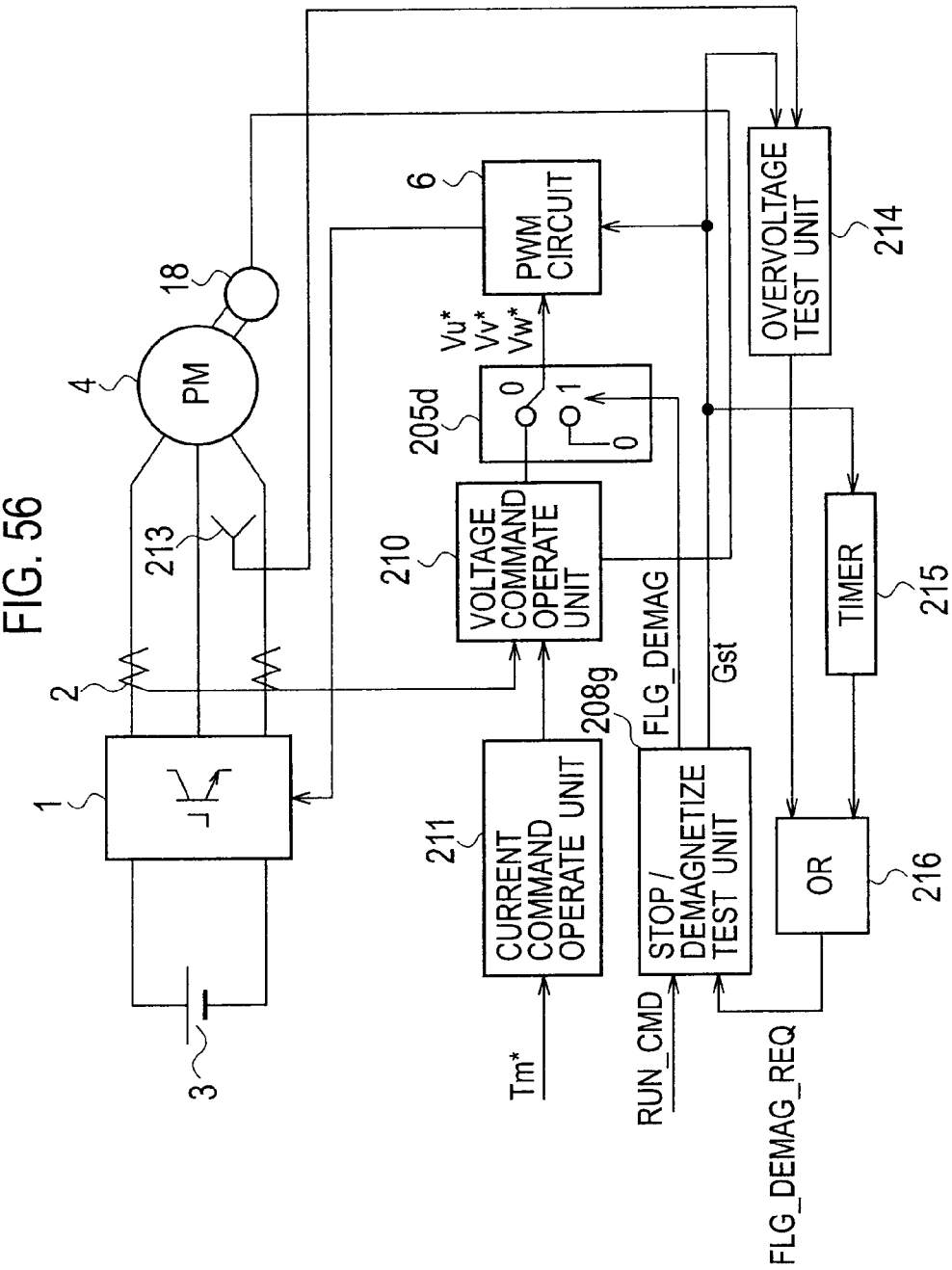
FIG. 56 is a block diagram showing a variable-flux motor drive system according to a fifteenth embodiment of the present invention.

FIG. 56 is a block diagram showing a variable-flux motor drive system according to the fifteenth embodiment of the present invention. This embodiment differs from the ninth embodiment shown in FIG. 39 in that it has a voltage detector 213, an overvoltage test unit 214, a timer 215, and an OR circuit 216.

The voltage detector 213 corresponds to the second voltage detect unit of the present invention and detects a wire-to-wire voltage of a variable-flux motor 4.

If an inverter 1 stops and if the wire-to-wire voltage detected by the voltage detector 213 is equal to or larger than a predetermined value, the overvoltage test unit 214 generates a demagnetization request signal and outputs the same to the OR circuit 216.

The timer 215 corresponds to the timer unit of the present invention and measures time. When the inverter 1 stops, the timer generates a demagnetization request signal whenever a predetermined time passes and outputs the signal to the OR circuit 216.

A stop/demagnetize test unit 208*g* outputs a gate command Gst to a PWM circuit 6, the overvoltage test unit 214, and the timer 215. Accordingly, the overvoltage test unit 214 and timer 215 are capable of grasping whether or not the inverter 1 is stopped according to the gate command Gst.

When receiving the demagnetization request signal from one of the overvoltage test unit 214 and timer 215, the OR circuit 216 outputs the demagnetization request signal to the stop/demagnetize test unit 208*g*.

The stop/demagnetize test unit 208*g* utilizes the demagnetization request signal generated by the overvoltage test unit 214 or the demagnetization request signal generated by the timer 215, to determine whether or not a variable magnet must be demagnetized, generates a demagnetize signal, and outputs the signal to a switch 205*d*.

When the inverter 1 stops operating or when the variable-flux motor drive system must be protected, the stop/demagnetize test unit 208*g* determines, like the ninth embodiment, that the variable magnet 53 must be demagnetized and generates the demagnetize signal. The overvoltage test unit 214 and timer 215 operate after the inverter 1 stops.

Although not shown in FIG. 56, it is possible to arrange a flux detect unit. The flux detect unit estimates or detects flux of the variable magnet 53 and generates a demagnetization request signal if the inverter 1 stops and if the flux of the variable magnet is equal to or greater than a predetermined value. In this case, the stop/demagnetize test unit 208*g* utilizes the demagnetization request signal generated by the flux detect unit, to determine whether or not the variable magnet 53 must be demagnetized, generate a demagnetize signal, and output the signal to the switch 205*d*. The remaining configuration is the same as that of the ninth embodiment, and therefore, repetitive explanations are omitted.

Next, operation of the embodiment having the above-mentioned configuration will be explained. When the inverter 1 stops to operate or when the variable-flux motor drive system must be protected, the variable magnet 53 will be demagnetized. This operation is the same as that of the ninth embodiment.

The stop/demagnetize test unit 208*g* outputs a gate command Gst=0, to stop the inverter 1. During the stoppage of the inverter 1, the overvoltage test unit 214 checks to see if a wire-to-wire voltage detected by the voltage detector 213 is equal to or larger than the predetermined value. The wire-to-wire voltage detected by the voltage detector 213 is a counter electromotive voltage because the inverter 1 is stopped. Namely, the overvoltage test unit 214 checks to see if the counter electromotive voltage is equal to or greater than the predetermined value. The predetermined value is freely set by a designer or an operator. Alternatively, it may be preset in the overvoltage test unit 214. If the wire-to-wire voltage (counter electromotive voltage) detected by the voltage detector 213 is equal to or larger than the predetermined voltage, the overvoltage test unit 214 generates a demagnetization request signal and outputs the signal to the OR circuit 216.

If the stop/demagnetize test unit 208*g* outputs the gate command Gst=0, the inverter 1 stops operating. During the stoppage of the inverter 1, the timer 215 measures a time, and whenever a predetermined time passes during the stoppage of the inverter 1, generates a demagnetization request signal, which is output to the OR circuit 216. This predetermined time may freely be set by a designer or an operator, or may be preset in the timer 215.

Receiving the demagnetization request signal from any one of the overvoltage test unit 214 and timer 215, the OR circuit 216 outputs the demagnetization request signal to the stop/demagnetize test unit 208*g*. Based on the demagnetization request signal generated by the overvoltage test unit 214 or the demagnetization request signal generated by the timer 215, the stop/demagnetize test unit 208g determines whether or not the variable magnet 53 must be demagnetized, generates a demagnetize signal, and outputs the signal to the switch 205d. The remaining operation is the same as that of the ninth embodiment, and therefore, repetitive explanations are omitted.

As mentioned above, the variable-flux motor drive system of the embodiment has the overvoltage test unit 214, and therefore, can provide, in addition to the effect of the ninth embodiment, an effect of carrying out demagnetization even after the stoppage of the inverter 1 if a counter electromotive voltage is equal to or larger than a predetermined value, to suppress an increase in a counter electromotive voltage. In addition, the system has the timer 215, and therefore, can carry out demagnetization at predetermined intervals even after the stoppage of the inverter 1, to suppress an increase in a counter electromotive voltage. If the system is provided with the previously-mentioned flux detect unit, the system can carry out demagnetization even after the stoppage of the inverter 1 if the flux of the variable magnet 53 is equal to or larger than a predetermined value, to suppress an increase in a counter electromotive voltage. This results in preventing a braking force from being applied and safely protecting the system.

INDUSTRIAL APPLICABILITY

The variable-flux motor drive systems according to the present invention are applicable to driving motors of electric trains, electric vehicles, hybrid vehicles, and the like.

The invention claimed is:

1. A variable-flux motor drive system comprising:
a permanent-magnet motor employing a permanent magnet;
an inverter to drive the permanent-magnet motor; and
a magnetizing unit to pass a magnetizing current for controlling the flux of the permanent magnet,
the permanent magnet at least partially having a variable magnet whose flux density is variable in response to a magnetizing current from the inverter, and
the magnetizing unit having a capacity of passing a magnetizing current that exceeds a magnetization saturation zone of magnetic material of the variable magnet, wherein the variable magnet includes two or more variable magnets that form stepwise saturation zones with respect to a magnetizing current of the inverter.

2. The motor drive system according to claim 1, wherein the two or more variable magnets include two variable magnets of a same coercive force arranged in discontinuous areas of a rotor, respectively.

3. A motor drive system comprising:
an inverter that drives a motor, the motor having a first permanent magnet, and a plurality of second permanent magnets, wherein the plurality of the second permanent magnets each have a different saturation level and a flux density of each of the plurality of second permanent magnet varies based on a magnetizing current generated from the inverter, the magnetizing current is set so as to saturate at least one of the second permanent magnets; and
a motor drive controller that controls, when varying the flux density of at least one of the second permanent magnets, the inverter to generate one of a plurality of levels of magnetizing currents.

4. The motor drive system according to claim 3, wherein a first coercive force of the first permanent magnet is lower than a second coercive force of the plurality of second permanent magnets.

5. The motor drive system according to claim 3, wherein the first permanent magnet and the plurality of second permanent magnets each include two variable magnets of a same coercive force arranged in discontinuous areas of a rotor.

6. The motor drive system according to claim 3, wherein the motor drive controller determines magnitudes of first and the second magnetizing currents in the plurality of levels of magnetizing currents according to a flux amount before a flux change and a flux amount after the flux change.

7. The motor drive system according to claim 3, wherein the motor drive controller carries out magnetization two or more times with different magnetizing currents.

8. A motor drive system comprising:
an inverter that drives a motor, the motor having a first permanent magnet, a second permanent magnet, and a third permanent magnet, wherein a first flux density of the first permanent magnet and a second flux density of the second permanent magnet vary based on a magnetizing current generated from the inverter, the magnetizing current is set so as to saturate at least one of the first and second permanent magnets, and the first permanent magnet has a different saturation level than the second permanent magnet; and
a motor drive controller that controls, when varying at least one of the first flux density and the second flux density, the inverter to generate one of a first magnetizing current and a second magnetizing current larger than the first magnetizing current, wherein the first magnetizing current is selected for varying the first flux density and the second magnetizing current is selected for varying the second flux density or both of the first flux density and the second flux density.

9. The motor drive system as set forth in claim 8, wherein the first permanent magnet has a first saturation level and the second permanent magnet has a second saturation level larger than the first saturation level, and the first magnetizing current generates a first magnetic field between the first saturation level and the second saturation level and the second magnetizing current generates a second magnetic field in excess of the second saturation level.

10. The motor drive system according to claim 9, wherein a first coercive force of the first permanent magnet is lower than a second coercive force of the second permanent magnet.

11. The motor drive system according to claim 8, wherein the motor drive controller determines magnitudes of the first and the second magnetizing currents according to a flux amount before a flux change and a flux amount after the flux change.

12. The motor drive system according to claim 8, wherein the motor drive controller carries out magnetization two or more times with different magnetizing currents.

* * * * *